(12) United States Patent
Levieil et al.

(10) Patent No.: US 12,464,994 B2
(45) Date of Patent: Nov. 11, 2025

(54) **RESISTANCE TO *XANTHOMONAS CAMPESTRIS* PV. *CAMPESTRIS* (*XCC*) IN CAULIFLOWER**

(71) Applicant: VILMORIN & CIE, Paris (FR)

(72) Inventors: Rémi Levieil, La Bohalle (FR); Perrine David, La Bohalle (FR); Grégoire Marandel, Mondonville (FR); Anaïs Trameleuc, La Bohalle (FR)

(73) Assignee: VILMORIN & CIE, Paris (FR)

( * ) Notice: Subject to any disclaimer, the term of this patent is extended or adjusted under 35 U.S.C. 154(b) by 1123 days.

(21) Appl. No.: 17/267,273

(22) PCT Filed: Aug. 9, 2019

(86) PCT No.: PCT/EP2019/071487
§ 371 (c)(1),
(2) Date: Feb. 9, 2021

(87) PCT Pub. No.: WO2020/030804
PCT Pub. Date: Feb. 13, 2020

(65) Prior Publication Data
US 2021/0307275 A1    Oct. 7, 2021

(30) Foreign Application Priority Data
Aug. 10, 2018  (EP) .................................... 18306106

(51) Int. Cl.
*A01H 1/00*      (2006.01)
*A01H 6/20*      (2018.01)
*C12Q 1/6895*    (2018.01)

(52) U.S. Cl.
CPC .............. *A01H 1/125* (2021.01); *A01H 6/20* (2018.05); *A01H 6/203* (2018.05); *C12Q 1/6895* (2013.01); *C12Q 2600/13* (2013.01); *C12Q 2600/158* (2013.01)

(58) Field of Classification Search
None
See application file for complete search history.

(56) References Cited

FOREIGN PATENT DOCUMENTS

| EP | 3300591 A1 | 4/2018 |
| WO | 2010089374 A1 | 8/2010 |
| WO | 2017/025627 A1 | 2/2017 |

OTHER PUBLICATIONS

Taylor, et al, 2002, Phytopathology 92:105-111. (Year: 2002).*
Tonu et al, 2013, American Journal of Plant Sciences, 4: 11-20 (Year: 2013).*
Sharma et al, 2017, Frontiers in Plant Science 8:1255 (Year: 2017).*
Chen et al, 2024, Nature Genetics 56:1233-1244 (Year: 2024).*
R.S. Jamwal, et al., Inheritance of Resistance to Black Rot (*Xanthomonas campestris* PV. Campestris in Cauliflower (*Brassica oleracea* Var. Botrytis), Euphytica 35 (1986) 941-943, India.
P. Saha, et al., Molecular mapping of black rot resistance locus Xcalbo on chromosome 3 in Indian cauliflower (*Brassica oleracea* var. botrytis L.), Plant Breeding 133, 268-274 (2014), doi:10.1111/pbr.12152, India.
P. Saha, et al., Race-specific genetics of resistance to black rot disease [*Xanthomonas campestris* pv. campestris (Xcc) (Pammel) Dowson] and the development of three random amplified polymorphic DNA markers in cauliflower; Journal of Horticultural Science & Biotechnology (2014) 89 (5) 480-486, India.
B. B. Sharma, et al., Introgression of Black Rot Resistance from Brassica carinata to Cauliflower (*Brassica oleracea* botrytis Group) through Embryo Rescue, Frontiers in Plant Science (2017) 8: 1255, doi: 10.3389/fpls.2017.01255.
J.D. Taylor, et al., Sources and Origin of Resistance to *Xanthomonas campestris* pv. campestris in Brassica Genomes, Bacteriology, vol. 92, No. 1, 2002, 105-111, UK.
Camargo, L.E. et al., "Mapping of Quantitative Trait Loci Controlling Resistance of Brassica Oleracea to *Xanthomonas campestris* pv. campestris in the Field and Greehouse" Phytopathology (1995) The American Phytopathological Society vol. 85, No. 10, p. 1296-1300.
Communication (Extended European Search Report) issued by the European Patent Office in European Application No. 18306106.8 dated Oct. 2, 2018, 9 pages total.
Communication (International Search Report) Issued by the International Searching Authority in International Application No. PCT/EP2019/071487 dated Sep. 23, 2019, 8 pages total.
Communication (Written Opinion) issued by the International Searching Authority in International Application No. PCT/EP2019/071487 dated Sep. 23, 2019, 7 pages total.
Kifuji, Y. et al., "QTL Analysis of Black Rot Resistance in Cabbage Using Newly Developed EST-SNP Markers" Euphytica (2013) vol. 190, p. 289-295.
Soengas, P. et al., "Identification of Quantitative Trait Loci for Resistance to *Xanthomonas campestris* pv. campestris in Brassica Rapa" Theoretical and Applied Genetics (2007) vol. 114, No. 4, p. 637-645.
Taylor, J.D. et al., "Sources and Origin of Resistance to *Xanthomonas campestris* pv. campestris in Brassica Genomes" Bacteriology (2002) The American Phytopathological Society vol. 98, No. 1, p. 105-111.

(Continued)

*Primary Examiner* — Brent T Page
*Assistant Examiner* — Aleksandar Radosavljevic
(74) *Attorney, Agent, or Firm* — Troutman Pepper Locke LLP

(57) ABSTRACT

The present invention relates to resistance to *Xanthomonas campestris* pv. *campestris* (Xcc) in cauliflower. According to the invention, the resistance is provided by DNA sequences, introgressed from a green cauliflower at specific loci in the genome of a white cauliflower. The introgressed sequences can be present homozygously or heterozygously in the genome of the white cauliflower, and they confer resistance to Xcc. The invention further relates to part of these cauliflowers, to seeds, to the progeny of these cauliflowers, and to method for producing cauliflowers resistant to Xcc.

16 Claims, 1 Drawing Sheet
Specification includes a Sequence Listing.

(56) References Cited

OTHER PUBLICATIONS

Tonu, N N et al., "Comparison of Positions of QTLs Conferring Resistance to *Xanthomonas campestris* pv. campestris in Brassica Oleracea" American Journal of Plant Sciences (2013) vol. 4, No. 8, p. 11-20.

\* cited by

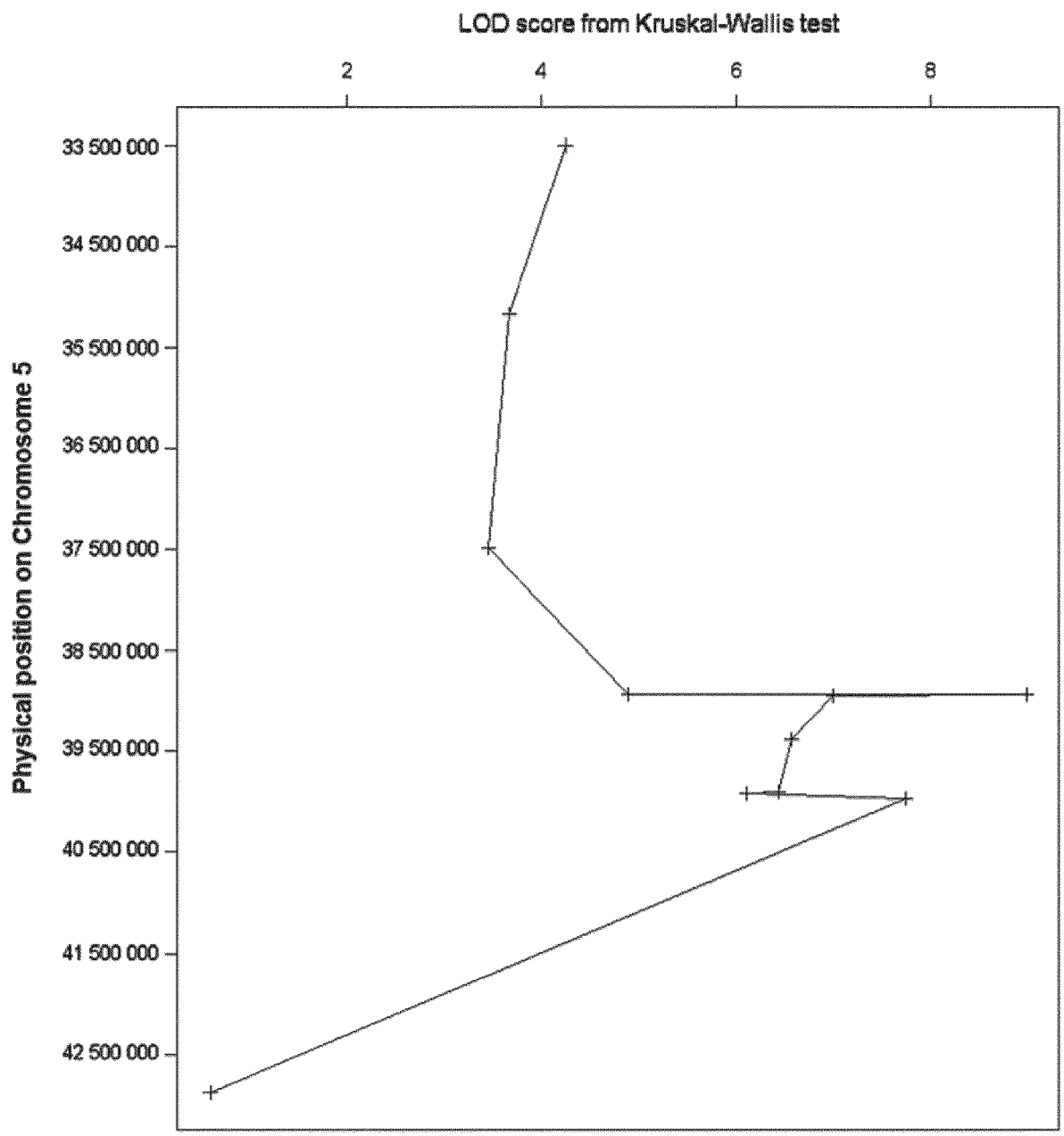

SEQUENCE LISTING

<160> NUMBER OF SEQ ID NOS: 132

<210> SEQ ID NO 1
<211> LENGTH: 121
<212> TYPE: DNA
<213> ORGANISM: Brassica oleracea

<400> SEQUENCE: 1
caaaacatca accaaaagta agaaagacta caaattactg aaaggatgat tttaataaca      60 kttttatac aaacggtcca cgaaaracat taataatttt gtaattttta aaattaggaa     120
a                                                                    121

<210> SEQ ID NO 2
<211> LENGTH: 121
<212> TYPE: DNA
<213> ORGANISM: Brassica oleracea

<400> SEQUENCE: 2
crgtggcgga accagccgca tctttcaccg gggtcaattt gattccgact ataaattgta      60
mkggmcawat tgatctaatt atatagcact tcaccagatt tattcaagta atttttwttt     120
t                                                                    121

<210> SEQ ID NO 3
<211> LENGTH: 121
<212> TYPE: DNA
<213> ORGANISM: Brassica oleracea

<400> SEQUENCE: 3 acttcattt ttcgttttat attaactttt tcttatcaac tcgtcattag tattcttttc      60
macgaatagg actcggttgt agaataaata aatcamaaca acatgtctta aaagtattat     120
a                                                                    121

<210> SEQ ID NO 4
<211> LENGTH: 121
<212> TYPE: DNA
<213> ORGANISM: Brassica oleracea

<400> SEQUENCE: 4
gattgccaac aagcacaagc tttttcagag tagtcatgtt tcctacaaga aaaggagaga      60
rcaagaatca ttatgctaat tgctatttta atgatgtcat atgtaaattc attaacaagc     120
a                                                                    121

<210> SEQ ID NO 5
<211> LENGTH: 121
<212> TYPE: DNA
<213> ORGANISM: Brassica oleracea

<400> SEQUENCE: 5
ctcttcatca tgcatacaga caagaagaat aaggtttctt gattaactct tcacacgaaa      60
rttctactag ttaaactcgc tttctatatc gttctaatca aagatcttga tcatggcaga     120
t                                                                    121

<210> SEQ ID NO 6
<211> LENGTH: 121
<212> TYPE: DNA
<213> ORGANISM: Brassica oleracea

<400> SEQUENCE: 6

```
caaaattgtt tttttcctgt ttgtattgtt tagagacggc ggcacaaacg catcaccggt    60
wcgagattcc ggttaggtta tcaggttttg ggtaaaccaa cggaattaat ttttgacatt   120
a                                                                  121
```

<210> SEQ ID NO 7
<211> LENGTH: 121
<212> TYPE: DNA
<213> ORGANISM: Brassica oleracea

<400> SEQUENCE: 7

```
gtcttgatac tgcggagatt ctccttcgag ctgtctccga cgtatactca cgcacctcac    60
mcggttctta cacttcatcc tcagtttggt gctccgttga tcttccacac gctccaagat   120
c                                                                  121
```

<210> SEQ ID NO 8
<211> LENGTH: 118
<212> TYPE: DNA
<213> ORGANISM: Brassica oleracea

<400> SEQUENCE: 8

```
ctgcaggaag caattcagga aaaygggaat gacaagttcc tcattgatgg tttccctcgc    60
aatgaggaaa accgagcggc atttgagaaa gttgtaagta gcattcaaag tgttttaa    118
```

<210> SEQ ID NO 9
<211> LENGTH: 121
<212> TYPE: DNA
<213> ORGANISM: Brassica oleracea

<400> SEQUENCE: 9

```
caggtataaa aaagaggtg cgagtgcaga aaccatggag aaaacaaagg ctgctgtgag    60
ycatctccac actagataca tcgttgacat gcaatccatg gattcaactg tctctgaagt   120
a                                                                  121
```

<210> SEQ ID NO 10
<211> LENGTH: 121
<212> TYPE: DNA
<213> ORGANISM: Brassica oleracea

<400> SEQUENCE: 10

```
tcatgattaa cctatctaag ccacatggcc atgaatgaat cgaaatgttt cctatgcctc    60
ytagctgaga tgatattccg aagctctttg tcaatgccga agaaccaccat tgctgcaggg   120 a                                                                  121
```

<210> SEQ ID NO 11
<211> LENGTH: 121
<212> TYPE: DNA
<213> ORGANISM: Brassica oleracea

<400> SEQUENCE: 11

```
caatcgtctg aaatgcgagg cacgaatata ggacttggcc aacctataga tcgagaaatc    60
ragaagcaaa ccagggtttt catcacgtaa ccacggatga gctgcaaaca cagaacatat   120
a                                                                  121
```

<210> SEQ ID NO 12
<211> LENGTH: 121
<212> TYPE: DNA

<213> ORGANISM: Brassica oleracea

<400> SEQUENCE: 12
catctcctga accagcagag atcacagtcg tgccaacggc gaacaagtgt atatgtaatg    60
mtaggaaggc tgaaactgaa aatggacagg gagttaaaaa cggcacacac tccactgcag   120
c                                                                  121

<210> SEQ ID NO 13
<211> LENGTH: 121
<212> TYPE: DNA
<213> ORGANISM: Brassica oleracea

<400> SEQUENCE: 13
cattttggga aaatgggttt ccgatcagct taacgcaaaa gtggttaaaa ataaagattt    60
ktgctcggac aaaagaaact gacaggagtt aactttgact tgaatttgga aataaaaaaa   120
a                                                                  121

<210> SEQ ID NO 14
<211> LENGTH: 121
<212> TYPE: DNA
<213> ORGANISM: Brassica oleracea

<400> SEQUENCE: 14
agcactttct ctcgagcaat aacaagccga aggttgaaga ggaaatattt catttctaat    60
ktaacctatt tttcattcca agaatgttaa ttaggataga tcctagaaaa ttcagacaat   120
a                                                                  121

<210> SEQ ID NO 15
<211> LENGTH: 121
<212> TYPE: DNA
<213> ORGANISM: Brassica oleracea
<220> FEATURE:
<221> NAME/KEY: misc_feature
<222> LOCATION: (117)..(117)
<223> OTHER INFORMATION: n is a, c, g, or t

<400> SEQUENCE: 15
tgcggtggag gttgtgcagt gcctgattga acatcataac gcgattttca cggatgcaga    60
sgagactgta tggaggtgaa acaacactt tgttgtggat gatgaattaa ccagtgngtt    120
t                                                                  121

<210> SEQ ID NO 16
<211> LENGTH: 121
<212> TYPE: DNA
<213> ORGANISM: Brassica oleracea

<400> SEQUENCE: 16
atctactatc gacctcaacg taattgggga aaaaactaac tcaaaagatc gcatagttgg    60
ygcacatttc ttcaggtgca tattcaatat ctcaaagatt ttccaagctt ttcgtatttt   120
t                                                                  121

<210> SEQ ID NO 17
<211> LENGTH: 121
<212> TYPE: DNA
<213> ORGANISM: Brassica oleracea

<400> SEQUENCE: 17
cgccgccctg aagagtactc ttccctcctc ctctgttccg ccgtcagttc ttcgtccggg    60

```
wgaaatggga gatgaggctg atgaattagg agaagatgac gaagttgaga agctgataca    120
g                                                                    121

<210> SEQ ID NO 18
<211> LENGTH: 121
<212> TYPE: DNA
<213> ORGANISM: Brassica oleracea

<400> SEQUENCE: 18
tcctctggtg atgttggtgt atccattgta cgcatcggtg gtggcaatgg agagcacaac    60
saaagtagac gatgagcagt ggcttgccta ctggatcatt tactccttcc tcaccctcac    120
t                                                                    121

<210> SEQ ID NO 19
<211> LENGTH: 121
<212> TYPE: DNA
<213> ORGANISM: Brassica oleracea

<400> SEQUENCE: 19
gagagagagc tcaaacacaa aaatggaggg aaccatctcg ccgctttgca tacgctcttc    60
rtcgagtctg tgttacttct ccagtaacgt ttcattggac tctcaccgtt cactaggatt    120
t                                                                    121

<210> SEQ ID NO 20
<211> LENGTH: 121
<212> TYPE: DNA
<213> ORGANISM: Brassica oleracea

<400> SEQUENCE: 20
gctcctctca tcaactcaaa taccactcac actcttcttc actctttgga tctgcttcag    60
ygacaatgtt caaggcaacc agtgttcaga tcaccaagtc tcagtaaagg acgtagaaga    120
t                                                                    121

<210> SEQ ID NO 21
<211> LENGTH: 121
<212> TYPE: DNA
<213> ORGANISM: Brassica oleracea
<220> FEATURE:
<221> NAME/KEY: misc_feature
<222> LOCATION: (99)..(99)
<223> OTHER INFORMATION: n is a, c, g, or t

<400> SEQUENCE: 21
agtggggacg attaaagggg tgtacaatta ttggctcggt ggtacggagg aggtgaagcc    60
raaatctcca aattcagttg aagagtcatc acaaccacnt tagcccctcc gttgggacta    120
a                                                                    121

<210> SEQ ID NO 22
<211> LENGTH: 121
<212> TYPE: DNA
<213> ORGANISM: Brassica oleracea
<220> FEATURE:
<221> NAME/KEY: misc_feature
<222> LOCATION: (16)..(16)
<223> OTHER INFORMATION: n is a, c, g, or t

<400> SEQUENCE: 22
tgcattcggc aaaganttca cccaccagac ttcccggaga cgaaattttt ccgacaagaa    60
```

```
rtgatgatat gaaagtcgag attgggtcgg gaagaggctt gccgacagaa actgatgatc    120
a                                                                   121

<210> SEQ ID NO 23
<211> LENGTH: 121
<212> TYPE: DNA
<213> ORGANISM: Brassica oleracea
<220> FEATURE:
<221> NAME/KEY: misc_feature
<222> LOCATION: (86)..(86)
<223> OTHER INFORMATION: a, g, c, or t

<400> SEQUENCE: 23
gtgcagagat tgactgcatt ggaagcagaa ctttgcagag ttgattcaag tgatccaacc    60
ktggtctcag caattctcga tgcatncaca cagaatccgc accttaaaca gcagagtgct   120
t                                                                   121

<210> SEQ ID NO 24
<211> LENGTH: 121
<212> TYPE: DNA
<213> ORGANISM: Brassica oleracea
<220> FEATURE:
<221> NAME/KEY: misc_feature
<222> LOCATION: (94)..(94)
<223> OTHER INFORMATION: a, g, c, or t
<220> FEATURE:
<221> NAME/KEY: misc_feature
<222> LOCATION: (121)..(121)
<223> OTHER INFORMATION: a, g, c, or t

<400> SEQUENCE: 24
tgtgttgatg gatggtgcag cacaagacaa gattgcggat tttgagatga agctgatgga    60
yatcgacagt gagcatttag gaatccctga cgcngagtac cactctattg tgaggatgcc   120 n                                                                   121

<210> SEQ ID NO 25
<211> LENGTH: 121
<212> TYPE: DNA
<213> ORGANISM: Brassica oleracea
<220> FEATURE:
<221> NAME/KEY: misc_feature
<222> LOCATION: (1)..(1)
<223> OTHER INFORMATION: a, g, c, or t
<220> FEATURE:
<221> NAME/KEY: misc_feature
<222> LOCATION: (34)..(34)
<223> OTHER INFORMATION: a, g, c, or t

<400> SEQUENCE: 25
natcgacagt gagcatttag gaatccctga cgcngagtac cactctattg tgaggatgcc    60
ytctggtgaa ttttccagga tatgcaaaga tctcagtagc attggtgaca caggtattat   120
a                                                                   121

<210> SEQ ID NO 26
<211> LENGTH: 121
<212> TYPE: DNA
<213> ORGANISM: Brassica oleracea

<400> SEQUENCE: 26
taagccccaa tggtgatccg acggcagagt ttccttgatc ttgtcaagtc ttttgaggat    60
ktccagaaac gatggtctct ggttcatgtc agcgtcccag catttcacta ttaagtctct   120
t                                                                   121
```

<210> SEQ ID NO 27
<211> LENGTH: 121
<212> TYPE: DNA
<213> ORGANISM: Brassica oleracea

<400> SEQUENCE: 27
cgcgcattac agctagattc cgcagaagaa aacaatggag ttggagttgt cattccgaca    60
katcagaact cagatggagt tgagatagtg gataaaatgg atgaagacct gaaagatgag   120
g                                                                  121

<210> SEQ ID NO 28
<211> LENGTH: 212
<212> TYPE: DNA
<213> ORGANISM: Brassica oleracea
<220> FEATURE:
<221> NAME/KEY: misc_feature
<222> LOCATION: (211)..(211)
<223> OTHER INFORMATION: a, g, c, or t

<400> SEQUENCE: 28
gtgatcagag cttcaacgag cgacaacasa accagcttac aagtcaagga gacacagaac    60
agcaccacga tgaggaggga tctcatgttc acagctgctg ctgcggccgt ttgttccttg   120
gctaaggtag ccatggcaga cgaggaggag cccaaacgag ggacagatgc agctaagaag   180
aagtacgctc aagtttgtgt cacaatgccg nc                                 212

<210> SEQ ID NO 29
<211> LENGTH: 121
<212> TYPE: DNA
<213> ORGANISM: Brassica oleracea

<400> SEQUENCE: 29
gagatgggag tgaaatggga cctaagagac agagaatgat tgaacaagct cctcctccag    60
kaacattcta cggacctcat cccggttccg cctttatgtt taacccctac ggattcgttc   120
c                                                                  121

<210> SEQ ID NO 30
<211> LENGTH: 211
<212> TYPE: DNA
<213> ORGANISM: Brassica oleracea

<400> SEQUENCE: 30
acctctcgtg cggaagaaga agttgaatta ctgctaagct ggttattctt tattttctg     60 raccaacata agaaatata cgccatgagc accatcaaaa gcaaagctat gcctatgctt    120
aactcaatgg caactttatt cgaactagat gaatggcttg ttgtgcttg cacgatacat    180 tgatttagtt tcagctcctt gatacctcca c                                 211

<210> SEQ ID NO 31
<211> LENGTH: 121
<212> TYPE: DNA
<213> ORGANISM: Brassica oleracea

<400> SEQUENCE: 31
gtcactcttg tctcctctga tattctctga tcaccccaag agacccggcg acgaagaccc    60
rtcaccccct tacaacatgc taagaaacgt tttggacatg aatgctcaat acggtggcct   120
c                                                                  121

<210> SEQ ID NO 32
<211> LENGTH: 121
<212> TYPE: DNA
<213> ORGANISM: Brassica oleracea

<400> SEQUENCE: 32
caatacaagg aaaaagcttg acaaggatcg gcttagcacg gagtcgaacg caaaagtgca    60
matcatgaag agtctcttgc cactcattga tagttttgag agcgctaggc aacagattaa   120
a                                                                  121

<210> SEQ ID NO 33
<211> LENGTH: 289
<212> TYPE: DNA
<213> ORGANISM: Brassica oleracea

<400> SEQUENCE: 33
cgctggatac tcttcgtacc ctgtgattcc tgtaatccta atcctcgtat ttggctgcat    60
yaycaagaca aaaatcacaa tgcaattgtt attatttaca gttctatgtg taccaaatca   120
tacgaactaa ctgatactag tatgtgcgga ttacattata tctagctaaa ggaaaagatg   180
actttgaaca acagagagca gtrratacct gtcggtgacc gatatttctg cggtatttct   240
tcttgggctt gtacttgaag acgactactt tatyattcag accctgcag              289

<210> SEQ ID NO 34
<211> LENGTH: 25
<212> TYPE: DNA
<213> ORGANISM: Unknown
<220> FEATURE:
<223> OTHER INFORMATION: Forward primer

<400> SEQUENCE: 34
gaatatgcac ctgaagaaat gtgcg                                          25

<210> SEQ ID NO 35
<211> LENGTH: 25
<212> TYPE: DNA
<213> ORGANISM: Unknown
<220> FEATURE:
<223> OTHER INFORMATION: Forward primer

<400> SEQUENCE: 35
gaatatgcac ctgaagaaat gtgca                                          25

<210> SEQ ID NO 36
<211> LENGTH: 29
<212> TYPE: DNA
<213> ORGANISM: Unknown
<220> FEATURE:
<223> OTHER INFORMATION: Reverse primer

<400> SEQUENCE: 36
gacctcaacg taattgggga aaaaactaa                                      29

<210> SEQ ID NO 37
<211> LENGTH: 22
<212> TYPE: DNA
<213> ORGANISM: Unknown
<220> FEATURE:
<223> OTHER INFORMATION: Forward primer

<400> SEQUENCE: 37
atcagcctca tctcccattt ca                                             22

```
<210> SEQ ID NO 38
<211> LENGTH: 22
<212> TYPE: DNA
<213> ORGANISM: Unknown
<220> FEATURE:
<223> OTHER INFORMATION: Forward primer

<400> SEQUENCE: 38
atcagcctca tctcccattt ct                                              22

<210> SEQ ID NO 39
<211> LENGTH: 25
<212> TYPE: DNA
<213> ORGANISM: Unknown
<220> FEATURE:
<223> OTHER INFORMATION: Reverse primer

<400> SEQUENCE: 39
agtactcttc cctcctcctc tgttc                                           25

<210> SEQ ID NO 40
<211> LENGTH: 19
<212> TYPE: DNA
<213> ORGANISM: Unknown
<220> FEATURE:
<223> OTHER INFORMATION: Forward primer

<400> SEQUENCE: 40
ggcaatggag agcacaacg                                                  19

<210> SEQ ID NO 41
<211> LENGTH: 19
<212> TYPE: DNA
<213> ORGANISM: Unknown
<220> FEATURE:
<223> OTHER INFORMATION: Forward primer

<400> SEQUENCE: 41
ggcaatggag agcacaacc                                                  19

<210> SEQ ID NO 42
<211> LENGTH: 20
<212> TYPE: DNA
<213> ORGANISM: Unknown
<220> FEATURE:
<223> OTHER INFORMATION: Reverse primer

<400> SEQUENCE: 42
agtaggcaag ccactgctca                                                 20

<210> SEQ ID NO 43
<211> LENGTH: 25
<212> TYPE: DNA
<213> ORGANISM: Unknown
<220> FEATURE:
<223> OTHER INFORMATION: Forward primer

<400> SEQUENCE: 43
actggagaag taacacagac tcgat                                           25

<210> SEQ ID NO 44
<211> LENGTH: 22
<212> TYPE: DNA
<213> ORGANISM: Unknown
<220> FEATURE:
```

<223> OTHER INFORMATION: Forward primer

<400> SEQUENCE: 44
ggagaagtaa cacagactcg ac                                    22

<210> SEQ ID NO 45
<211> LENGTH: 23
<212> TYPE: DNA
<213> ORGANISM: Unknown
<220> FEATURE:
<223> OTHER INFORMATION: Reverse primer

<400> SEQUENCE: 45
ctcgccgctt tgcatacgct ctt                                   23

<210> SEQ ID NO 46
<211> LENGTH: 22
<212> TYPE: DNA
<213> ORGANISM: Unknown
<220> FEATURE:
<223> OTHER INFORMATION: Forward primer

<400> SEQUENCE: 46
cactctttgg atctgcttca gc                                    22

<210> SEQ ID NO 47
<211> LENGTH: 23
<212> TYPE: DNA
<213> ORGANISM: Unknown
<220> FEATURE:
<223> OTHER INFORMATION: Forward primer

<400> SEQUENCE: 47
tcactctttg gatctgcttc agt                                   23

<210> SEQ ID NO 48
<211> LENGTH: 26
<212> TYPE: DNA
<213> ORGANISM: Unknown
<220> FEATURE:
<223> OTHER INFORMATION: Reverse primer

<400> SEQUENCE: 48
gtgatctgaa cactggttgc cttgaa                                26

<210> SEQ ID NO 49
<211> LENGTH: 29
<212> TYPE: DNA
<213> ORGANISM: Unknown
<220> FEATURE:
<223> OTHER INFORMATION: Forward primer

<400> SEQUENCE: 49
atgactcttc aactgaattt ggagatttt                             29

<210> SEQ ID NO 50
<211> LENGTH: 27
<212> TYPE: DNA
<213> ORGANISM: Unknown
<220> FEATURE:
<223> OTHER INFORMATION: Forward primer

<400> SEQUENCE: 50
gactcttcaa ctgaatttgg agatttc                               27

```
<210> SEQ ID NO 51
<211> LENGTH: 26
<212> TYPE: DNA
<213> ORGANISM: Unknown
<220> FEATURE:
<223> OTHER INFORMATION: Reverse primer

<400> SEQUENCE: 51
ggtgtacaat tattggctcg gtggta                                            26

<210> SEQ ID NO 52
<211> LENGTH: 25
<212> TYPE: DNA
<213> ORGANISM: Unknown
<220> FEATURE:
<223> OTHER INFORMATION: Forward primer

<400> SEQUENCE: 52
ccaatctcga ctttcatatc atcac                                             25

<210> SEQ ID NO 53
<211> LENGTH: 27
<212> TYPE: DNA
<213> ORGANISM: Unknown
<220> FEATURE:
<223> OTHER INFORMATION: Forward primer

<400> SEQUENCE: 53
acccaatctc gactttcata tcatcat                                           27

<210> SEQ ID NO 54
<211> LENGTH: 25
<212> TYPE: DNA
<213> ORGANISM: Unknown
<220> FEATURE:
<223> OTHER INFORMATION: Reverse primer

<400> SEQUENCE: 54
accagacttc ccggagacga aattt                                             25

<210> SEQ ID NO 55
<211> LENGTH: 20
<212> TYPE: DNA
<213> ORGANISM: Unknown
<220> FEATURE:
<223> OTHER INFORMATION: Forward primer

<400> SEQUENCE: 55
tgattcaagt gatccaaccg                                                   20

<210> SEQ ID NO 56
<211> LENGTH: 21
<212> TYPE: DNA
<213> ORGANISM: Unknown
<220> FEATURE:
<223> OTHER INFORMATION: Forward primer

<400> SEQUENCE: 56
ttgattcaag tgatccaacc t                                                 21

<210> SEQ ID NO 57
<211> LENGTH: 24
<212> TYPE: DNA
<213> ORGANISM: Unknown
<220> FEATURE:
<223> OTHER INFORMATION: Reverse primer
```

<400> SEQUENCE: 57
ctgtttaagg tgcggattct gtgt                                          24

<210> SEQ ID NO 58
<211> LENGTH: 25
<212> TYPE: DNA
<213> ORGANISM: Unknown
<220> FEATURE:
<223> OTHER INFORMATION: Forward primer

<400> SEQUENCE: 58
gattcctaaa tgctcactgt cgatg                                         25

<210> SEQ ID NO 59
<211> LENGTH: 21
<212> TYPE: DNA
<213> ORGANISM: Unknown
<220> FEATURE:
<223> OTHER INFORMATION: Forward primer

<400> SEQUENCE: 59
cctaaatgct cactgtcgat a                                             21

<210> SEQ ID NO 60
<211> LENGTH: 25
<212> TYPE: DNA
<213> ORGANISM: Unknown
<220> FEATURE:
<223> OTHER INFORMATION: Reverse primer

<400> SEQUENCE: 60
gcagcacaag acaagattgc ggatt                                         25

<210> SEQ ID NO 61
<211> LENGTH: 22
<212> TYPE: DNA
<213> ORGANISM: Unknown
<220> FEATURE:
<223> OTHER INFORMATION: Forward primer

<400> SEQUENCE: 61
ccactctatt gtgaggatgc cc                                            22

<210> SEQ ID NO 62
<211> LENGTH: 23
<212> TYPE: DNA
<213> ORGANISM: Unknown
<220> FEATURE:
<223> OTHER INFORMATION: Forward primer

<400> SEQUENCE: 62
accactctat tgtgaggatg cct                                           23

<210> SEQ ID NO 63
<211> LENGTH: 28
<212> TYPE: DNA
<213> ORGANISM: Unknown
<220> FEATURE:
<223> OTHER INFORMATION: Reverse primer

<400> SEQUENCE: 63
tcaccaatgc tactgagatc tttgcata                                      28

<210> SEQ ID NO 64
<211> LENGTH: 24

```
<212> TYPE: DNA
<213> ORGANISM: Unknown
<220> FEATURE:
<223> OTHER INFORMATION: Forward primer

<400> SEQUENCE: 64
atcttgtcaa gtcttttgag gatg                                           24

<210> SEQ ID NO 65
<211> LENGTH: 24
<212> TYPE: DNA
<213> ORGANISM: Unknown
<220> FEATURE:
<223> OTHER INFORMATION: Forward primer

<400> SEQUENCE: 65
atcttgtcaa gtcttttgag gatt                                           24

<210> SEQ ID NO 66
<211> LENGTH: 19
<212> TYPE: DNA
<213> ORGANISM: Unknown
<220> FEATURE:
<223> OTHER INFORMATION: Reverse primer

<400> SEQUENCE: 66
ctgggacgct gacatgaac                                                 19

<210> SEQ ID NO 67
<211> LENGTH: 24
<212> TYPE: DNA
<213> ORGANISM: Unknown
<220> FEATURE:
<223> OTHER INFORMATION: Forward primer

<400> SEQUENCE: 67
gagttggagt tgtcattccg acat                                           24

<210> SEQ ID NO 68
<211> LENGTH: 23
<212> TYPE: DNA
<213> ORGANISM: Unknown
<220> FEATURE:
<223> OTHER INFORMATION: Forward primer

<400> SEQUENCE: 68
agttggagtt gtcattccga cag                                            23

<210> SEQ ID NO 69
<211> LENGTH: 30
<212> TYPE: DNA
<213> ORGANISM: Unknown
<220> FEATURE:
<223> OTHER INFORMATION: Reverse primer

<400> SEQUENCE: 69
catccatttt atccactatc tcaactccat                                     30

<210> SEQ ID NO 70
<211> LENGTH: 25
<212> TYPE: DNA
<213> ORGANISM: Unknown
<220> FEATURE:
<223> OTHER INFORMATION: Forward primer

<400> SEQUENCE: 70
```
gtctccttga cttgtaagct ggttg                                  25

<210> SEQ ID NO 71
<211> LENGTH: 25
<212> TYPE: DNA
<213> ORGANISM: Unknown
<220> FEATURE:
<223> OTHER INFORMATION: Forward primer

<400> SEQUENCE: 71
gtctccttga cttgtaagct ggttc                                  25

<210> SEQ ID NO 72
<211> LENGTH: 21
<212> TYPE: DNA
<213> ORGANISM: Unknown
<220> FEATURE:
<223> OTHER INFORMATION: Reverse primer

<400> SEQUENCE: 72
agagcttcaa cgagcgacaa c                                      21

<210> SEQ ID NO 73
<211> LENGTH: 23
<212> TYPE: DNA
<213> ORGANISM: Unknown
<220> FEATURE:
<223> OTHER INFORMATION: Forward primer

<400> SEQUENCE: 73
attgaacaag ctcctcctcc agt                                    23

<210> SEQ ID NO 74
<211> LENGTH: 20
<212> TYPE: DNA
<213> ORGANISM: Unknown
<220> FEATURE:
<223> OTHER INFORMATION: Forward primer

<400> SEQUENCE: 74
gaacaagctc ctcctccagg                                        20

<210> SEQ ID NO 75
<211> LENGTH: 23
<212> TYPE: DNA
<213> ORGANISM: Unknown
<220> FEATURE:
<223> OTHER INFORMATION: Reverse primer

<400> SEQUENCE: 75
gaaccgggat gaggtccgta gaa                                    23

<210> SEQ ID NO 76
<211> LENGTH: 29
<212> TYPE: DNA
<213> ORGANISM: Unknown
<220> FEATURE:
<223> OTHER INFORMATION: Forward primer

<400> SEQUENCE: 76
atgactcttc aactgaattt ggagatttt                              29

<210> SEQ ID NO 77
<211> LENGTH: 27
<212> TYPE: DNA
<213> ORGANISM: Unknown

-continued

```
<220> FEATURE:
<223> OTHER INFORMATION: Forward primer

<400> SEQUENCE: 77
gactcttcaa ctgaatttgg agatttc                                    27

<210> SEQ ID NO 78
<211> LENGTH: 26
<212> TYPE: DNA
<213> ORGANISM: Unknown
<220> FEATURE:
<223> OTHER INFORMATION: Reverse primer

<400> SEQUENCE: 78
ggtgtacaat tattggctcg gtggta                                     26

<210> SEQ ID NO 79
<211> LENGTH: 18
<212> TYPE: DNA
<213> ORGANISM: Unknown
<220> FEATURE:
<223> OTHER INFORMATION: Forward primer

<400> SEQUENCE: 79
cccggcgacg aagacccg                                              18

<210> SEQ ID NO 80
<211> LENGTH: 19
<212> TYPE: DNA
<213> ORGANISM: Unknown
<220> FEATURE:
<223> OTHER INFORMATION: Forward primer

<400> SEQUENCE: 80
acccggcgac gaagaccca                                             19

<210> SEQ ID NO 81
<211> LENGTH: 30
<212> TYPE: DNA
<213> ORGANISM: Unknown
<220> FEATURE:
<223> OTHER INFORMATION: Reverse primer

<400> SEQUENCE: 81
catgtccaaa acgtttctta gcatgttgta                                 30

<210> SEQ ID NO 82
<211> LENGTH: 25
<212> TYPE: DNA
<213> ORGANISM: Unknown
<220> FEATURE:
<223> OTHER INFORMATION: Forward primer

<400> SEQUENCE: 82
gagtggcaag agactcttca tgatt                                      25

<210> SEQ ID NO 83
<211> LENGTH: 24
<212> TYPE: DNA
<213> ORGANISM: Unknown
<220> FEATURE:
<223> OTHER INFORMATION: Forward primer

<400> SEQUENCE: 83
agtggcaaga gactcttcat gatg                                       24
```

<210> SEQ ID NO 84
<211> LENGTH: 26
<212> TYPE: DNA
<213> ORGANISM: Unknown
<220> FEATURE:
<223> OTHER INFORMATION: Reverse primer

<400> SEQUENCE: 84
ggaaaaagct tgacaaggat cggctt                                          26

<210> SEQ ID NO 85
<211> LENGTH: 25
<212> TYPE: DNA
<213> ORGANISM: Unknown
<220> FEATURE:
<223> OTHER INFORMATION: Forward primer

<400> SEQUENCE: 85
cctaatcctc gtatttggct gcatt                                           25

<210> SEQ ID NO 86
<211> LENGTH: 24
<212> TYPE: DNA
<213> ORGANISM: Unknown
<220> FEATURE:
<223> OTHER INFORMATION: Forward primer

<400> SEQUENCE: 86
ctaatcctcg tatttggctg catc                                            24

<210> SEQ ID NO 87
<211> LENGTH: 30
<212> TYPE: DNA
<213> ORGANISM: Unknown
<220> FEATURE:
<223> OTHER INFORMATION: Reverse primer

<400> SEQUENCE: 87
ggtacacata gaactgtaaa taataacaat                                      30

<210> SEQ ID NO 88
<211> LENGTH: 32
<212> TYPE: DNA
<213> ORGANISM: Unknown
<220> FEATURE:
<223> OTHER INFORMATION: Forward primer

<400> SEQUENCE: 88
acaaattact gaaaggatga ttttaataac at                                   32

<210> SEQ ID NO 89
<211> LENGTH: 32
<212> TYPE: DNA
<213> ORGANISM: Unknown
<220> FEATURE:
<223> OTHER INFORMATION: Forward primer

<400> SEQUENCE: 89
acaaattact gaaaggatga ttttaataac ag                                   32

<210> SEQ ID NO 90
<211> LENGTH: 30
<212> TYPE: DNA
<213> ORGANISM: Unknown
<220> FEATURE:
<223> OTHER INFORMATION: Reverse primer

```
<400> SEQUENCE: 90
acaaaattat taatgtyttt cgtggaccgt                                   30

<210> SEQ ID NO 91
<211> LENGTH: 29
<212> TYPE: DNA
<213> ORGANISM: Unknown
<220> FEATURE:
<223> OTHER INFORMATION: Forward primer

<400> SEQUENCE: 91
gtcaatttga ttccgactat aaattgtac                                    29

<210> SEQ ID NO 92
<211> LENGTH: 30
<212> TYPE: DNA
<213> ORGANISM: Unknown
<220> FEATURE:
<223> OTHER INFORMATION: Forward primer

<400> SEQUENCE: 92
ggtcaatttg attccgacta taaattgtaa                                   30

<210> SEQ ID NO 93
<211> LENGTH: 30
<212> TYPE: DNA
<213> ORGANISM: Unknown
<220> FEATURE:
<223> OTHER INFORMATION: Reverse primer

<400> SEQUENCE: 93
tacttgaata aatctggtga agtgctatat                                   30

<210> SEQ ID NO 94
<211> LENGTH: 27
<212> TYPE: DNA
<213> ORGANISM: Unknown
<220> FEATURE:
<223> OTHER INFORMATION: Forward primer

<400> SEQUENCE: 94
atcaactcgt cattagtatt cttttcc                                      27

<210> SEQ ID NO 95
<211> LENGTH: 28
<212> TYPE: DNA
<213> ORGANISM: Unknown
<220> FEATURE:
<223> OTHER INFORMATION: Forward primer

<400> SEQUENCE: 95
tatcaactcg tcattagtat tcttttca                                     28

<210> SEQ ID NO 96
<211> LENGTH: 30
<212> TYPE: DNA
<213> ORGANISM: Unknown
<220> FEATURE:
<223> OTHER INFORMATION: Reverse primer

<400> SEQUENCE: 96
acatgttgtt ktgatttatt tattctacaa                                   30

<210> SEQ ID NO 97
```

```
<211> LENGTH: 29
<212> TYPE: DNA
<213> ORGANISM: Unknown
<220> FEATURE:
<223> OTHER INFORMATION: Forward primer

<400> SEQUENCE: 97
aaaatagcaa ttagcataat gattcttgc                                            29

<210> SEQ ID NO 98
<211> LENGTH: 33
<212> TYPE: DNA
<213> ORGANISM: Unknown
<220> FEATURE:
<223> OTHER INFORMATION: Forward primer

<400> SEQUENCE: 98
cattaaaata gcaattagca taatgattct tgt                                       33

<210> SEQ ID NO 99
<211> LENGTH: 29
<212> TYPE: DNA
<213> ORGANISM: Unknown
<220> FEATURE:
<223> OTHER INFORMATION: Reverse primer

<400> SEQUENCE: 99
gcacaagctt tttcagagta gtcatgttt                                            29

<210> SEQ ID NO 100
<211> LENGTH: 30
<212> TYPE: DNA
<213> ORGANISM: Unknown
<220> FEATURE:
<223> OTHER INFORMATION: Forward primer

<400> SEQUENCE: 100
gatatagaaa gcgagtttaa ctagtagaat                                           30

<210> SEQ ID NO 101
<211> LENGTH: 29
<212> TYPE: DNA
<213> ORGANISM: Unknown
<220> FEATURE:
<223> OTHER INFORMATION: Forward primer

<400> SEQUENCE: 101
atatagaaag cgagtttaac tagtagaac                                            29

<210> SEQ ID NO 102
<211> LENGTH: 30
<212> TYPE: DNA
<213> ORGANISM: Unknown
<220> FEATURE:
<223> OTHER INFORMATION: Reverse primer

<400> SEQUENCE: 102
tgcatacaga caagaagaat aaggtttctt                                           30

<210> SEQ ID NO 103
<211> LENGTH: 24
<212> TYPE: DNA
<213> ORGANISM: Unknown
<220> FEATURE:
<223> OTHER INFORMATION: Forward primer

<400> SEQUENCE: 103
```
ctgataacct aaccggaatc tcga                                          24

<210> SEQ ID NO 104
<211> LENGTH: 22
<212> TYPE: DNA
<213> ORGANISM: Unknown
<220> FEATURE:
<223> OTHER INFORMATION: Forward primer

<400> SEQUENCE: 104
gataacctaa ccggaatctc gt                                            22

<210> SEQ ID NO 105
<211> LENGTH: 26
<212> TYPE: DNA
<213> ORGANISM: Unknown
<220> FEATURE:
<223> OTHER INFORMATION: Reverse primer

<400> SEQUENCE: 105
gtttgtattg tttagagacg gcggca                                        26

<210> SEQ ID NO 106
<211> LENGTH: 22
<212> TYPE: DNA
<213> ORGANISM: Unknown
<220> FEATURE:
<223> OTHER INFORMATION: Forward primer

<400> SEQUENCE: 106
acgtatactc acgcacctca cc                                            22

<210> SEQ ID NO 107
<211> LENGTH: 23
<212> TYPE: DNA
<213> ORGANISM: Unknown
<220> FEATURE:
<223> OTHER INFORMATION: Forward primer

<400> SEQUENCE: 107
gacgtatact cacgcacctc aca                                           23

<210> SEQ ID NO 108
<211> LENGTH: 25
<212> TYPE: DNA
<213> ORGANISM: Unknown
<220> FEATURE:
<223> OTHER INFORMATION: Reverse primer

<400> SEQUENCE: 108
tgtggaagat caacggagca ccaaa                                         25

<210> SEQ ID NO 109
<211> LENGTH: 22
<212> TYPE: DNA
<213> ORGANISM: Unknown
<220> FEATURE:
<223> OTHER INFORMATION: Forward primer

<400> SEQUENCE: 109
gcaggaagca attcaggaaa at                                            22

<210> SEQ ID NO 110
<211> LENGTH: 24
<212> TYPE: DNA

```
<213> ORGANISM: Unknown
<220> FEATURE:
<223> OTHER INFORMATION: Forward primer

<400> SEQUENCE: 110
ctgcaggaag caattcagga aaac                                          24

<210> SEQ ID NO 111
<211> LENGTH: 25
<212> TYPE: DNA
<213> ORGANISM: Unknown
<220> FEATURE:
<223> OTHER INFORMATION: Reverse primer

<400> SEQUENCE: 111
tgcgagggaa accatcaatg aggaa                                         25

<210> SEQ ID NO 112
<211> LENGTH: 25
<212> TYPE: DNA
<213> ORGANISM: Unknown
<220> FEATURE:
<223> OTHER INFORMATION: Forward primer

<400> SEQUENCE: 112
aacgatgtat ctagtgtgga gatgg                                         25

<210> SEQ ID NO 113
<211> LENGTH: 26
<212> TYPE: DNA
<213> ORGANISM: Unknown
<220> FEATURE:
<223> OTHER INFORMATION: Forward primer

<400> SEQUENCE: 113
caacgatgta tctagtgtgg agatga                                        26

<210> SEQ ID NO 114
<211> LENGTH: 25
<212> TYPE: DNA
<213> ORGANISM: Unknown
<220> FEATURE:
<223> OTHER INFORMATION: Reverse primer

<400> SEQUENCE: 114
tgcgagtgca gaaaccatgg agaaa                                         25

<210> SEQ ID NO 115
<211> LENGTH: 25
<212> TYPE: DNA
<213> ORGANISM: Unknown
<220> FEATURE:
<223> OTHER INFORMATION: Forward primer

<400> SEQUENCE: 115
gaatcgaaat gtttcctatg cctcc                                         25

<210> SEQ ID NO 116
<211> LENGTH: 27
<212> TYPE: DNA
<213> ORGANISM: Unknown
<220> FEATURE:
<223> OTHER INFORMATION: Forward primer

<400> SEQUENCE: 116
atgaatcgaa atgtttccta tgcctct                                       27
```

<210> SEQ ID NO 117
<211> LENGTH: 25
<212> TYPE: DNA
<213> ORGANISM: Unknown
<220> FEATURE:
<223> OTHER INFORMATION: Reverse primer

<400> SEQUENCE: 117
cggcattgac aaagagcttc ggaat                                              25

<210> SEQ ID NO 118
<211> LENGTH: 25
<212> TYPE: DNA
<213> ORGANISM: Unknown
<220> FEATURE:
<223> OTHER INFORMATION: Forward primer

<400> SEQUENCE: 118
ggccaaccta tagatcgaga aatca                                              25

<210> SEQ ID NO 119
<211> LENGTH: 24
<212> TYPE: DNA
<213> ORGANISM: Unknown
<220> FEATURE:
<223> OTHER INFORMATION: Forward primer

<400> SEQUENCE: 119
gccaacctat agatcgagaa atcg                                               24

<210> SEQ ID NO 120
<211> LENGTH: 25
<212> TYPE: DNA
<213> ORGANISM: Unknown
<220> FEATURE:
<223> OTHER INFORMATION: Reverse primer

<400> SEQUENCE: 120
gctcatccgt ggttacgtga tgaaa                                              25

<210> SEQ ID NO 121
<211> LENGTH: 27
<212> TYPE: DNA
<213> ORGANISM: Unknown
<220> FEATURE:
<223> OTHER INFORMATION: Forward primer

<400> SEQUENCE: 121
aacggcgaac aagtgtatat gtaatga                                            27

<210> SEQ ID NO 122
<211> LENGTH: 25
<212> TYPE: DNA
<213> ORGANISM: Unknown
<220> FEATURE:
<223> OTHER INFORMATION: Forward primer

<400> SEQUENCE: 122
cggcgaacaa gtgtatatgt aatgc                                              25

<210> SEQ ID NO 123
<211> LENGTH: 25
<212> TYPE: DNA
<213> ORGANISM: Unknown
<220> FEATURE:

```
<223> OTHER INFORMATION: Reverse primer

<400> SEQUENCE: 123
gtgccgtttt taactccctg tccat                                          25

<210> SEQ ID NO 124
<211> LENGTH: 25
<212> TYPE: DNA
<213> ORGANISM: Unknown
<220> FEATURE:
<223> OTHER INFORMATION: Forward primer

<400> SEQUENCE: 124
ctgtcagttt cttttgtccg agcaa                                          25

<210> SEQ ID NO 125
<211> LENGTH: 23
<212> TYPE: DNA
<213> ORGANISM: Unknown
<220> FEATURE:
<223> OTHER INFORMATION: Forward primer

<400> SEQUENCE: 125
gtcagtttct tttgtccgag cac                                            23

<210> SEQ ID NO 126
<211> LENGTH: 25
<212> TYPE: DNA
<213> ORGANISM: Unknown
<220> FEATURE:
<223> OTHER INFORMATION: Reverse primer

<400> SEQUENCE: 126
gggtttccga tcagcttaac gcaaa                                          25

<210> SEQ ID NO 127
<211> LENGTH: 32
<212> TYPE: DNA
<213> ORGANISM: Unknown
<220> FEATURE:
<223> OTHER INFORMATION: Forward primer

<400> SEQUENCE: 127
aattaacatt cttggaatga aaataggtt ac                                   32

<210> SEQ ID NO 128
<211> LENGTH: 32
<212> TYPE: DNA
<213> ORGANISM: Unknown
<220> FEATURE:
<223> OTHER INFORMATION: Forward primer

<400> SEQUENCE: 128
aattaacatt cttggaatga aaataggtt aa                                   32

<210> SEQ ID NO 129
<211> LENGTH: 28
<212> TYPE: DNA
<213> ORGANISM: Unknown
<220> FEATURE:
<223> OTHER INFORMATION: Reverse primer

<400> SEQUENCE: 129
aataacaagc cgaaggttga agaggaaa                                       28
```

```
<210> SEQ ID NO 130
<211> LENGTH: 22
<212> TYPE: DNA
<213> ORGANISM: Unknown
<220> FEATURE:
<223> OTHER INFORMATION: Forward primer

<400> SEQUENCE: 130
cgcgattttc acggatgcag ac                                              22

<210> SEQ ID NO 131
<211> LENGTH: 22
<212> TYPE: DNA
<213> ORGANISM: Unknown
<220> FEATURE:
<223> OTHER INFORMATION: Forward primer

<400> SEQUENCE: 131
cgcgattttc acggatgcag ag                                              22

<210> SEQ ID NO 132
<211> LENGTH: 29
<212> TYPE: DNA
<213> ORGANISM: Unknown
<220> FEATURE:
<223> OTHER INFORMATION: Reverse primer

<400> SEQUENCE: 132
cacaacaaag tgttgttttc acctccata                                       29
```

RESISTANCE TO *XANTHOMONAS CAMPESTRIS* PV. CAMPESTRIS (*XCC*) IN CAULIFLOWER

CROSS REFERENCE TO RELATED APPLICATIONS

This application is a national stage entry under 35 U.S.C. § 371 of PCT Patent Application No. PCT/EP2019/071487, filed 9 Aug. 2019, which claims the benefit of priority to EP Application Serial No. 18306106.8, filed 10 Aug. 2018, the entire contents of which are hereby incorporated by reference herein.

SEQUENCE LISTING

The instant application contains a Sequence Listing which has been submitted electronically in ASCII format and is hereby incorporated by reference in its entirety. Said ASCII copy, created on Jan. 29, 2021, is named 256223_000003seqlist_ST25.txt and is 28,784 bytes in size.

The present invention relates to resistance to *Xanthomonas campestris* pv. *campestris* (Xcc) in cauliflower. According to the invention, the resistance is provided by DNA sequences, introgressed from a green cauliflower at specific loci in the genome of a white cauliflower. The introgressed sequences can be present homozygously or heterozygously in the genome of the white cauliflower, and they confer resistance to Xcc. The invention further relates to part of these cauliflowers, to seeds, to the progeny of these cauliflowers, and to method for producing cauliflowers resistant to Xcc.

Black rot caused by *Xanthomonas campestris* pv *campestris* (Xcc), is the most important seed-borne bacterial disease affecting *Brassica oleracea*, such as cauliflowers, and is responsible for the loss of around 15% per year of the fields production of cauliflowers. Xcc enters leaves through hydathodes at leaf margins, or through wound tissues, and spreads through vascular tissue, clogging vessels, producing V-shaped chlorotic lesions. These symptoms lead to a systemic infection leading to a decrease of crop quality and yield. The bacteria can be dispersed by rain, in splashed water and on plants and equipment, and can survive for a long time in crop debris, but also in seeds, thereby causing severe incidence in the progeny. Consequently, it is difficult to prevent infection by Xcc by agricultural practices such as seed treatment, crop rotation or use of agrochemicals.

To date, on the nine races of Xcc that have been identified, races 1 and 4 are predominant worldwide in *Brassica oleracea* crops, especially in cauliflower (Fargier and Manceau, 2007, Plant Pathology, 56 (5): 805-818).

Cauliflower (*Brassica oleracea* L. var. *botrytis*) is a plant of the Brassicaceae family that also includes many common plants such as cabbage, broccoli, kale and Brussel sprout. Cauliflower is cultivated as a crop for its hypertrophied and fleshy floral meristem (also named curd) that is eaten as a vegetable. The market for white cauliflower is the most important in this species. Particularly, white color of the curd is an important trait. Indeed the cauliflower market is 90% white cauliflower, and 10% romanesco, green, orange and violet cauliflowers. Moreover, white cauliflower is mostly susceptible to the bacteria Xcc and the disease is very frequent in the production fields. The loss per year regarding Xcc disease is around 15%.

Different levels of resistances to *Xanthomonas campestris* were observed in the Brassicaceae family, such as in *Brassica rapa, Brassica nigra, Brassica carinata, Brassica juncea, Brassica napus*, and *Brassica oleracea*. More specifically in *B. oleraceae*, resistances to Xcc have been described in WO2010/089374, which mentions the identification of 6 Quantitative Traits Loci (QTLs) involved in the resistance to Xcc coming from a source that is not defined. However, there is no report of resistances in cauliflower, and more specifically in white cauliflower.

In view of the importance of white cauliflower production worldwide and the loss per year regarding Xcc disease in white cauliflower, there is thus a great interest from an agricultural and economical point of view for having white cauliflower plant which are resistant to Xcc. Therefore, there is an important need in the art to identify a reliable source of resistance that is closely linked to white cauliflower.

The present inventors thus found a green cauliflower plant as a source of resistance to Xcc containing two QTLs on chromosomes 5 and 7, which combination is required to confer a resistance to Xcc. However, when trying to introgress the QTL on chromosome 5 from green cauliflower plant to white cauliflower plant, they have been faced with difficulties in recovering a non-green curd. From an originally straightforward backcross breeding program to transfer the resistance, the present inventors were faced with a challenge in recovering non-green cauliflower. They determined that said QTL on chromosome 5 from the green cauliflower that confers the resistance to Xcc is linked with a major QTL responsible for the green color of the curd. Having identified such a linkage, they have succeeded, for the first time, to combine the QTLs on chromosomes 5 and 7 conferring the resistance to Xcc without introgressing the major QTL responsible for the green color of the curd, to produce a cauliflower plant resistant to Xcc that does not have a green curd.

SUMMARY OF THE INVENTION

The inventors have identified, a green cauliflower which displays a high level of resistance to *Xanthomonas campestris* pv. *campestris* (Xcc) due to the presence of two dominant QTLs, one on chromosome 5 and one on chromosome 7. They also identified that the QTL on chromosome 5 conferring the resistance to Xcc was genetically linked to a major QTL conferring the green color of the curd, i.e. a trait unwanted into a white cauliflower, with a genetic distance between the QTL conferring the resistance and the QTL conferring the green color of the curd comprised between 6.1 cM and 4.3 cM. The inventors have thus been able to break this linkage drag and to introgress, into a white cauliflower background, both dominant QTLs on chromosomes 5 and 7 conferring the resistance to *Xanthomonas campestris* pv. *campestris* (Xcc), without introgressing the major QTL on chromosome 5 conferring the green color of the curd, thereby obtaining a cauliflower resistant to Xcc, that does not have a green curd.

Thus, in a first aspect, the invention relates to a cauliflower plant, that is resistant to *Xanthomonas campestris* pv. *campestris* (Xcc) and that does not have a green curd, said cauliflower plant (i) comprising in its genome introgressed sequences from a green cauliflower conferring resistance to Xcc and (ii) not comprising in its genome a major QTL on chromosome conferring the green color of the curd.

In some embodiments, the cauliflower plant according to the invention has a non-green curd, a white curd, an orange curd, or a purple curd. Preferably, the cauliflower plant according to the invention has a white curd.

In some embodiments, said introgressed sequences from the green cauliflower are one Quantitative Trait Loci (QTL) that is present on chromosome 5 and one QTL that is present on chromosome 7.

In some embodiments, said QTL that is present on chromosome 5 is located within a chromosomal region that is delimited by marker BN-0061002 and marker BO-0101641.

In some embodiments, said QTL that is present on chromosome 7 is located within a chromosomal region that is delimited by marker BO-0002582 and marker BN-0010593.

In some embodiments, said introgressed sequences are chosen from the introgressed sequences present in the genome of a plant of the line FLA1-116-02S, a representative sample of seeds which have been deposited under the NCIMB accession number 42693, or of a plant of the line RSF1-BC3-F3, a representative sample of seeds which have been deposited under the NCIMB accession number 43442.

In some embodiments, said introgressed sequences conferring resistance to Xcc are as found in the genome of the plant FLA1-116-02S, a representative sample of seeds which have been deposited under the NCIMB accession number 42693, or are as found in the genome of plant RSF1-BC3-F3, a representative sample of seeds which have been deposited under the NCIMB accession number 43442.

In some embodiments, said introgressed sequences confer a resistance to all races of Xcc. Preferably, said introgressed sequences confers a resistance to Xcc races 1 and/or 4.

In some embodiments, said cauliflower plant is the plant FLA1-116-02S, a representative sample of seeds which have been deposited under the NCIMB accession number 42693, or said cauliflower plant is a plant having all the morphological and physiological characteristics of the plant FLA1-116-02S.

In some embodiments, said cauliflower plant is the plant RSF1-BC3-F3, a representative sample of seeds which have been deposited under the NCIMB accession number 43442, or said cauliflower plant is a plant having all the morphological and physiological characteristics of the plant RSF1-BC3-F3.

Also provided is an isolated cell of the cauliflower plant according to the invention.

The invention also provides a plant part obtained from a cauliflower plant according to the invention. In some embodiments, said plant part is a seed, the curd (also known as head), a reproductive material, roots, flowers, florets.

Also provided is a seed of a cauliflower plant, giving rise when grown up to a cauliflower plant according to the invention.

Also provided is a seed produced by the cauliflower plant according to the invention, i.e. a seed having introgressed sequences from a green cauliflower conferring resistance to said Xcc and not having a major QTL on chromosome 5 conferring the green color of the curd as described hereafter.

Also provided is a hybrid plant of a cauliflower plant that is resistant to Xcc and that does not have a green curd, obtainable by crossing a cauliflower plant with a resistant plant according to the invention.

Also provided is a container comprising a cauliflower plant, a plant part, a seed or a hybrid plant according to the invention.

Further provided is a method for producing a cauliflower plant that is resistant to *Xanthomonas campestris* pv. *campestris* (Xcc) and that does not have a green curd, said method comprising the step consisting of:
(i) crossing a cauliflower plant according to the invention or a cauliflower obtained by germinating the deposited seeds FLA1-116-02S (NCIMB accession number 42693) or RSF1-BC3-F3 (NCIMB accession number 43442) with another cauliflower plant,
(ii) optionally selfing the resulting F1 one or more times for obtaining F2, F3, or further selfing progeny plants,
(iii) selecting cauliflowers having the resistance to Xcc and not having a green curd,
(iv) optionally, performing one or more additional rounds of selfing and/or crossing, and subsequently selecting for a cauliflower comprising the resistance and not having a green curd.

The invention also provides a method for detecting and/or selecting a cauliflower plant that is resistant to *Xanthomonas campestris* pv. *campestris* (Xcc) and that does not have a green curd, wherein said method comprises the step of detecting the presence or absence of:
a QTL conferring resistance to Xcc on chromosome 5 located within a chromosomal region that is delimited by marker BN-0061002 and marker BO-0101641,
a QTL conferring resistance to Xcc on chromosome 7 located within a chromosomal region that is delimited by marker BO-0002582 and marker BN-0010593, and
a QTL conferring green color of the curd on chromosome 5 located within a chromosomal region that is delimited by marker BO-0103554 and marker BO-0101638,
wherein (i) the presence of said QTLs conferring resistance to Xcc on chromosome 5 and on chromosome 7, and (ii) the absence of said QTL conferring green color of the curd on chromosome 5, indicates that said cauliflower plant is resistant to *Xanthomonas campestris* pv. *campestris* (Xcc) and does not have a green curd.

Further provided is the use of the:
markers BN-0061002, BN-0060999, BN-0060988, BO-0101676, BN-0064638, BO-0101706 and/or BO-0101641 on chromosome 5, and
markers BO-0002582, BN-0010479, BO-0101656, BO-0101655, BO-0103553, BO-0101639, BO-0101640, and/or BN-0010593 on chromosome 7,
for detecting a cauliflower plant that is resistant to Xcc.

The invention further provides cauliflower plants obtained from such method, especially plants in which the QTLs conferring the resistance to Xcc have been detected by the use of the markers BN-0061002, BN-0060999, BN-0060988, BO-0101676, BN-0064638, BO-0101706 and/or BO-0101641 on chromosome 5, and markers BO-0002582, BN-0010479, BO-0101656, BO-0101655, BO-0103553, BO-0101639, BO-0101640, and/or BN-0010593 on chromosome 7.

Further provided is a method for improving the yield of cauliflower plants in an environment infested by *Xanthomonas campestris* pv. *campestris* (Xcc), comprising growing cauliflower plants resistant to Xcc and that does not have a green curd, wherein said plant (i) comprises in its genome introgressed sequences from a green cauliflower conferring resistance to Xcc and (ii) does not comprise in its genome a major QTL on chromosome 5 conferring the green color of the curd.

Also provided is a method for improving the yield of cauliflower plants in an environment infested by *Xanthomonas campestris* pv. *campestris* (Xcc) comprising:
a) identifying cauliflower plants resistant to Xcc (i) comprising in their genome introgressed sequences from a green cauliflower conferring resistance to Xcc and (ii) not comprising in their genome a major QTL on chromosome 5 conferring the green color of the curd, and
b) growing said resistant cauliflower plants in said infested environment.

Also provided is a method for protecting a field from infestation and/or spread of *Xanthomonas campestris* pv. *campestris* (Xcc), comprising growing cauliflower plants resistant to Xcc (i) comprising in their genome introgressed sequences from a green cauliflower conferring resistance to Xcc and (ii) not comprising in their genome a major QTL on chromosome 5 conferring the green color of the curd.

Further provided is a method for increasing the number of harvestable or viable cauliflower plants in an environment infested by *Xanthomonas campestris* pv. *campestris* (Xcc), comprising growing cauliflower plants resistant to Xcc which (i) comprises in its genome introgressed sequences from a green cauliflower conferring resistance to Xcc and (ii) does not comprise in its genome a major QTL on chromosome 5 conferring the green color of the curd.

The use of a cauliflower plant resistant to *Xanthomonas campestris* pv. *campestris* (Xcc) which (i) comprises in its genome introgressed sequences from a green cauliflower conferring resistance to Xcc and (ii) does not comprise in its genome a major QTL on chromosome 5 conferring the green color of the curd, for controlling infestation in a field by Xcc.

Further provided is a method for the production of cauliflower plantlets or plants resistant to *Xanthomonas campestris* pv. *campestris* (Xcc), which method comprises:
  (i) culturing in vitro an isolated cell or tissue of the cauliflower plant according to the invention to produce cauliflower micro-plantlets resistant to *Xanthomonas campestris* pv. *campestris* (Xcc), and
  (ii) optionally further subjecting the cauliflower microplantlets to an in vivo culture phase to develop into cauliflower plant resistant to Xcc.

Definitions

As used herein, the term "cauliflower" refers to a plant of the species *Brassica oleracea* L. *convar botrytis* (L.) Alef. var. *botrytis* L. as defined in page 1 of the TG/45/7 document edited by the International Union for the Protection of new Variety of plants (UPOV) and dated 2009 Apr. 1.

As used herein, reference to the chromosomes of cauliflower is made from the *Brassica oleracea* var. *oleracea* strain TO1000 genome or (http://plants.ensembl.org/Brassica_oleracea/Info/Index/, http://www.ebi.ac.uk/ena/data/view/GCA_000695525.1, update of May 27, 2014).

As used herein, the term "Quantitative Trait Loci (QTL)" refers to a genomic region that may comprise one or more genes or regulatory sequences. A QTL may for instance comprise one or more genes of which products confer genetic resistance. Alternatively, a QTL may for instance comprise regulatory genes or sequences of which products influence the expression of genes on other loci in the genome of the plant thereby conferring the resistance. The QTLs of the present invention may be defined by indicating their genetic location in the genome of the respective pathogen-resistant accession using one or more molecular genomic markers. One or more markers, in turn, indicate a specific locus. Distances between loci are usually measured by frequency or crossing-over between loci on the same chromosome. The farther apart two are, the more likely that a crossover will occur between them. Conversely, if two loci are close together, a cross over is less likely to occur between them. As a rule, one centimorgan (CM) is equal to 1% recombination between loci (marker). When a QTL can be indicated by multiple markers, the genetic distance between the end-point markers is indicative of the size of the QTL.

By "introgressed sequence or intervals from a green cauliflower at a given locus" or "introgressed sequences or intervals from a green cauliflower present/found at a given locus", it is to be understood that the genomic interval found at this given locus has the same sequence as the corresponding interval found in the green cauliflower donor, i.e. in the introgression partner, at the same locus and also the same sequence as the corresponding genomic interval found in the cauliflower plant of the line FLA1-116-02S (NCIMB accession number 42693) or RSF1-BC3-F3 (NCIMB accession number 43442) at the same locus.

By having the "same sequence", it means that the two sequences to be compared are identical to the exception of potential point mutations which may occur during transmission of the genomic interval to progeny, i.e. preferably at least 99% identical on a length of 1 kilobase. It can be deduced that a genomic interval under test has the same sequence, in the sense of the invention, as the corresponding genomic interval found in the green cauliflower donor at the same locus, if said genomic interval under is also capable if conferring resistance to Xcc.

As used herein, the terms "molecular marker" or "marker" refer to an indicator that is used in methods for visualizing differences in characteristics of nucleic acid sequences. Examples of such indicators are restriction fragment length polymorphism (RFLP) markers, amplification fragment length polymorphism (AFLP) markers, single nucleotide polymorphisms (SNPs), insertion mutations, microsatellite markers (SSRs), sequence-characterized amplified regions (SCARs), cleaved amplified polymorphic sequence (CAPS) markers or isozyme markers or combinations of the markers described herein which defines a specific genetic and chromosomal location. Mapping of molecular markers in the vicinity of an allele is a procedure which can be performed quite easily by the person skilled in the art using common molecular techniques.

It is noted in this respect that specific positions in a chromosome can indeed be defined with respect to markers, such as SNPs, insofar as the flanking sequences of said markers are defined in order to unambiguously position them on the genome. The present inventors have used SNPs markers, identified by their flanking sequences, present in the cauliflower genome, to discriminate between introgressed and endogenously residing sequences and to track down the introgressed sequences conferring the Xcc resistance and/or the green color of the curd in the cauliflower genome.

As used herein, a "chromosomal region" or "chromosomal interval" delimited by two markers (e.g. SNPs) X and Y refers to the section of the chromosome lying between the positions of these two markers and comprising said markers, therefore the nucleotide sequence of this chromosomal region or interval begins with the nucleotide corresponding to marker X and ends with the nucleotide corresponding to marker Y, i.e. the markers are comprised within the region or interval they delimit, in the sense of the invention.

As used herein, the term "primer" refers to an oligonucleotide which is capable of annealing to the amplification target allowing a DNA polymerase to attach, thereby serving as a point of initiation of DNA synthesis when placed under conditions in which synthesis of primers extension product is induced, i.e., in the presence of nucleotides and an agent for polymerization such as DNA polymerase and at a suitable temperature and pH. The primer is preferably single stranded for maximum efficiency in amplification. Preferably, the primer is an oligodeoxyribonucleotide. The primer must be sufficiently long to prime the synthesis of extension products in the presence of the agent for polymerization. The exact length of the primers will depend on many factors, including temperature and composition (A/T and G/C content) of primer. A pair of primers consists of one forward and one reverse primer as commonly used in the art of DNA amplification such as in PCR amplification.

As used herein, the term "green curd" refers to a curd that has a color at harvest maturity similar to the green color of the example varieties Alverda and Minaret cited in the table of characteristics of the in TG/45/7 document edited by the International Union for the Protection of new Variety of plants (UPOV) and dated 2009 Apr. 1 (characteristic 21 at page 13 of the document). Other examples of green cauliflower varieties are Vitaverde, Susana and Fangio.

As used herein, the term "green cauliflower" refers to a cauliflower that has a green curd as defined here above.

As used herein, the term "white curd" refers to a curd that has a color at harvest maturity similar to the white color of the example varieties Astell and Iceberg cited in the table of characteristics of the in TG/45/7 document edited by the International Union for the Protection of new Variety of plants (UPOV) and dated 2009 Apr. 1 (characteristic 21 at page 13 of the document). The "white" color of the cauliflower curd can also be defined using the CTIFL scale that defines the white color as ranging from C2 (white) to C10 (Yellow). Other examples of white cauliflower varieties are Aerospace, Aviron and Freebell.

As used herein, the term "white cauliflower" refers to a cauliflower that has a white curd as defined here above.

As used herein, the expressions "does not have a green curd" or "not having a green curd" or "non-green curd" refers to a curd that is not a green curd as defined here above. As non-limiting examples, the expression "does not have a green curd" or "not having a green curd" or "non-green curd" refers to a curd that has a white color, an orange color, a purple color, or a color at harvest intermediate between the "green curd" color as defined here above and the "white curd" color as defined here above.

It has been identified by the inventors that the green color of the curd is governed by one major QTL on chromosome 5 that is closely linked to the QTL on chromosome 5 conferring resistance to Xcc according to the invention, and 9 other minor QTLs on chromosomes 1, 2, 4, 5, 6 and 8. More precisely, 3 minor QTLs have been identified on chromosome 1, 2 minor QTLs have been identified on chromosome 2, 1 minor QTL has been identified on chromosome 4, 1 minor QTL has been identified on chromosome 5, 1 minor QTL has been identified on chromosome 6 and 1 minor QTL has been identified on chromosome 8. For the purpose of the invention, said major QTL on chromosome 5 that is closely linked to the QTL on chromosome 5 conferring resistance to Xcc according to the invention is named MAC5; said 3 minor QTLs on chromosome 1 are named MiC1-1, MiC1-2, and MiC1-3; said 2 minor QTLs on chromosome 2 are named MiC2-1, MiC2-2; said minor QTL on chromosome 4 is named MiC4, said minor QTL on chromosome 5 is named MiC5, said minor QTL on chromosome 6 is named MiC6 and said minor QTL on chromosome 8 is named MiC8.

In some embodiments, said QTL MAC5 is located within a chromosomal region that is delimited by marker BO-0103554 and marker BO-0101638 (or said otherwise by within a chromosomal region delimited by the nucleotides at positions 33 420 357 and 35 168 917 on chromosome 5). In some embodiments, said MAC5 QTL can be identified by amplifying any one the following markers: BO-0103554, BN-0004457 and BO-0101638. Said otherwise, said MAC5 can be identified by amplifying (i) a region of chromosome 5 encompassing any one the following nucleotide positions: 33 420 357, 33 493 322, and 35 168 917, or (ii) a sequence of chromosome 5 comprising sequence SEQ ID NO: 28, SEQ ID NO: 29, or SEQ ID NO: 30, or a fragment thereof including the nucleotide at position 29 of SEQ ID NO: 28, or at position 61 of SEQ ID NO: 29 or SEQ ID NO: 30 (respectively); preferably said fragment of sequence SEQ ID NO: 28 including the nucleotide at position 29, or said fragment of SEQ ID NO: 29 or SEQ ID NO: 30 including the nucleotide at position 61, comprises at least 10, 11, 12, 13, 14, 15, 16, 17, 18, 19 or 20 contiguous nucleotides of SEQ ID NO: 28, SEQ ID NO: 29, or SEQ ID NO: 30 (respectively).

In some embodiments, said QTL MiC1-1 is located within a chromosomal region encompassing the marker BN-0000623 (or said otherwise, a region of chromosome 1 encompassing the nucleotide at position 5 724 437, or a region of chromosome 1 encompassing the nucleotide at position 61 of SEQ ID NO: 16). In some embodiments, said QTL MiC1-1 is located at less than 20 cM, preferably less than 10 cM, preferably less than 5 cM, preferably less than 1 cM from marker BN-0000623. In some embodiments, said QTL MiC1-1 can be identified by amplifying said marker BN-0000623. Said otherwise, said MiC1-1 QTL can be identified by amplifying (i) a region of chromosome 1 encompassing the nucleotide at position 5 724 437, or (ii) a sequence of chromosome 1 comprising sequence SEQ ID NO: 16 or a fragment thereof including the nucleotide at position 61 of SEQ ID NO: 16; preferably said fragment of sequence SEQ ID NO: 16 including the nucleotide at position 61 of SEQ ID NO: 16 comprises at least 10, 11, 12, 13, 14, 15, 16, 17, 18, 19 or 20 contiguous nucleotides of SEQ ID NO: 16.

In some embodiments, said QTL MiC1-2 is located within a chromosomal region that is delimited by marker BN-0003844 and marker BN-0004384 (or said otherwise by within a chromosomal region delimited by the nucleotides at positions 11 651 984 and 13 217 962 on chromosome 1). In some embodiments, said QTL MiC1-2 encompasses the marker BN-0002453 (i.e. a region of chromosome 1 encompassing the nucleotide at position 12 001 782, or a region of chromosome 1 encompassing the nucleotide at position 61 of SEQ ID NO: 18). In some embodiments, said MiC1-2 QTL can be identified by amplifying any one the following markers: BN-0003844, BN-0002453, and BN-0004384. Said otherwise, said MiC1-2 QTL can be identified by amplifying (i) a region of chromosome 1 encompassing any one the following nucleotide positions: 11 651 984, 12 001 782, and 13 217 962, or (ii) a sequence of chromosome 1 comprising sequence SEQ ID NO: 17, SEQ ID NO: 18, or SEQ ID NO: 19, or a fragment thereof including the nucleotide at position 61 of SEQ ID NO: 17; SEQ ID NO: 18, or SEQ ID NO: 19 (respectively); preferably said fragment of sequence SEQ ID NO: 17, SEQ ID NO: 18, or SEQ ID NO: 19, including the nucleotide at position 61 comprises at least 10, 11, 12, 13, 14, 15, 16, 17, 18, 19 or 20 contiguous nucleotides of SEQ ID NO: 17, SEQ ID NO: 18, or SEQ ID NO: 19 (respectively).

In some embodiments, said QTL MiC1-3 is located within a chromosomal region encompassing the marker BN-0004278 (or said otherwise, a region of chromosome 1 encompassing the nucleotide at position 29 102 012, or a region of chromosome 1 encompassing the nucleotide at position 61 of SEQ ID NO: 20). In some embodiments, said QTL MiC1-3 is located at less than 20 cM, preferably less than 10 cM, preferably less than 5 CM, preferably less than 1 cM from marker BN-0004278. In some embodiments, said QTL MiC1-3 can be identified by amplifying said marker BN-0004278. Said otherwise, said MiC1-3 QTL can be identified by amplifying (i) a region of chromosome 1 encompassing the nucleotide at position 29 102 012, or (ii) a sequence of chromosome 1 comprising sequence SEQ ID NO: 20 or a fragment thereof including the nucleotide at position 61 of SEQ ID NO: 20; preferably said fragment of sequence SEQ ID NO: 20 including the nucleotide at position 61 of SEQ ID NO: 20 comprises at least 10, 11, 12, 13, 14, 15, 16, 17, 18, 19 or 20 contiguous nucleotides of SEQ ID NO: 20.

In some embodiments, said QTL MiC2-1 is located within a chromosomal region that is delimited by marker BN-0010638 and marker BN-0010246 (or said otherwise by within a chromosomal region delimited by the nucleotides at positions 13 465 264 and 13 465 901 on chromosome 2). In some embodiments, said MiC2-1 QTL can be identified by amplifying any one the following markers: BN-0010638 and BN-0010246. Said otherwise, said MiC2-1 QTL can be identified by amplifying (i) a region of chromosome 2 encompassing any one the following nucleotide positions: 13 465 264 and 13 465 901, or (ii) a sequence of chromosome 2 comprising sequence SEQ ID NO: 21 or SEQ ID NO: 22, or a fragment thereof including the nucleotide at position 61 of SEQ ID NO: 21, or SEQ ID NO: 22 (respectively); preferably said fragment of sequence SEQ ID NO: 21, or SEQ ID NO: 22 including the nucleotide at position 61 comprises at least 10, 11, 12, 13, 14, 15, 16, 17, 18, 19 or 20 contiguous nucleotides of SEQ ID NO: 21, or SEQ ID NO: 22 (respectively).

In some embodiments, said QTL MiC2-2 is located within a chromosomal region encompassing the marker BN-0009825 (or said otherwise, a region of chromosome 2 encompassing the nucleotide at position 52 310 605, or a region of chromosome 2 encompassing the nucleotide at position 61 of SEQ ID NO: 23). In some embodiments, said QTL MiC2-2 is located at less than 20 cM, preferably less than 10 cM, preferably less than 5 CM, preferably less than 1 cM from marker BN-0009825. In some embodiments, said QTL MiC2-2 can be identified by amplifying said marker BN-0009825. Said otherwise, said MiC2-2 QTL can be identified by amplifying (i) a region of chromosome 2 encompassing the nucleotide at position 52 310 605, or (ii) a sequence of chromosome 2 comprising sequence SEQ ID NO: 23 or a fragment thereof including the nucleotide at position 61 of SEQ ID NO: 23; preferably said fragment of sequence SEQ ID NO: 23 including the nucleotide at position 61 of SEQ ID NO: 23 comprises at least 10, 11, 12, 13, 14, 15, 16, 17, 18, 19 or 20 contiguous nucleotides of SEQ ID NO: 23.

In some embodiments, said QTL MiC4 is located within a chromosomal region that is delimited by marker BN-0001304 and marker BN-0001306 (or said otherwise by within a chromosomal region delimited by the nucleotides at positions 13 807 283 and 13 807 343 on chromosome 4). In some embodiments, said QTL MiC4 can be identified by amplifying any one of marker BN-0001304 and marker BN-0001306. Said otherwise, said MiC4 QTL can be identified by amplifying (i) a region of chromosome 4 encompassing any one the following nucleotide positions: 13 807 283 and 13 807 343, or (ii) a sequence of chromosome 4 comprising sequence SEQ ID NO: 24 or SEQ ID NO: 25, or a fragment thereof including the nucleotide at position 61 of SEQ ID NO: 24, or SEQ ID NO: 25 (respectively); preferably said fragment of sequence SEQ ID NO: 24, or SEQ ID NO: 25 including the nucleotide at position 61 comprises at least 10, 11, 12, 13, 14, 15, 16, 17, 18, 19 or 20 contiguous nucleotides of SEQ ID NO: 24, or SEQ ID NO: 25 (respectively).

In some embodiments, said QTL MiC5 is located within a chromosomal region that is delimited by marker BN-0002268 and marker BN-0003875 (or said otherwise by within a chromosomal region delimited by the nucleotides at positions 6 124 994 and 8 620 858 on chromosome 5). In some embodiments, said QTL MiC5 can be identified by amplifying any one of marker BN-0002268 and marker BN-0003875. Said otherwise, said MiC5 QTL can be identified by amplifying (i) a region of chromosome 5 encompassing any one the following nucleotide positions: 6 124 994 and 8 620 858, or (ii) a sequence of chromosome 5 comprising sequence SEQ ID NO: 26 or SEQ ID NO: 27, or a fragment thereof including the nucleotide at position 61 of SEQ ID NO: 26 or SEQ ID NO: 27 (respectively); preferably said fragment of sequence SEQ ID NO: 26 or SEQ ID NO: 27 including the nucleotide at position 61 comprises at least 10, 11, 12, 13, 14, 15, 16, 17, 18, 19 or 20 contiguous nucleotides of SEQ ID NO: 26 or SEQ ID NO: 27 (respectively).

In some embodiments, said QTL MiC6 is located within a chromosomal region encompassing the marker BN-0003896 (or said otherwise by within a region of chromosome 6 encompassing the nucleotides at position 25 481 494, or a region of chromosome 6 encompassing the nucleotide at position 61 of SEQ ID NO: 31). In some embodiments, said QTL MiC6 is located at less than 20 cM, preferably less than 10 cM, preferably less than 5 cM, preferably less than 1 cM from marker BN-0003896. In some embodiments, said QTL MiC6 can be identified by amplifying said marker BN-0003896. Said otherwise, said MiC6 QTL can be identified by amplifying (i) a region of chromosome 6 encompassing the nucleotide at position 25 481 494, or (ii) a sequence of chromosome 6 comprising sequence SEQ ID NO: 31 or a fragment thereof including the nucleotide at position 61 of SEQ ID NO: 31; preferably said fragment of sequence SEQ ID NO: 31 including the nucleotide at position 61 of SEQ ID NO: 31 comprises at least 10, 11, 12, 13, 14, 15, 16, 17, 18, 19 or 20 contiguous nucleotides of SEQ ID NO: 31.

In some embodiments, said QTL MiC8 is located within a chromosomal region that is delimited by marker BN-0002182 and marker BO-0003450 (or said otherwise by within a chromosomal region delimited by the nucleotides at positions 6 925 733 and 7 236 995 on chromosome 8). In some embodiments, said QTL MiC8 can be identified by amplifying any one of marker BN-0002182 and marker BO-0003450. Said otherwise, said MiC8 QTL can be identified by amplifying (i) a region of chromosome 8 encompassing any one the following nucleotide positions: 6 925 733 and 7 236 995, or (ii) a sequence of chromosome 8 comprising sequence SEQ ID NO: 32 or SEQ ID NO: 33, or a fragment thereof including the nucleotide at position 61 of SEQ ID NO: 32 or SEQ ID NO: 33 (respectively); preferably said fragment of sequence SEQ ID NO: 32 or SEQ ID NO: 33 including the nucleotide at position 61 comprises at least 10, 11, 12, 13, 14, 15, 16, 17, 18, 19 or 20 contiguous nucleotides of SEQ ID NO: 32 or SEQ ID NO: 33 (respectively).

The alleles conferring the green color of the curd amplified by the markers here above described are as described in Table 1.

TABLE 1

Markers linked to the green color of the curd on chromosomes 1, 2, 4, 5, 6 and 8, location and flanking sequences.

| Marker name | Chr. | Sequence surrounding the marker | Position on chr. | Position in SEQ ID NO | Alternative alleles (G/W) | SEQ ID NO |
|---|---|---|---|---|---|---|
| BN-0000623 | 1 | ATCTACTATCGACCTCAACGTAATTGGGGAAAAAACTA ACTCAAAAGATCGCATAGTTGGYGCACATTTCTTCAGG TGCATATTCAATATCTCAAAGA<u>T</u>TTTCCAAGCTTTTCGT ATTTTT | 5 724 437 | 61 | [C/T] | 16 |
| BN-0003844 | 1 | CGCCGCCCTGAAGAGTACTCTTCCCTCCTCCTCTGTTC CGCCGTCAGTTCTTCGTCCGGGWGAAATGGGAGATGA GGCTGATGAATTAGGAGAAGAT<u>G</u>ACGAAGTTGAGAAG CTGATACAG | 11 651 984 | 61 | [T/A] | 17 |
| BN-0002453 | 1 | TCCTCTGGTGATGTTGGTGTATCCATTGTACGCATCGG TGGTGGCAATGGAGAGCACAACSAAAGTAGACGATGA GCAGTGGCTTGCCTACTGGATC<u>A</u>TTTACTCCTTCCTCA CCCTCACT | 12 001 782 | 61 | [G/C] | 18 |
| BN-0004384 | 1 | GAGAGAGAGCTCAAACACAAAAATGGAGGGAACCATC TCGCCGCTTTGCATACGCTCTTCRTCGAGTCTGTGTTA CTTCTCCAGTAACGTTTCATTGG<u>A</u>CTCTCACCGTTCAC TAGGATTT | 13 217 962 | 61 | [A/G] | 19 |
| BN-0004278 | 1 | GCTCCTCTCATCAACTCAAATACCACTCACACTCTTCTT CACTCTTTGGATCTGCTTCAGYGACAATGTTCAAGGCA ACCAGTGTTCAGATCACCAAG<u>T</u>CTCAGTAAAGGACGTA GAAGAT | 29 102 012 | 61 | [C/T] | 20 |
| BN-0010638 | 2 | AGTGGGGACGATTAAAGGGGTGTACAATTATTGGCTC GGTGGTACGGAGGAGGTGAAGCCRAAATCTCCAAATT CAGTTGAAGAGTCATCACAACCA<u>C</u>NTTAGCCCCTCCGT TGGGACTAA | 13 465 264 | 61 | [A/G] | 21 |
| BN-0010246 | 2 | TGCATTCGGCAAAGANTTCACCCACCAGACTTCCCGG AGACGAAATTTTTCCGACAAGAARTGATGATATGAAAG TCGAGATTGGGTCGGGAAGAGGC<u>T</u>TGCCGACAGAAAC TGATGATCA | 13 465 901 | 61 | [G/A] | 22 |
| BN-0009825 | 2 | GTGCAGAGATTGACTGCATTGGAAGCAGAACTTTGCA GAGTTGATTCAAGTGATCCAACCKTGGTCTCAGCAATT CTCGATGCATNCACACAGAATCC<u>G</u>CACCTTAAACAGCA GAGTGCTT | 52 310 605 | 61 | [G/T] | 23 |
| BN-0001304 | 4 | TGTGTTGATGGATGGTGCAGCACAAGACAAGATTGCG GATTTTGAGATGAAGCTGATGGAYATCGACAGTGAGCA TTTAGGAATCCCTGACGCNGAGT<u>A</u>CCACTCTATTGTGA GGATGCCN | 13 807 283 | 61 | [C/T] | 24 |
| BN-0001306 | 4 | NATCGACAGTGAGCATTTAGGAATCCCTGACGCNGAG TACCACTCTATTGTGAGGATGCCYTCTGGTGAATTTTC CAGGATATGCAAAGATCTCAGTA<u>G</u>CATTGGTGACACAG GTATTATA | 13 807 343 | 61 | [C/T] | 25 |
| BN-0002268 | 5 | TAAGCCCCAATGGTGATCCGACGGCAGAGTTTCCTTG ATCTTGTCAAGTCTTTTGAGGATKTCCAGAAACGATGG TCTCTGGTTCATGTCAGCGTCCC<u>A</u>GCATTTCACTATTA AGTCTCTT | 6 124 994 | 61 | [G/T] | 26 |
| BN-0003875 | 5 | CGCGCATTACAGCTAGATTCCGCAGAAGAAAACAATG GAGTTGGAGTTGTCATTCCGACAKATCAGAACTCAGAT GGAGTTGAGATAGTGGATAAAAT<u>G</u>GATGAAGACCTGA AAGATGAGG | 8 620 858 | 61 | [T/G] | 27 |
| BO-0103554 | 5 | GTGATCAGAGCTTCAACGAGCGACAACASAACCAGCT TACAAGTCAAGGAGACACAGAACAGCAC<u>C</u>ACGATGAG GAGGGATCTCATGTTCACAGCTGCTGCTGCGGCCGTT TGTTCCTTGGCTAAGGTAGCCATGGCAGACGAGGAGG AGCCCAAACGAGGGACAGATGCAGCTAAGAAGAAGTA CGCTCAAGTTTGTGTCACAATGCCGN<u>C</u> | 33 420 357 | 29 | [C/G] | 28 |
| BN-0004457 | 5 | GAGATGGGAGTGAAATGGGACCTAAGAGACAGAGAAT GATTGAACAAGCTCCTCCTCCAGKAACATTCTACGGAC CTCATCCCGGTTCCGCCTTTATG<u>T</u>TTAACCCCTACGGA TTCGTTCC | 33 493 322 | 61 | [T/G] | 29 |

TABLE 1-continued

Markers linked to the green color of the curd on chromosomes 1, 2, 4, 5, 6 and 8, location and flanking sequences.

| Marker name | Chr. | Sequence surrounding the marker | Position on chr. | Position in SEQ ID NO | Alternative alleles (G/W) | SEQ ID NO |
|---|---|---|---|---|---|---|
| BO-0101638 | 5 | ACCTCTCGTGCGGAAGAAGAAGTTGAATTACTGCTAAG CTGGTTATTCTTTATTTTTCTGRACCAACATAAAGAAAT ATACGCCATGAGCACCATCAAAAGCAAAGCTATGCCTA TGCTTAACTCAATGGCAACTTTATTCGAACTAGATGAAT GGCTTGGTTGTGCTTGCACGATACATTGATTTAGTTTC AGCTCCTTGATACCTCCAC | 35 168 917 | 61 | [A/G] | 30 |
| BN-0003896 | 6 | GTCACTCTTGTCTCCTCTGATATTCTCTGATCACCCCA AGAGACCCGGCGACGAAGACCCRTCACCCCCTTACAA CATGCTAAGAAACGTTTTGGACATGAATGCTCAATACG GTGGCCTC | 25 481 494 | 61 | [G/A] | 31 |
| BN-0002182 | 8 | CAATACAAGGAAAAAGCTTGACAAGGATCGGCTTAGCA CGGAGTCGAACGCAAAAGTGCAMATCATGAAGAGTCT CTTGCCACTCATTGATAGTTTTGAGAGCGCTAGGCAAC AGATTAAA | 6 925 733 | 61 | [A/C] | 32 |
| BO-0003450 | 8 | CGCTGGATACTCTTCGTACCCTGTGATTCCTGTAATCC TAATCCTCGTATTTGGCTGCATYAYCAAGACAAAAATC ACAATGCAATTGTTATTATTTACAGTTCTATGTGTACCA AATCATACGAACTAACTGATACTAGTATGTGCGGATTA CATTATATCTAGCTAAAGGAAAAGATGACTTTGAACAA CAGAGAGCAGTRRATACCTGTCGGTGACCGATATTTCT GCGGTATTTCTTCTTGGGCTTGTACTTGAAGACGACTA CTTTATYATTCAGACCCTGCAG | 7 236 995 | 61 | [T/C] | 33 |

Chr.: chromosome,
G: Green,
W: White.

The inventors have discovered that the absence of all these QTLs allows obtaining a white curd as defined above. Moreover, they identified that the absence of the major QTL MAC5 is necessary and sufficient to obtain a non-green curd.

Thus, accordingly, in some embodiments, the term "green cauliflower" also refers to a cauliflower that has at least the green alleles for the QTL MAC5 at homozygous state or heterozygous state, i.e. a cauliflower that has at least the following alleles at homozygous or heterozygous state: allele C for the marker BO-0103554 on chromosome 5, allele T for the marker BN-0004457 on chromosome 5, and allele A for the marker BO-0101638 on chromosome 5.

In some embodiments, a cauliflower that has a green curd may also refer to a cauliflower that has the green alleles for the QTL MAC5 at homozygous or heterozygous state in combination with the green alleles for any one of the MiC1-1, MiC1-2, MiC1-3, MiC2-1, MiC2-2, MiC4, MiC5, MiC6 and MiC8 at homozygous or heterozygous state. Preferably, a cauliflower that has a green curd may also refer to a cauliflower that has the green alleles for the QTL MAC5 at homozygous or heterozygous state in combination with the green alleles for all the MiC1-1, MiC1-2, MiC1-3, MiC2-1, MiC2-2, MiC4, MiC5, MiC6 and MiC8 at homozygous or heterozygous state, i.e. a cauliflower that has the following combination of alleles at homozygous or heterozygous state: allele C of BN-0000623 on chromosome 1, allele T of BN-0003844 on chromosome 1, allele G of BN-0002453 on chromosome 1, allele A of BN-0004384 on chromosome 1, allele C of BN-0004278 on chromosome 1, allele A of BN-0010638 on chromosome 2, allele G of BN-0010246 on chromosome 2, allele G of BN-0009825 on chromosome 2, allele C of BN-0001304 on chromosome 4, allele C of BN-0001306 on chromosome 4, allele C of BN-0002268 on chromosome 5, allele T of BN-0003875 on chromosome 5, allele C of BO-0103554 on chromosome 5, allele T of BN-0004457 on chromosome 5, allele A of BO-0101638 on chromosome 5, allele G of BN-0003896 on chromosome 6, allele A of BN-0002182 on chromosome 8, and allele T of BO-0003450 on chromosome 8.

In some embodiments, the term "white cauliflower" also refers to a cauliflower that has the following alleles at homozygous state: allele T of BN-0000623 on chromosome 1, allele A of BN-0003844 on chromosome 1, allele C of BN-0002453 on chromosome 1, allele G of BN-0004384 on chromosome 1, allele T of BN-0004278 on chromosome 1, allele G of BN-0010638 on chromosome 2, allele A of BN-0010246 on chromosome 2, allele T of BN-0009825 on chromosome 2, allele T of BN-0001304 on chromosome 4, allele T of BN-0001306 on chromosome 4, allele T of BN-0002268 on chromosome 5, allele G of BN-0003875 on chromosome 5, allele G of BO-0103554 on chromosome 5, allele G of BN-0004457 on chromosome 5, allele G of BO-0101638 on chromosome 5, allele A of BN-0003896 on chromosome 6, allele C of BN-0002182 on chromosome 8, and allele C of BO-0003450 on chromosome 8.

In some embodiments, a cauliflower that has not a green curd may also refer to a cauliflower that does not comprise in its genome the QTL MAC5 conferring the green color of the curd. In some embodiments, a cauliflower that has not a green curd may also refer to a cauliflower that has at least the white alleles for the QTL MAC5 at homozygous state, i.e. a cauliflower that has at least the following alleles at homozygous state: allele G of BO-0103554 on chromosome 5, allele G of BN-0004457 on chromosome 5, and allele G of BO-0101638 on chromosome 5. In some embodiments, a cauliflower that has not a green curd may also refer to a cauliflower that has the white alleles for the QTL MAC5 at homozygous state in combination with the white alleles for any one of the QTLs MiC1-1, MiC1-2, MiC1-3, MiC2-1, MiC2-2, MiC4, MiC5, MiC6 and MiC8 at homozygous state.

Preferably, a cauliflower that has not a green curd refers to a cauliflower that has in its genome the same alleles than those present in the genome of a plant corresponding to the deposited material FLA1-116-02S (NCIMB accession number 42693) or RSF1-BC3-F3 (NCIMB accession number 43442), i.e.:

1 the following alleles at homozygous state: allele C of BN-0000623 on chromosome 1, allele T of BN-0003844 on chromosome 1, allele G of BN-0002453 on chromosome 1, allele A of BN-0004384 on chromosome 1, allele C of BN-0004278 on chromosome 1, allele G of BN-0010246 on chromosome 2, allele G of BN-0003875 on chromosome 5, allele G of BO-0103554 on chromosome 5, allele G of BN-0004457 on chromosome 5, allele G of BO-0101638 on chromosome 5, allele G of BN-0003896 on chromosome 6, allele A of BN-0002182 on chromosome 8, and allele T of BO-0003450 on chromosome 8, and the following alleles at homozygous state or heterozygous state: allele G or A of BN-0010638 on chromosome 2, allele T or C of BN-0001304 on chromosome 4, allele T or C of BN-0001306 on chromosome 4, and allele T or G of BN-0002268 on chromosome 5.

In some embodiments, amplification of the markers:
BN-0000623, BN-0003844, BN-0002453, BN-0004384, and BN-0004278 on chromosome 1,
BN-0010638, BN-0010246, and BN-0009825 on chromosome 2,
BN-0001304 and BN-0001306 on chromosome 4,
BN-0002268, BN-0003875, BO-0103554, BN-0004457, and BO-0101638 on chromosome 5,
BN-0003896 on chromosome 6, and
BN-0002182, and BO-0003450 on chromosome 8,
is performed by PCR using primers which can be used to amplify the green/white allele of said markers.

In particular the probes for amplifying the green or white allele of the markers:
BN-0000623, BN-0003844, BN-0002453, BN-0004384, and BN-0004278 on chromosome 1,
BN-0010638, BN-0010246, and BN-0009825 on chromosome 2,
BN-0001304 and BN-0001306 on chromosome 4,
BN-0002268, BN-0003875, BO-0103554, BN-0004457, and BO-0101638 on chromosome 5,
BN-0003896 on chromosome 6, and
BN-0002182, and BO-0003450 on chromosome 8,
may have the sequences as described in Table 2.

TABLE 2

Sequences of the primers allowing amplifying the green and white alleles of the markers linked to the color of the curd on chromosomes 1, 2, 4, 5, 6 and 8.

| Marker name | Green Allele Specific forward primer | White Allele Specific forward primer | Common reverse primer |
|---|---|---|---|
| BN-0000623 | GAATATGCACCTGAAGAAATGTGCG (SEQ ID NO: 34) | GAATATGCACCTGAAGAAATGTGCA (SEQ ID NO: 35) | GACCTCAACGTAATTGGGGAAAAA ACTAA (SEQ ID NO: 36) |
| BN-0003844 | ATCAGCCTCATCTCCCATTTCA (SEQ ID NO: 37) | ATCAGCCTCATCTCCCATTTCT (SEQ ID NO: 38) | AGTACTCTTCCCTCCTCCTCTGTT C (SEQ ID NO: 39) |
| BN-0002453 | GGCAATGGAGAGCACAACG (SEQ ID NO: 40) | GGCAATGGAGAGCACAACC (SEQ ID NO: 41) | AGTAGGCAAGCCACTGCTCA (SEQ ID NO: 42) |
| BN-0004384 | ACTGGAGAAGTAACACAGACTCGAT (SEQ ID NO: 43) | GGAGAAGTAACACAGACTCGAC (SEQ ID NO: 44) | CTCGCCGCTTTGCATACGCTCTT (SEQ ID NO: 45) |
| BN-0004278 | CACTCTTTGGATCTGCTTCAGC (SEQ ID NO: 46) | TCACTCTTTGGATCTGCTTCAGT (SEQ ID NO: 47) | GTGATCTGAACACTGGTTGCCTTG AA (SEQ ID NO: 48) |
| BN-0010638 | ATGACTCTTCAACTGAATTTGGAG ATTTT (SEQ ID NO: 49) | GACTCTTCAACTGAATTTGGAGATT TC (SEQ ID NO: 50) | GGTGTACAATTATTGGCTCGGTG GTA (SEQ ID NO: 51) |
| BN-0010246 | CCAATCTCGACTTTCATATCATCAC (SEQ ID NO: 52) | ACCCAATCTCGACTTTCATATCATC AT (SEQ ID NO: 53) | ACCAGACTTCCCGGAGACGAAAT TT (SEQ ID NO: 54) |
| BN-0009825 | TGATTCAAGTGATCCAACCG (SEQ ID NO: 55) | TTGATTCAAGTGATCCAACCT (SEQ ID NO: 56) | CTGTTTAAGGTGCGGATTCTGTGT (SEQ ID NO: 57) |
| BN-0001304 | GATTCCTAAATGCTCACTGTCGATG (SEQ ID NO: 58) | CCTAAATGCTCACTGTCGATA (SEQ ID NO: 59) | GCAGCACAAGACAAGATTGCGGA TT (SEQ ID NO: 60) |
| BN-0001306 | CCACTCTATTGTGAGGATGCCC (SEQ ID NO: 61) | ACCACTCTATTGTGAGGATGCCT (SEQ ID NO: 62) | TCACCAATGCTACTGAGATCTTTG CATA (SEQ ID NO: 63) |
| BN-0002268 | ATCTTGTCAAGTCTTTTGAGGATG (SEQ ID NO: 64) | ATCTTGTCAAGTCTTTTGAGGATT (SEQ ID NO: 65) | CTGGGACGCTGACATGAAC (SEQ ID NO: 66) |
| BN-0003875 | GAGTTGGAGTTGTCATTCCGACAT (SEQ ID NO: 67) | AGTTGGAGTTGTCATTCCGACAG (SEQ ID NO: 68) | CATCCATTTTATCCACTATCTCAAC TCCAT (SEQ ID NO: 69) |
| BO-0103554 | GTCTCCTTGACTTGTAAGCTGGTTG (SEQ ID NO: 70) | GTCTCCTTGACTTGTAAGCTGGTTC (SEQ ID NO: 71) | AGAGCTTCAACGAGCGACAAC (SEQ ID NO: 72) |

TABLE 2-continued

Sequences of the primers allowing amplifying the green and white alleles of the markers linked to the color of the curd on chromosomes 1, 2, 4, 5, 6 and 8.

| Marker name | Green Allele Specific forward primer | White Allele Specific forward primer | Common reverse primer |
| --- | --- | --- | --- |
| BN-0004457 | ATTGAACAAGCTCCTCCTCCAGT (SEQ ID NO: 73) | GAACAAGCTCCTCCTCCAGG (SEQ ID NO: 74) | GAACCGGGATGAGGTCCGTAGAA (SEQ ID NO: 75) |
| BO-0101638 | ATGACTCTTCAACTGAATTTGGAG ATTTT (SEQ ID NO: 76) | GACTCTTCAACTGAATTTGGAGATT TC (SEQ ID NO: 77) | GGTGTACAATTATTGGCTCGGTG GTA (SEQ ID NO: 78) |
| BN-0003896 | CCCGGCGACGAAGACCCG (SEQ ID NO: 79) | ACCCGGCGACGAAGACCCA (SEQ ID NO: 80) | CATGTCCAAAACGTTTCTTAGCAT GTTGTA (SEQ ID NO: 81) |
| BN-0002182 | GAGTGGCAAGAGACTCTTCATGAT T (SEQ ID NO: 82) | AGTGGCAAGAGACTCTTCATGATG (SEQ ID NO: 83) | GGAAAAAGCTTGACAAGGATCGG CTT (SEQ ID NO: 84) |
| BO-0003450 | CCTAATCCTCGTATTTGGCTGCAT T (SEQ ID NO: 85) | CTAATCCTCGTATTTGGCTGCATC (SEQ ID NO: 86) | GGTACACATAGAACTGTAAATAAT AACAAT (SEQ ID NO: 87) |

As used herein, the term «orange curd» refers to a curd that has a color at harvest maturity similar to the white color of the example variety Sunset cited in the table of characteristics of the in TG/45/7 document edited by the International Union for the Protection of new Variety of plants (UPOV) and dated 2009 Apr. 1 (characteristic 21 at page 13 of the document).

As used herein, the term «purple curd» refers to a curd that has a color at harvest maturity similar to the white color of the example variety Graffiti cited in the table of characteristics of the in TG/45/7 document edited by the International Union for the Protection of new Variety of plants (UPOV) and dated 2009 Apr. 1 (characteristic 21 at page 13 of the document).

The term "Resistance" is as defined by the ISF (International Seed Federation) Vegetable and Ornamental Crops Section for describing the reaction of plants to pests or pathogens, and abiotic stresses for the Vegetable Seed Industry.

Specifically, by resistance, it is meant the ability of a plant variety to restrict the growth and development of a specified pest or pathogen and/or the damage they cause when compared to susceptible plant varieties under similar environmental conditions and pest or pathogen pressure. Resistant varieties may exhibit some disease symptoms or damage under heavy pest or pathogen pressure. Two levels of resistance are defined: High/standard resistance (HR) and Moderate/intermediate resistance (IR). High/standard resistance (HR) is defined as the ability of a plant variety to highly restrict the growth and development of the specified pest or pathogen under normal pest or pathogen pressure when compared to susceptible varieties. These plant varieties may, however, exhibit some symptoms or damage under heavy pest or pathogen pressure. Moderate/intermediate resistance (IR) is defined as the ability of a plant variety to restrict the growth and development of the specified pest or pathogen, but with exhibiting a greater range of symptoms or damage compared to high/standard resistant varieties. Moderately/intermediately resistant plant varieties will still show less severe symptoms or damage than susceptible plant varieties when grown under similar environmental conditions and/or pest or pathogen pressure. In the frame of the invention, a plant is considered as highly resistant (HF) to Xcc when the plant is scored at 9 or 8 in a field test (as described in example 1.2), and a plant is considered as intermediate resistant to Xcc when the plant is scored at 7 in a field test (as described in example 1.2).

As used herein, the term "susceptible" refers to a plant that is unable to restrict the growth and development of a specified pest or pathogen. In the frame of the invention, a plant is considered as susceptible to Xcc when the plant is scored at 5, 3 or 1 in a field test (as described in example 1.2).

As used herein, the term "offspring" or "progeny" refers to any plant resulting as progeny from a vegetative or sexual reproduction from one or more parent plants or descendants thereof. For instance, an offspring plant may be obtained by cloning or selfing of a parent plant or by crossing two parents plants and include selfings as well as the F1 or F2 or still further generations. An F1 is a first-generation offspring produced from parents at least one of which is used for the first time as donor of a trait, while offspring of a second generation (F2) or subsequent generations (F3, F4, etc.) are specimens produced from selfing of F1's, F2s, etc. An F1 may thus be (and usually) a hybrid resulting from a cross between two true breeding parents (true-breeding is homozygous for a trait), while an F2 may be (and usually is) an offspring resulting from self-pollination of said F1 hybrids.

As used herein, the term "cross", "crossing" refer to the process by which the pollen of one flower on one plant is applied (artificially or naturally) to the ovule (stigma) of a flower on another plant.

As used herein, the term "heterozygote" refers to a diploid or polyploidy cell or plant having different alleles (forms of a given gene or sequences) present at at least one locus.

As used herein, the term "heterozygous" refers to the presence of different alleles (forms of a given gene or sequences) at a particular locus.

As used herein, the term "homozygote" refers to an individual cell or plant having the same alleles at one or more loci on all homologous chromosomes.

As used herein, the term "homozygous" refers to the presence of identical alleles at one or more loci in homologous chromosomal segments.

As used herein, the term "inbred" or "line" refers to a relatively true-breeding strain.

As used herein, the term "hybrid" refers to any individual cell, tissue or plant resulting from a cross between parents that differ in one or more genes.

As used herein, the term "phenotype" refers to the observable characters of an individual cell, cell culture, organism (e.g. a plant), or group of organisms which results from the interaction between that individual genetic makeup (i.e. genotype) and the environment.

As used herein, the terms "introgression", "introgressed" and "introgressing" refer to the process whereby genes of one species, variety or cultivar are moved into the genome of another species, variety or cultivar, by crossing those species. The crossing may be natural or artificial. The process may be optionally be completed by backcrossing to the recurrent parent, in which case introgression refers to infiltration of the genes of one species into the gene pool of another through repeated backcrossing of an interspecific hybrid with one of its parents. An introgression may be also described as a heterologous genetic material stably integrated in the genome of a recipient plant.

By "association", or "genetic association", and more specifically genetic linkage, it is to be understood that a genetic polymorphism of the marker (i.e. a specific allele of the SNP marker) and the phenotype of interest occur simultaneously, i.e. are inherited together, more often than would be expected by chance occurrence, i.e. there is a non-random association of the allele and of the genetic sequences responsible for the phenotype, as a result of their proximity on the same chromosome.

As used herein, the term "plant part" refers to any part of a plant including but not limited to the shoot, root, stem, seeds, curd (also known as head), stipules, leaves, petals, flowers, ovules, bracts, branches, petioles, internodes, pubescence, side shoot, pollen, stamen, and florets.

By "*Xanthomonas campestris* pv. *campestris* (Xcc)", it is meant a plant-damaging Proteobacteria of the Xanthomonadaceae family that is capable of causing black rot. The disease is characterized by a V-shape yellow and/or brown lesion along the leaf margin and eventual vein blackening. Preferably, the Xcc is an Xcc of race 1, 2, 3, 4, 5, 6, 7, 8 and/or 9. Still preferably, the Xcc is an Xcc of race 1 and/or 4.

By «commercial plant», it is meant:
a young plant raised by nurseries that can be sold to plant growers, or
a plant produced by a plant grower from which the harvested curd is going to be sold through veiling or directly to customers.

SEQUENCE LISTING

SEQ ID NO: 1 shows the flanking sequences of the marker BN-0061002.
SEQ ID NO: 2 shows the flanking sequences of the marker BN-0060999.
SEQ ID NO: 3 shows the flanking sequences of the marker BN-0060988.
SEQ ID NO: 4 shows the flanking sequences of the marker BO-0101676.
SEQ ID NO: 5 shows the flanking sequences of the marker BN-0064638.
SEQ ID NO: 6 shows the flanking sequences of the marker BO-0101706.
SEQ ID NO: 7 shows the flanking sequences of the marker BO-0101641.
SEQ ID NO: 8 shows the flanking sequences of the marker BO-0002582.
SEQ ID NO: 9 shows the flanking sequences of the marker BN-0010479.
SEQ ID NO: 10 shows the flanking sequences of the marker BO-0101656.
SEQ ID NO: 11 shows the flanking sequences of the marker BO-0101655.
SEQ ID NO: 12 shows the flanking sequences of the marker BO-0103553.
SEQ ID NO: 13 shows the flanking sequences of the marker BO-0101639.
SEQ ID NO: 14 shows the flanking sequences of the marker BO-0101640.
SEQ ID NO: 15 shows the flanking sequences of the marker BN-0010593.
SEQ ID NO: 16 shows the flanking sequences of the marker BN-0000623.
SEQ ID NO: 17 shows the flanking sequences of the marker BN-0003844.
SEQ ID NO: 18 shows the flanking sequences of the marker BN-0002453.
SEQ ID NO: 19 shows the flanking sequences of the marker BN-0004384.
SEQ ID NO: 20 shows the flanking sequences of the marker BN-0004278.
SEQ ID NO: 21 shows the flanking sequences of the marker BN-0010638.
SEQ ID NO: 22 shows the flanking sequences of the marker BN-0010246.
SEQ ID NO: 23 shows the flanking sequences of the marker BN-0009825.
SEQ ID NO: 24 shows the flanking sequences of the marker BN-0001304.
SEQ ID NO: 25 shows the flanking sequences of the marker BN-0001306.
SEQ ID NO: 26 shows the flanking sequences of the marker BN-0002268.
SEQ ID NO: 27 shows the flanking sequences of the marker BN-0003875.
SEQ ID NO: 28 shows the flanking sequences of the marker BO-0103554.
SEQ ID NO: 29 shows the flanking sequences of the marker BN-0004457.
SEQ ID NO: 30 shows the flanking sequences of the marker BO-0101638.
SEQ ID NO: 31 shows the flanking sequences of the marker BN-0003896.
SEQ ID NO: 32 shows the flanking sequences of the marker BN-0002182.
SEQ ID NO: 33 shows the flanking sequences of the marker BO-0003450.
SEQ ID NO: 34 shows the sequence of the green allele specific forward primer for amplifying the marker BN-0000623.
SEQ ID NO: 35 shows the sequence of the white allele specific forward primer for amplifying the marker BN-0000623.
SEQ ID NO: 36 shows the sequence of the common reverse primer for amplifying the marker BN-0000623.
SEQ ID NO: 37 shows the sequence of the green allele specific forward primer for amplifying the marker BN-0003844.
SEQ ID NO: 38 shows the sequence of the white allele specific forward primer for amplifying the marker BN-0003844.
SEQ ID NO: 39 shows the sequence of the common reverse primer for amplifying the marker BN-0003844.
SEQ ID NO: 40 shows the sequence of the green allele specific forward primer for amplifying the marker BN-0002453.

SEQ ID NO: 41 shows the sequence of the white allele specific forward primer for amplifying the marker BN-0002453.
SEQ ID NO: 42 shows the sequence of the common reverse primer for amplifying the marker BN-0002453.
SEQ ID NO: 43 shows the sequence of the green allele specific forward primer for amplifying the marker BN-0004384.
SEQ ID NO: 44 shows the sequence of the white allele specific forward primer for amplifying the marker BN-0004384.
SEQ ID NO: 45 shows the sequence of the common reverse primer for amplifying the marker BN-0004384.
SEQ ID NO: 46 shows the sequence of the green allele specific forward primer for amplifying the marker BN-0004278.
SEQ ID NO: 47 shows the sequence of the white allele specific forward primer for amplifying the marker BN-0004278.
SEQ ID NO: 48 shows the sequence of the common reverse primer for amplifying the marker BN-0004278.
SEQ ID NO: 49 shows the sequence of the green allele specific forward primer for amplifying the marker BN-0010638.
SEQ ID NO: 50 shows the sequence of the white allele specific forward primer for amplifying the marker BN-0010638.
SEQ ID NO: 51 shows the sequence of the common reverse primer for amplifying the marker BN-0010638.
SEQ ID NO: 52 shows the sequence of the green allele specific forward primer for amplifying the marker BN-0010246.
SEQ ID NO: 53 shows the sequence of the white allele specific forward primer for amplifying the marker BN-0010246.
SEQ ID NO: 54 shows the sequence of the common reverse primer for amplifying the marker BN-0010246.
SEQ ID NO: 55 shows the sequence of the green allele specific forward primer for amplifying the marker BN-0009825.
SEQ ID NO: 56 shows the sequence of the white allele specific forward primer for amplifying the marker BN-0009825.
SEQ ID NO: 57 shows the sequence of the common reverse primer for amplifying the marker BN-0009825.
SEQ ID NO: 58 shows the sequence of the green allele specific forward primer for amplifying the marker BN-0001304.
SEQ ID NO: 59 shows the sequence of the white allele specific forward primer for amplifying the marker BN-0001304.
SEQ ID NO: 60 shows the sequence of the common reverse primer for amplifying the marker BN-0001304.
SEQ ID NO: 61 shows the sequence of the green allele specific forward primer for amplifying the marker BN-0001306.
SEQ ID NO: 62 shows the sequence of the white allele specific forward primer for amplifying the marker BN-0001306.
SEQ ID NO: 63 shows the sequence of the common reverse primer for amplifying the marker BN-0001306.
SEQ ID NO: 64 shows the sequence of the green allele specific forward primer for amplifying the marker BN-0002268.
SEQ ID NO: 65 shows the sequence of the white allele specific forward primer for amplifying the marker BN-0002268.
SEQ ID NO: 66 shows the sequence of the common reverse primer for amplifying the marker BN-0002268.
SEQ ID NO: 67 shows the sequence of the green allele specific forward primer for amplifying the marker BN-0003875.
SEQ ID NO: 68 shows the sequence of the white allele specific forward primer for amplifying the marker BN-0003875.
SEQ ID NO: 69 shows the sequence of the common reverse primer for amplifying the marker BN-0003875.
SEQ ID NO: 70 shows the sequence of the green allele specific forward primer for amplifying the marker BO-0103554.
SEQ ID NO: 71 shows the sequence of the white allele specific forward primer for amplifying the marker BO-0103554.
SEQ ID NO: 72 shows the sequence of the common reverse primer for amplifying the marker BO-0103554.
SEQ ID NO: 73 shows the sequence of the green allele specific forward primer for amplifying the marker BN-0004457.
SEQ ID NO: 74 shows the sequence of the white allele specific forward primer for amplifying the marker BN-0004457.
SEQ ID NO: 75 shows the sequence of the common reverse primer for amplifying the marker BN-0004457.
SEQ ID NO: 76 shows the sequence of the green allele specific forward primer for amplifying the marker BO-0101638.
SEQ ID NO: 77 shows the sequence of the white allele specific forward primer for amplifying the marker BO-0101638.
SEQ ID NO: 78 shows the sequence of the common reverse primer for amplifying the marker BO-0101638.
SEQ ID NO: 79 shows the sequence of the green allele specific forward primer for amplifying the marker BN-0003896.
SEQ ID NO: 80 shows the sequence of the white allele specific forward primer for amplifying the marker BN-0003896.
SEQ ID NO: 81 shows the sequence of the common reverse primer for amplifying the marker BN-0003896.
SEQ ID NO: 82 shows the sequence of the green allele specific forward primer for amplifying the marker BN-0002182.
SEQ ID NO: 83 shows the sequence of the white allele specific forward primer for amplifying the marker BN-0002182.
SEQ ID NO: 84 shows the sequence of the common reverse primer for amplifying the marker BN-0002182.
SEQ ID NO: 85 shows the sequence of the green allele specific forward primer for amplifying the marker BO-0003450.
SEQ ID NO: 86 shows the sequence of the white allele specific forward primer for amplifying the marker BO-0003450.
SEQ ID NO: 87 shows the sequence of the common reverse primer for amplifying the marker BO-0003450.
SEQ ID NO: 88 shows the sequence of the specific forward primer for amplifying the resistant allele for the marker BN-0061002.
SEQ ID NO: 89 shows the sequence of the specific forward primer for amplifying the susceptible allele for marker BN-0061002.
SEQ ID NO: 90 shows the sequence of the common reverse primer for amplifying the marker BN-0061002.

SEQ ID NO: 91 shows the sequence of the specific forward primer for amplifying the resistant allele for the marker BN-0060999.
SEQ ID NO: 92 shows the sequence of the specific forward primer for amplifying the susceptible allele for marker BN-0060999.
SEQ ID NO: 93 shows the sequence of the common reverse primer for amplifying the marker BN-0060999.
SEQ ID NO: 94 shows the sequence of the specific forward primer for amplifying the resistant allele for the marker BN-0060988.
SEQ ID NO: 95 shows the sequence of the specific forward primer for amplifying the susceptible allele for marker BN-0060988.
SEQ ID NO: 96 shows the sequence of the common reverse primer for amplifying the marker BN-0060988.
SEQ ID NO: 97 shows the sequence of the specific forward primer for amplifying the resistant allele for the marker BO-0101676.
SEQ ID NO: 98 shows the sequence of the specific forward primer for amplifying the susceptible allele for marker BO-0101676.
SEQ ID NO: 99 shows the sequence of the common reverse primer for amplifying the marker BO-0101676.
SEQ ID NO: 100 shows the sequence of the specific forward primer for amplifying the resistant allele for the marker BN-0064638.
SEQ ID NO: 101 shows the sequence of the specific forward primer for amplifying the susceptible allele for marker BN-0064638.
SEQ ID NO: 102 shows the sequence of the common reverse primer for amplifying the marker BN-0064638.
SEQ ID NO: 103 shows the sequence of the specific forward primer for amplifying the resistant allele for the marker BO-0101706.
SEQ ID NO: 104 shows the sequence of the specific forward primer for amplifying the susceptible allele for marker BO-0101706.
SEQ ID NO: 105 shows the sequence of the common reverse primer for amplifying the marker BO-0101706.
SEQ ID NO: 106 shows the sequence of the specific forward primer for amplifying the resistant allele for the marker BO-0101641.
SEQ ID NO: 107 shows the sequence of the specific forward primer for amplifying the susceptible allele for marker BO-0101641.
SEQ ID NO: 108 shows the sequence of the common reverse primer for amplifying the marker BO-0101641.
SEQ ID NO: 109 shows the sequence of the specific forward primer for amplifying the resistant allele for the marker BO-0002582.
SEQ ID NO: 110 shows the sequence of the specific forward primer for amplifying the susceptible allele for marker BO-0002582.
SEQ ID NO: 111 shows the sequence of the common reverse primer for amplifying the marker BO-0002582.
SEQ ID NO: 112 shows the sequence of the specific forward primer for amplifying the resistant allele for the marker BN-0010479.
SEQ ID NO: 113 shows the sequence of the specific forward primer for amplifying the susceptible allele for marker BN-0010479.
SEQ ID NO: 114 shows the sequence of the common reverse primer for amplifying the marker BN-0010479.
SEQ ID NO: 115 shows the sequence of the specific forward primer for amplifying the resistant allele for the marker BO-0101656.
SEQ ID NO: 116 shows the sequence of the specific forward primer for amplifying the susceptible allele for marker BO-0101656.
SEQ ID NO: 117 shows the sequence of the common reverse primer for amplifying the marker BO-0101656.
SEQ ID NO: 118 shows the sequence of the specific forward primer for amplifying the resistant allele for the marker BO-0101655.
SEQ ID NO: 119 shows the sequence of the specific forward primer for amplifying the susceptible allele for marker BO-0101655.
SEQ ID NO: 120 shows the sequence of the common reverse primer for amplifying the marker BO-0101655.
SEQ ID NO: 121 shows the sequence of the specific forward primer for amplifying the resistant allele for the marker BO-0103553.
SEQ ID NO: 122 shows the sequence of the specific forward primer for amplifying the susceptible allele for marker BO-0103553.
SEQ ID NO: 123 shows the sequence of the common reverse primer for amplifying the marker BO-0103553.
SEQ ID NO: 124 shows the sequence of the specific forward primer for amplifying the resistant allele for the marker BO-0101639.
SEQ ID NO: 125 shows the sequence of the specific forward primer for amplifying the susceptible allele for marker BO-0101639.
SEQ ID NO: 126 shows the sequence of the common reverse primer for amplifying the marker BO-0101639.
SEQ ID NO: 127 shows the sequence of the specific forward primer for amplifying the resistant allele for the marker BO-0101640.
SEQ ID NO: 128 shows the sequence of the specific forward primer for amplifying the susceptible allele for marker BO-0101640.
SEQ ID NO: 129 shows the sequence of the common reverse primer for amplifying the marker BO-0101640.
SEQ ID NO: 130 shows the sequence of the specific forward primer for amplifying the resistant allele for the marker BN-0010593.
SEQ ID NO: 131 shows the sequence of the specific forward primer for amplifying the susceptible allele for marker BN-0010593.
SEQ ID NO: 132 shows the sequence of the common reverse primer for amplifying the marker BN-0010593.

DETAILED DESCRIPTION OF THE INVENTION

According to a first embodiment, the present invention is directed to a cauliflower plant, that is resistant to *Xanthomonas campestris* pv. *campestris* (Xcc) and that does not have a green curd, said cauliflower plant (i) comprising in its genome introgressed sequences from a green cauliflower conferring resistance to said Xcc and (ii) not comprising in its genome a major QTL on chromosome 5 conferring the green color of the curd.

Said cauliflower plant according to the invention thus at least comprises one introgressed sequence, i.e. one quantitative trait locus (QTL), from said green cauliflower on chromosome 5 conferring resistance to Xcc that is no more linked to the major QTL MAC5 conferring the green color of the curd, and one introgressed sequence, i.e. one quantitative trait locus (QTL), from said green cauliflower on chromosome 7 conferring resistance to Xcc.

In some embodiments, the cauliflower plant according to the invention has a white curd, an orange curd, or a purple curd. Preferably, the cauliflower plant according to the invention has a white curd.

Said introgressed sequence conferring a resistance to Xcc that is present on chromosome 5 is preferably at least 1.02 Mb long. Preferably, said introgressed sequence conferring a resistance to Xcc that is present on chromosome 5 is not too long in order to avoid introgression of non-commercial features associated to the green cauliflower genotype, such as the green color of the curd. It is thus preferred according to the invention that the introgressed sequence conferring a resistance to Xcc that is present on chromosome 5 is less than 6 Mb long, preferably less than 5.89 Mb long. Still preferably, said introgressed sequence conferring a resistance to Xcc that is present on chromosome 5 is minimized to contain no sequences conferring the green curd phenotype to the cauliflower.

Said QTL conferring a resistance to Xcc that is present on chromosome 5 confers the resistance to a cauliflower plant or seed when present homozygously or heterozygously in the cauliflower genome.

In some embodiments, said QTL conferring a resistance to Xcc that is present on chromosome 5 is located within a chromosomal region that is delimited by marker BN-0061002 and marker BO-0101641 (or said otherwise by within a chromosomal region delimited by the nucleotides at positions 38 928 177 and 39 972 831 on chromosome 5). Preferably, said QTL conferring a resistance to Xcc that is present on chromosome 5 is located within a chromosomal region that is delimited by marker BN-0060988 and marker BO-0101641 (or said otherwise by within a chromosomal region delimited by the nucleotides at positions 38 948 228 and 39 972 831 on chromosome 5). In some embodiments, said QTL conferring a resistance to Xcc that is present on chromosome 5 can be identified by amplifying one or more of the following markers: BN-0061002, BN-0060999, BN-0060988, BO-0101676, BN-0064638, BO-0101706 and BO-0101641; or any other markers within a chromosomal region delimited by marker BN-0061002 and marker BO-0101641, or a chromosomal region delimited by marker BN-0060988 and marker BO-0101641. Said otherwise, said QTL conferring a resistance to Xcc that is present on chromosome 5 can be identified by amplifying (i) a region of chromosome 5 encompassing one or more of the following nucleotide positions: 38 928 177, 38 931 725, 38 948 228, 39 384 678, 39 900 371, 39 920 505 and 39 972 831, or (ii) a sequence of chromosome 5 comprising sequence SEQ ID NO: 1, SEQ ID NO: 2, SEQ ID NO: 3, SEQ ID NO: 4, SEQ ID NO: 5, SEQ ID NO: 6, or SEQ ID NO: 7, or a fragment thereof including the nucleotide at position 61 of SEQ ID NO: 1, SEQ ID NO: 2, SEQ ID NO: 3, SEQ ID NO: 4, SEQ ID NO: 5, SEQ ID NO: 6, or SEQ ID NO: 7 (respectively); preferably said fragment of sequence SEQ ID NO: 1, SEQ ID NO: 2, SEQ ID NO: 3, SEQ ID NO: 4, SEQ ID NO: 5, SEQ ID NO: 6, or SEQ ID NO: 7, including the nucleotide at position 61, comprises at least 10, 11, 12, 13, 14, 15, 16, 17, 18, 19 or 20 contiguous nucleotides of SEQ ID NO: 1, SEQ ID NO: 2, SEQ ID NO: 3, SEQ ID NO: 4, SEQ ID NO: 5, SEQ ID NO: 6, or SEQ ID NO: 7 (respectively).

Preferably, said QTL conferring a resistance to Xcc that is present on chromosome 5 can be identified by amplifying at least the marker BO-0101676, said otherwise by amplifying at least (i) a region of chromosome 5 encompassing the nucleotide position 39 384 678 or (ii) a sequence of chromosome 5 comprising sequence SEQ ID NO: 4, or a fragment thereof including the nucleotide at position 61 of SEQ ID NO: 4; preferably said fragment of sequence SEQ ID NO: 4, including the nucleotide at position 61, comprises at least 10, 11, 12, 13, 14, 15, 16, 17, 18, 19 or 20 contiguous nucleotides of SEQ ID NO: 4.

The alleles conferring the resistances to Xcc amplified by the markers on chromosome 5 here above mentioned are as described in Table 3.

TABLE 3

Markers linked to Xcc resistance on chromosome 5, location and flanking sequences.

| Marker name | Sequence surrounding the marker | Position on chr. | Position in SEQ ID | Alternative alleles (R/S) | SEQ ID NO |
|---|---|---|---|---|---|
| BN-0061002 | CAAAACATCAACCAAAAGTAAGAAAGACTACAAATTACTGA AAGGATGATTTTAATAACA<u>K</u>TTTTTATACAAACGGTCCACGA AARACATTAATAATTTTGTAATTTTTAAAATTAGGAAA | 38 928 177 | 61 | T/G | 1 |
| BN-0060999 | CRGTGGCGGAACCAGCCGCATCTTTCACCGGGGTCAATTT GATTCCGACTATAAATTGTA<u>M</u>KGGMCAWATTGATCTAATTA TATAGCACTTCACCAGATTTATTCAAGTAATTTTTTWTTTT | 38 931 725 | 61 | C/A | 2 |
| BN-0060988 | ACTTCATTTTTTCGTTTTATATTAACTTTTTCTTATCAACTCG TCATTAGTATTCTTTTC<u>M</u>ACGAATAGGACTCGGTTGTAGAA TAAATAAATCAMAACAACATGTCTTAAAAGTATTATA | 38 948 228 | 61 | C/A | 3 |
| BO-0101676 | GATTGCCAACAAGCACAAGCTTTTTCAGAGTAGTCATGTTT CCTACAAGAAAAGGAGAGA<u>R</u>CAAGAATCATTATGCTAATTG CTATTTTAATGATGTCATATGTAAATTCATTAACAAGCA | 39 384 678 | 61 | G/A | 4 |
| BN-0064638 | CTCTTCATCATGCATACAGACAAGAAGAATAAGGTTTCTTG ATTAACTCTTCACACGAAA<u>R</u>TTCTACTAGTTAAACTCGCTTT CTATATCGTTCTAATCAAAGATCTTGATCATGGCAGAT | 39 900 371 | 61 | A/G | 5 |

TABLE 3-continued

Markers linked to Xcc resistance on chromosome 5, location and flanking sequences.

| Marker name | Sequence surrounding the marker | Position on chr. | Position in SEQ ID | Alternative alleles (R/S) | SEQ ID NO |
|---|---|---|---|---|---|
| BO-0101706 | CAAAATTGTTTTTTTCCTGTTTGTATTGTTTAGAGACGGCGG CACAAACGCATCACCGGTWCGAGATTCCGGTTAGGTTATC AGGTTTTGGGTAAACCAACGGAATTAATTTTTGACATTA | 39 920 505 | 61 | T/A | 6 |
| BO-0101641 | GTCTTGATACTGCGGAGATTCTCCTTCGAGCTGTCTCCGAC GTATACTCACGCACCTCACMCGGTTCTTACACTTCATCCTC AGTTTGGTGCTCCGTTGATCTTCCACACGCTCCAAGATC | 39 972 831 | 61 | C/A | 7 |

Chr.: Chromosome,
R: Resistant,
S: Susceptible.

Said introgressed sequence conferring a resistance to Xcc that is present on chromosome 7 is preferably at least 705 kb long. It is preferred according to the invention that the introgressed sequence that is present on chromosome 7 is less than 3 Mb long, preferably less than 2.17 Mb long.

Said QTL conferring a resistance to Xcc that is present on chromosome 7 confers the resistance to a cauliflower plant or seed when present homozygously or heterozygously in the cauliflower genome.

In some embodiments, said QTL conferring a resistance to Xcc that is present on chromosome 7 is located within a chromosomal region that is delimited by marker BO-0002582 and marker BN-0010593 (or said otherwise by within a chromosomal region delimited by the nucleotides at positions 36 520 957 and 38 690 572 on chromosome 7). Preferably, said QTL conferring a resistance to Xcc that is present on chromosome 7 is located within a chromosomal region that is delimited by marker BO-0101656 and marker BO-0101639 (or said otherwise by within a chromosomal region delimited by the nucleotides at positions 37 334 130 and 38 038 738 on chromosome 7). In some embodiments, said QTL conferring a resistance to Xcc that is present on chromosome 7 can be identified by amplifying one or more of the following markers: BO-0002582, BN-0010479, BO-0101656, BO-0101655, BO-0103553, BO-0101639, BO-0101640 and BN-0010593; or any other markers within a chromosomal region delimited by marker BO-0002582 and marker BN-0010593, or a chromosomal region delimited by marker BO-0101656 and marker BO-0101639. Said otherwise, said QTL conferring a resistance to Xcc that is present on chromosome 7 can be identified by amplifying (i) a region of chromosome 7 encompassing one or more of the following nucleotide positions: 36 520 957, 36 859 354, 37 334 130, 37 489 538, 37 939 284, 38 038 738, 38 071 324, or 38 690 572, or (ii) a sequence of chromosome 7 comprising sequence SEQ ID NO: 8, SEQ ID NO: 9, SEQ ID NO: 10, SEQ ID NO: 11, SEQ ID NO: 12, SEQ ID NO: 13, SEQ ID NO: 14, or SEQ ID NO: 15 or a fragment thereof including the nucleotide at position 24 of SEQ ID NO: 8, or the nucleotide at position 61 of SEQ ID NO: 9, SEQ ID NO: 10, SEQ ID NO: 11, SEQ ID NO: 12, SEQ ID NO: 13, SEQ ID NO: 14, or SEQ ID NO: 15 (respectively); preferably said fragment of sequence SEQ ID NO: 8, including the nucleotide at position 24, or said fragment of SEQ ID NO: 9, SEQ ID NO: 10, SEQ ID NO: 11, SEQ ID NO: 12, SEQ ID NO: 13, SEQ ID NO: 14, or SEQ ID NO: 15, including the nucleotide at position 61, comprises at least 10, 11, 12, 13, 14, 15, 16, 17, 18, 19 or 20 contiguous nucleotides of SEQ ID NO: 8, SEQ ID NO: 9, SEQ ID NO: 10, SEQ ID NO: 11, SEQ ID NO: 12, SEQ ID NO: 13, SEQ ID NO: 14, or SEQ ID NO: 15 (respectively).

Preferably, said QTL conferring a resistance to Xcc that is present on chromosome 7 can be identified by amplifying at least the marker BO-0103553, said otherwise by amplifying at least (i) a region of chromosome 7 encompassing the nucleotide position 37 939 284 or (ii) a sequence of chromosome 7 comprising sequence SEQ ID NO: 12, or a fragment thereof including the nucleotide at position 61 of SEQ ID NO: 12; preferably said fragment of sequence SEQ ID NO: 12, including the nucleotide at position 61, comprises at least 10, 11, 12, 13, 14, 15, 16, 17, 18, 19 or 20 contiguous nucleotides of SEQ ID NO: 12.

The alleles conferring the resistances to Xcc amplified by the markers on chromosome 7 here above mentioned are as described in Table 4.

TABLE 4

Markers linked to Xcc resistance on chromosome 7, location and flanking sequences.

| Marker name | Sequence surrounding the marker | Position on chr. | Position in SEQ ID | Alternative alleles (R/S) | SEQ ID NO |
|---|---|---|---|---|---|
| BO-0002582 | CTGCAGGAAGCAATTCAGGAAAAYGGGAATGACAAGTTCCT CATTGATGGTTTCCCTCGCAATGAGGAAAACCGAGCGGCA TTTGAGAAAGTTGTAAGTAGCATTCAAAGTGTTTTAA | 36 520 957 | 24 | T/C | 8 |
| BN-0010479 | CAGGTATAAAAAAAGAGGTGCGAGTGCAGAAACCATGGAG AAAACAAAGGCTGCTGTGAGYCATCTCCACACTAGATACAT CGTTGACATGCAATCCATGGATTCAACTGTCTCTGAAGTA | 36 859 354 | 61 | C/T | 9 |

TABLE 4-continued

Markers linked to Xcc resistance on chromosome 7, location and flanking sequences.

| Marker name | Sequence surrounding the marker | Position on chr. | Position in SEQ ID | Alternative alleles (R/S) | SEQ ID NO |
|---|---|---|---|---|---|
| BO-0101656 | TCATGATTAACCTATCTAAGCCACATGGCCATGAATGAATC GAAATGTTTCCTATGCCTCYTAGCTGAGATGATATTCCGAA GCTCTTTGTCAATGCCGAAGAACACCATTGCTGCAGGGA | 37 334 130 | 61 | C/T | 10 |
| BO-0101655 | CAATCGTCTGAAATGCGAGGCACGAATATAGGACTTGGCC AACCTATAGATCGAGAAATCRAGAAGCAAACCAGGGTTTTC ATCACGTAACCACGGATGAGCTGCAAACACAGAACATATA | 37 489 538 | 61 | A/G | 11 |
| BO-0103553 | CATCTCCTGAACCAGCAGAGATCACAGTCGTGCCAACGGC GAACAAGTGTATATGTAATGMTAGGAAGGCTGAAACTGAAA ATGGACAGGGAGTTAAAAACGGCACACACTCCACTGCAGC | 37 939 284 | 61 | A/C | 12 |
| BO-0101639 | CATTTTGGGAAAATGGGTTTCCGATCAGCTTAACGCAAAAG TGGTTAAAAATAAAGATTTKTGCTCGGACAAAAGAAACTGA CAGGAGTTAACTTTGACTTGAATTTGGATAATAAAAAAA | 38 038 738 | 61 | T/G | 13 |
| BO-0101640 | AGCACTTTCTCTCGAGCAATAACAAGCCGAAGGTTGAAGAG GAAATATTTCATTTCTAATKTAACCTATTTTTCATTCCAAGAA TGTTAATTAGGATAGATCCTAGAAAATTCAGACAATA | 38 071 324 | 61 | G/T | 14 |
| BN-0010593 | TGCGGTGGAGGTTGTGCAGTGCCTGATTGAACATCATAAC GCGATTTTCACGGATGCAGASGAGACTGTATGGAGGTGAA AACAACACTTTGTTGTGGATGATGAATTAACCAGTGNGTTT | 38 690 572 | 61 | C/G | 15 |

Chr.: Chromosome,
R: Resistant,
S: Susceptible.

In some embodiments, amplification of the markers:
BN-0061002, BN-0060999, BN-0060988, BO-0101676, BN-0064638, BO-0101706 and BO-0101641 on chromosome 5; and
BO-0002582, BN-0010479, BO-0101656, BO-0101655, BO-0103553, BO-0101639, BO-0101640 and BN-0010593 on chromosome 7,
is performed by PCR using specific primers which can be used to amplify the resistant/susceptible allele of said markers.

In particular, the probes for amplifying the resistant and susceptible alleles of markers:
BN-0061002, BN-0060999, BN-0060988, BO-0101676, BN-0064638, BO-0101706 and BO-0101641 on chromosome 5; and
BO-0002582, BN-0010479, BO-0101656, BO-0101655, BO-0103553, BO-0101639, BO-0101640 and BN-0010593 on chromosome 7,
may have the sequences as described in Table 5.

TABLE 5

Sequences of the primers allowing amplifying the resistant and susceptible alleles of the markers linked to Xcc resistance on chromosomes 5 and 7.

| Marker name | Resistant Allele Specific forward primer | Susceptible Allele Specific forward primer | Common reverse primer |
|---|---|---|---|
| BN-0061002 | ACAAATTACTGAAAGGATGATTTTA ATAACAT (SEQ ID NO: 88) | ACAAATTACTGAAAGGATGATTTT AATAACAG (SEQ ID NO: 89) | ACAAAATTATTAATGTYTTTCGTGGA CCGT (SEQ ID NO: 90) |
| BN-0060999 | GTCAATTTGATTCCGACTATAAATT GTAC (SEQ ID NO: 91) | GGTCAATTTGATTCCGACTATAAA TTGTAA (SEQ ID NO: 92) | TACTTGAATAAATCTGGTGAAGTGC TATAT (SEQ ID NO: 93) |
| BN-0060988 | ATCAACTCGTCATTAGTATTCTTTT CC (SEQ ID NO: 94) | TATCAACTCGTCATTAGTATTCTTT TCA (SEQ ID NO: 95) | ACATGTTGTTKTGATTTATTTATTCT ACAA (SEQ ID NO: 96) |
| BO-0101676 | AAAATAGCAATTAGCATAATGATTO TTGC (SEQ ID NO: 97) | CATTAAAATAGCAATTAGCATAAT GATTCTTGT (SEQ ID NO: 98) | GCACAAGCTTTTTCAGAGTAGTCAT GTTT (SEQ ID NO: 99) |
| BN-0064638 | GATATAGAAAGCGAGTTTAACTAG TAGAAT (SEQ ID NO: 100) | ATATAGAAAGCGAGTTTAACTAGT AGAAC (SEQ ID NO: 101) | TGCATACAGACAAGAAGAATAAGGT TTCTT (SEQ ID NO: 102) |
| BO-0101706 | CTGATAACCTAACCGGAATCTCGA (SEQ ID NO: 103) | GATAACCTAACCGGAATCTCGT (SEQ ID NO: 104) | GTTTGTATTGTTTAGAGACGGCGGC A (SEQ ID NO: 105) |
| BO-0101641 | ACGTATACTCACGCACCTCACC (SEQ ID NO: 106) | GACGTATACTCACGCACCTCACA (SEQ ID NO: 107) | TGTGGAAGATCAACGGAGCACCAA A (SEQ ID NO: 108) |
| BO-0002582 | GCAGGAAGCAATTCAGGAAAAT (SEQ ID NO: 109) | CTGCAGGAAGCAATTCAGGAAAA C (SEQ ID NO: 110) | TGCGAGGGAAACCATCAATGAGGA A (SEQ ID NO: 111) |

TABLE 5-continued

Sequences of the primers allowing amplifying the resistant and susceptible alleles of the markers linked to Xcc resistance on chromosomes 5 and 7.

| Marker name | Resistant Allele Specific forward primer | Susceptible Allele Specific forward primer | Common reverse primer |
|---|---|---|---|
| BN-0010479 | AACGATGTATCTAGTGTGGAGATGG (SEQ ID NO: 112) | CAACGATGTATCTAGTGTGGAGATGA (SEQ ID NO: 113) | TGCGAGTGCAGAAACCATGGAGAAA (SEQ ID NO: 114) |
| BO-0101656 | GAATCGAAATGTTTCCTATGCCTCC (SEQ ID NO: 115) | ATGAATCGAAATGTTTCCTATGCCTCT (SEQ ID NO: 116) | CGGCATTGACAAAGAGCTTCGGAAT (SEQ ID NO: 117) |
| BO-0101655 | GGCCAACCTATAGATCGAGAAATCA (SEQ ID NO: 118) | GCCAACCTATAGATCGAGAAATCG (SEQ ID NO: 119) | GCTCATCCGTGGTTACGTGATGAAA (SEQ ID NO: 120) |
| BO-0103553 | AACGGCGAACAAGTGTATATGTAATGA (SEQ ID NO: 121) R | CGGCGAACAAGTGTATATGTAATGC (SEQ ID NO: 122) | GTGCCGTTTTTAACTCCCTGTCCAT (SEQ ID NO: 123) |
| BO-0101639 | CTGTCAGTTTCTTTTGTCCGAGCAA (SEQ ID NO: 124) | GTCAGTTTCTTTTGTCCGAGCAC (SEQ ID NO: 125) | GGGTTTCCGATCAGCTTAACGCAAA (SEQ ID NO: 126) |
| BO-0101640 | AATTAACATTCTTGGAATGAAAAATAGGTTAC (SEQ ID NO: 127) | AATTAACATTCTTGGAATGAAAAATAGGTTAA (SEQ ID NO: 128) | AATAACAAGCCGAAGGTTGAAGAGGAAA (SEQ ID NO: 129) |
| BN-0010593 | CGCGATTTTCACGGATGCAGAC (SEQ ID NO: 130) | CGCGATTTTCACGGATGCAGAG (SEQ ID NO: 131) | CACAACAAAGTGTTGTTTTCACCTCCATA (SEQ ID NO: 132) |

Insofar as the QTLs conferring resistance to Xcc can be identified by the specific alleles described in Tables 3 and 4, a plant of the invention comprises:
the following combinations of alleles conferring the resistance to Xcc on chromosome 5:
(i) allele T of BN-0061002, allele C of BN-0060999, allele C of BN-0060988, allele G of BO-0101676, allele A of BN-0064638, allele T of BO-0101706, and allele C of BO-0101641,
(ii) allele C of BN-0060988, allele G of BO-0101676, allele A of BN-0064638, allele T of BO-0101706, and allele C of BO-0101641, or
(iii) allele G of BO-0101676, and
the following combinations of alleles conferring the resistance to Xcc on chromosome 7:
(a) allele T of BO-0002582, allele C of BN-0010479, allele C of BO-0101656, allele A of BO-0101655, allele A of BO-0103553, allele T of BO-0101639, allele G of BO-0101640, and allele C of BN-0010593,
(b) allele C of BO-0101656, allele A of BO-0101655, allele A of BO-0103553, allele T of BO-0101639, or
(c) allele A of BO-0103553.

For example, the cauliflower plant according to the invention comprises the following combinations of alleles conferring the resistance to Xcc:
(1) the allele's combination (i), (ii) or (iii) on chromosome 5 as defined here above, and allele's combination (a) on chromosome 7 as defined here above,
(2) the allele's combination (i), (ii) or (iii) on chromosome 5 as defined here above, and allele's combination (b) on chromosome 7 as defined here above, or
(3) the allele's combination (i), (ii) or (iii) on chromosome 5 as defined here above, and allele's combination (c) on chromosome 7 as defined here above.

A resistant plant of the invention may be characterized by the presence of said alleles' combinations at homozygous state or heterozygous state.

Insofar as the QTLs conferring the color of the curd can be identified by the specific alleles described in Table 1, a plant of the invention comprises the following combination of alleles conferring the white color of the curd:
A) allele G of BO-0103554, allele G of BN-0004457, and/or allele G of BO-0101638 (i.e. the white alleles for the MAC5 QTL),
B) allele C of BN-0000623, allele T of BN-0003844, allele G of BN-0002453, allele A of BN-0004384, allele C of BN-0004278, allele G or A of BN-0010638, allele G of BN-0010246, allele T or C of BN-0001304, allele T or C of BN-0001306, allele T or G of BN-0002268, allele G of BN-0003875, allele G of BO-0103554, allele G of BN-0004457, allele G of BO-0101638, allele G of BN-0003896, allele A of BN-0002182, and allele T of BO-0003450 (i.e. the same alleles than those present in the genome of a plant corresponding to the deposited material FLA1-116-02S (NCIMB accession number 42693) or RSF1-BC3-F3 (NCIMB accession number 43442)), or
C) allele T of BN-0000623, allele A of BN-0003844, allele C of BN-0002453, allele G of BN-0004384, allele T of BN-0004278, allele G of BN-0010638, allele A of BN-0010246, allele T of BN-0009825, allele T of BN-0001304, allele T of BN-0001306, allele T of BN-0002268, allele G of BN-0003875, allele G of BO-0103554, allele G of BN-0004457, allele G of BO-0101638, allele A of BN-0003896, allele C of BN-0002182, and allele C of BO-0003450.

For example, a plant of the invention may comprise:
I) the allele's combination (1) conferring the resistance to Xcc on chromosomes 5 and 7 as defined here above with the allele's combination A), B), or C) conferring the white color of the curd,
II) the allele's combination (2) conferring the resistance to Xcc on chromosomes 5 and 7 as defined here above with the allele's combination A), B), or C) conferring the white color of the curd, or
III) the allele's combination (3) conferring the resistance to Xcc on chromosomes 5 and 7 as defined here above with the allele's combination A), B), or C) conferring the white color of the curd.

In some embodiments, said introgressed sequences from a green cauliflower conferring resistance to Xcc are chosen from the sequence present in the genome of a plant of the line FLA1-116-02S, which seeds are deposited under the NCIMB accession number 42693.

In some embodiments, said introgressed sequences from a green cauliflower conferring resistance to Xcc are as found in the genome of a plant corresponding to the deposited material FLA1-116-02S (NCIMB accession number 42693) or RSF1-BC3-F3 (NCIMB accession number 43442).

The deposited seeds and cauliflower thereof have been obtained from an initial cross between a green cauliflower, i.e. the introgression partner displaying the resistance to Xcc, and a white cauliflower SOL5, the recurrent susceptible parent. The deposited seeds thus represent a reservoir of introgressed sequences from green cauliflower into the white cauliflower genome, without having the major QTL MAC5 conferring the green color of the curd on chromosome 5. The introgressed sequences conferring resistance to Xcc according to the invention are chosen from this reservoir.

In some embodiments, the cauliflower plant according to the invention is line FLA1-116-02S, which seeds are deposited under NCIMB accession number 42693.

In some embodiments, the cauliflower plant according to the invention is line RSF1-BC3-F3, which seeds are deposited under NCIMB accession number 43442.

In some embodiments, a plant according to the invention may be a progeny or offspring of a plant grown from the deposited seeds of cauliflower line FLA1-116-02S, deposited at the NCIMB under the accession number 42693, or RSF1-BC3-F3 deposited under NCIMB accession number 43442. Plants grown from the deposited seeds are indeed homozygously resistant to Xcc and do not have a green curd, they thus bear in their genome the QTLs on chromosomes 5 and 7 conferring resistance to Xcc as defined here above at homozygous state, and do not bear in their genome the major QTL on chromosome 5 MAC5 conferring the green color of the curd as defined here above at homozygous state. They can be used to transfer these QTLs on chromosomes 5 and 7 conferring resistance to Xcc as defined here above without transferring the major QTL MAC5 on chromosome 5 conferring the green color of the curd as defined here above in another genetic background by crossing and selfing and/or backcrossing. A progeny of a plant obtained from the deposited seed can be identified by one skilled in the art, for example by using the markers BN-0061002, BN-0060999, BN-0060988, BO-0101676, BN-0064638, BO-0101706, BO-0101641, BO-0002582, BN-0010479, BO-0101656, BO-0101655, BO-0103553, BO-0101639, BO-0101640, BN-0010593, BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and/or BO-0003450.

The plant according to the invention may also be cytoplasmic male sterile, for example having the Ogura mitochondrial sterility.

In some embodiments, said resistance to Xcc from said green cauliflower is a resistance all Xcc races. Still preferably, said resistance from said green cauliflower is a resistance to Xcc races 1, and/or 4.

The resistance to Xcc is advantageously determined by comparison to a susceptible (commercial) line or hybrid, for example Spacestar. Resistance to Xcc is preferably determined on the basis of the pathological test described in the paragraph "Xcc test" of the examples, i.e. by determining the quantity of symptoms on the leaves. Preferably, this criterion is determined a few weeks after inoculation, preferably between at 1 and 1.5/2 months after inoculation. A resistance scoring is used to evaluate the resistance of the tested plant. Preferably, the resistance scoring for evaluation the resistance to Xcc is a scoring system ranging from 9 (=Highly Resistant) to 1 (=Susceptible). More precisely, the score of 9 indicates that there is no symptoms on the leaves; the score of 8 indicates 1-12% of symptoms on the leaves; the score of 7 indicates 13-25% of symptoms on the leaves; the score of 5 indicates 26-50% of symptoms on the leaves; the score of 3 indicates 51-75% on the leaves; and the score of 1 indicates more than 76% of symptoms on leaves. In such a scoring system, a plant population is highly resistant to Xcc if it has at least 50% of the plants with a score of 9 or 8. In one embodiment, a plant population is intermediate resistant to Xcc if it has at last 50% of the plants with a score of 7. In one embodiment, a plant population is susceptible to Xcc if it has at last 50% of the plants with a score of 5, 3 or 1.

Therefore, a plant according to the invention preferably displays a score comprised between 9 and 7.

According to a second aspect, the present invention is directed to parts of a cauliflower plant according to the invention.

In some embodiments, a part of a plant is a plant cell. The invention thus provides a cell of a cauliflower plant according to the invention, i.e. a cell that comprises in its genome introgressed sequences from a green cauliflower conferring resistance to Xcc, i.e. a cell that comprises at least a Quantitative Trait Loci (QTL) that is present on chromosome 5 conferring resistance to Xcc that is no more linked to the major QTL MAC5 on chromosome 5 conferring the green color of the curd and a QTL that is present on chromosome 7 conferring resistance to Xcc.

The different features of the introgressed sequences from the green cauliflower conferring resistance to Xcc have been defined in relation with the first aspect of the invention and apply mutatis mutandis to this aspect of the invention. The introgressed sequences from the green cauliflower conferring resistance to Xcc are thus preferably chosen from the sequence present in the genome of a cauliflower plant corresponding to the deposited material FLA1-116-02S (NCIMB accession number 42693) or RSF1-BC3-F3 (NCIMB accession number 43442). In some embodiments, said introgressed sequences from a green cauliflower conferring resistance to Xcc are as found in the genome of a plant corresponding to the deposited material FLA1-116-02S (NCIMB accession number 42693) or RSF1-BC3-F3 (NCIMB accession number 43442).

In some embodiments, said QTLs on chromosomes 5 and 7 conferring the resistance to Xcc are as defined in the first aspect of the invention.

In some embodiments, the alleles conferring the resistance to Xcc are as described in Tables 3 and 4.

In some embodiments, the alleles conferring the color of the curd are as described in Table 1.

In some embodiments, the plant part according to the invention comprises the allele's combination I) to III) as defined in the first aspect of the invention.

In some embodiments, the combination of alleles as described here above is chosen from those present in the genome of a plant corresponding to the deposited material FLA1-116-02S (NCIMB accession number 42693) or RSF1-BC3-F3 (NCIMB accession number 43442).

In some embodiments, the combination of alleles as described here above is as found in the genome of a plant corresponding to the deposited material FLA1-116-02S (NCIMB accession number 42693) or RSF1-BC3-F3 (NCIMB accession number 43442).

A plant cell of the invention may have the capacity to be regenerated into a whole plant, said plant having a commercially acceptable curd quality.

Alternatively, the invention is also directed to plant cells which are not regenerable, and thus are not capable of giving rise to a whole plant.

According to another embodiment, the plant part is any other part of a cauliflower plant according to the invention, it may be in particular seeds, reproductive material, roots, flowers or curd. Such a part comprises a cell as defined above, i.e. a cell comprising in its genome introgressed sequences from a green cauliflower conferring resistance to Xcc as described here above, without comprising in its genome a major QTL on chromosome 5 conferring the green color of the curd as described here above.

The invention is more particularly concerned with seed of a cauliflower plant, giving rise when grown up to a cauliflower plant resistant to Xcc and not having a green curd as defined above. Such seed are thus 'seed of a cauliflower plant of the invention', i.e. seed giving rise to a cauliflower plant of the invention. The invention is also concerned with seed from a cauliflower plant of the invention, i.e. obtained from such a cauliflower plant after selfing or crossing, provided however that the cauliflower plant obtained from said seed is resistant to Xcc due to the introgressed sequences from a green cauliflower as defined here above conferring said resistance, and does not have a green curd due to the absence of the major QTL MAC5 on chromosome 5 conferring the green color of the curd as defined here above.

The present invention is also directed to a tissue culture of regenerable cells of the plant as defined above according to the present invention; preferably, the regenerable cells are derived from embryos, protoplasts, meristematic cells, callus, pollen, leaves, anthers, stems, petioles, roots, root tips, fruits, seeds, flowers, cotyledons, and/or hypocotyls of the invention, and thus comprises the in its genome introgressed sequences from a green cauliflower conferring resistance to Xcc as described here above, without comprising in its genome a major QTL on chromosome 5 conferring the green color of the curd as described here above.

The tissue culture will preferably be capable of regenerating plants having the physiological and morphological characteristics of the foregoing cauliflower plant, and of regenerating plants having substantially the same genotype as the foregoing cauliflower plant. The present invention also provides cauliflower plants regenerated from the tissue cultures of the invention.

The invention also provides a protoplast of the plant defined above, or from the tissue culture defined above, said protoplast comprising in its genome introgressed sequences from a green cauliflower conferring resistance to Xcc as described here above, without comprising in its genome a major QTL on chromosome 5 conferring the green color of the curd as described here above.

All the embodiments detailed in the preceding section in connection with the first aspect of the invention are also embodiments according to this second aspect of the invention.

According to a third aspect, the present invention is also directed to the use of a cauliflower plant according to the first aspect of the invention, i.e. resistant to Xcc and not having a green curd, as a breeding partner in a breeding program for obtaining cauliflower plants resistant to Xcc and, not having a green curd or having a white color curd. Indeed, such a cauliflower plant according to the first aspect of the invention harbors in its genome the introgressed sequences from a green cauliflower as defined here above conferring said resistance, but does not comprise the QTL(s) conferring the green color of the curd as defined here above (i.e. said plant does not comprise at least the major QTL MAC5 on chromosome 5 conferring the green color of the curd as defined here above). By crossing this plant with susceptible or less resistant cauliflower plants, it is thus possible to transfer this introgressed sequences, conferring the desired phenotype, to the progeny. A cauliflower plant according to the invention can thus be used as a breeding partner for introgressing the introgressed sequences from a green cauliflower as defined here above conferring said resistance to Xcc without introgressing the QTL(s) conferring the green color of the curd into a cauliflower plant or germplasm (i.e. without introgressing at least the major QTL MAC5 on chromosome 5 conferring the green color of the curd as defined here above). The invention is also directed to the same use with plants or seed of FLA1-116-02S, as deposited at NCIMB under accession number 42693, or RSF1-BC3-F3, as deposited at NCIMB under accession number 43442. Said plants are also suitable as introgression partners in a breeding program aiming at conferring the desired phenotype to a cauliflower plant or germplasm.

In such a breeding program, the selection of the progeny displaying the desired phenotype, or bearing sequences linked to the desired phenotype, can advantageously be carried out on the basis of the allele of the markers disclosed here above. The progeny is preferably selected on the presence of the allele's combinations I) to III) as defined in the first aspect of the invention.

The selection of the progeny having the desired phenotype can also be made on conditions of pathogens infestation, as disclosed inter alia in the section Xcc test of the examples.

A cauliflower plant according to the invention, or as deposited under accession number NCIMB 42693 or NCIMB 43442, is thus particularly valuable in a marker assisted selection program for obtaining commercial cauliflower lines and varieties resistant to Xcc and not having a green curd.

Any embodiment described for the 1st and 2nd aspects of the invention is also applicable to this third aspect of the invention.

The invention is also directed to the use of said plants in a program aiming at identifying, sequencing and/or cloning the genetic sequences conferring the desired phenotype.

Any specific embodiment described for the previous aspect of the invention is also applicable to this aspect of the invention, especially with regard to the features of the QTLs conferring the phenotype of interest.

According to another aspect, the invention also concerns methods for the production of cauliflower plants resistant to Xcc and, not having a green curd, especially commercial plants. A method or process for the production of a cauliflower plant having these features comprises the following steps:
 a) crossing a plant according to the first aspect of the invention and a susceptible or less resistant cauliflower plant, in which the desired phenotype is to be imported or improved,
 b) selecting one resistant plant to Xcc and not having a green curd in the progeny thus obtained, or one plant bearing introgressed sequences from a green cauliflower conferring resistance to Xcc but not bearing a major QTL on chromosome 5 conferring the green color of the curd, c) optionally self-pollinating one or several times or submitting to haplodiploidization process the resistant plant obtained at step b) and selecting a cauliflower plant resistant to Xcc and not having a green curd in the progeny thus obtained, d) backcrossing the resistant plant not having a green curd selected in step b) or c) with a susceptible cauliflower plant (i.e. susceptible to Xcc), and e) selecting a plant resistant to Xcc and not having a green curd.

Alternatively, the method or process may comprise the following steps:

a1) crossing a plant according to the first aspect of the invention and a susceptible or less resistant cauliflower plant, in which the desired phenotype is to be imported or improved, thus generating the F1 population, a2) selfing the F1 population to create F2 population, or submitting the F1 population to haplo-diploidization process to create a double haploid population, b) selecting resistant individuals not having a green curd in the progeny thus obtained, c) optionally self-pollinating one or several times or submitting to haplodiploidization process the resistant cauliflower plant not having a green curd obtained at step b) and selecting a resistant cauliflower plant not having a green curd in the progeny thus obtained, d) backcrossing the resistant cauliflower plant not having a green curd selected in step c) or d) with a susceptible cauliflower plant (i.e. susceptible to Xcc), e) selecting a cauliflower plant resistant to Xcc not having a green curd.

In some embodiments, cauliflower plant resistant to Xcc not having a green curd can be selected at steps b), c) and e).

The cauliflower plant selected at step e) is preferably a commercial plant, especially a plant not having a green curd or having white color curd, with resistance to Xcc.

Preferably, steps d) and e) are repeated at least twice and preferably three times, not necessarily with the same susceptible cauliflower plant. Said susceptible cauliflower plant is preferably a breeding line.

The self-pollination, haplodiploidization process and backcrossing steps may be carried out in any order and can be intercalated, for example a backcross can be carried out before and after one or several self-pollinations, and self-pollinations or haplodiploidization process can be envisaged before and after one or several backcrosses.

In some embodiments, such a method is advantageously carried out by using markers as described here above for one or more of the selections carried out at steps b), c) and/or e) for selecting cauliflower plants resistant to Xcc and not having a green curd. In some embodiments, the markers for selecting cauliflower plants resistant to Xcc not having a green curd are:

one or more of the markers BN-0061002, BN-0060999, BN-0060988, BO-0101676, BN-0064638, BO-0101706 and BO-0101641 on chromosome 5, or all the markers BN-0061002, BN-0060999, BN-0060988, BO-0101676, BN-0064638, BO-0101706 and BO-0101641 on chromosome 5, or a combination of the markers BN-0061002, BN-0060999, BN-0060988, BO-0101676, BN-0064638, BO-0101706 and BO-0101641 on chromosome 5, one or more of the markers BO-0002582, BN-0010479, BO-0101656, BO-0101655, BO-0103553, BO-0101639, BO-0101640 and BN-0010593 on chromosome 7, or all the markers BO-0002582, BN-0010479, BO-0101656, BO-0101655, BO-0103553, BO-0101639, BO-0101640 and BN-0010593 on chromosome 7, or a combination of the markers BO-0002582, BN-0010479, BO-0101656, BO-0101655, BO-0103553, BO-0101639, BO-0101640 and BN-0010593 on chromosome 7, and one or more of the markers BO-0103554, BN-0004457, and BO-0101638 on chromosome 5, or all the markers BO-0103554, BN-0004457, and BO-0101638 on chromosome 5, or a combination of the markers BO-0103554, BN-0004457, and BO-0101638 on chromosome 5.

In some embodiments, the selection of cauliflower plants resistant to Xcc and not having a green curd can further be made on the detection of one or more of the markers BN-0000623, BN-0003844, BN-0002453, BN-0004384, BN-0004278, BN-0010638, BN-0010246, BN-0009825, BN-0001304, BN-0001306, BN-0002268, BN-0003875, BN-0003896, BN-0002182, and BO-0003450 as described here above, or of all the markers BN-0000623, BN-0003844, BN-0002453, BN-0004384, BN-0004278, BN-0010638, BN-0010246, BN-0009825, BN-0001304, BN-0001306, BN-0002268, BN-0003875, BN-0003896, BN-0002182, and BO-0003450 as described here above, or of a combination of the markers BN-0000623, BN-0003844, BN-0002453, BN-0004384, BN-0004278, BN-0010638, BN-0010246, BN-0009825, BN-0001304, BN-0001306, BN-0002268, BN-0003875, BN-0003896, BN-0002182, and BO-0003450 as described here above.

In some embodiments, the plant selected at any one of steps b), c) and/or e) is selected on the presence of the allele's combination I), II or III) as defined in the first aspect of the invention.

The selection of the progeny having the desired phenotype can also be made on conditions of pathogen infestation, as disclosed inter alia the section Xcc test of the examples.

The method used for allele detection can be based on any technique allowing the distinction between two different alleles of a marker, on a specific chromosome.

The present invention also concerns a cauliflower plant obtained or obtainable by such a method. Such a plant is indeed a cauliflower plant that is resistant to Xcc and that has not a green curd according to the first aspect of the invention.

According to a further aspect, the present invention is also directed to hybrid cauliflower plants obtainable by crossing a resistant plant according to the first aspect of the invention, such as a plant FLA1-116-02S, a representative sample of seeds which have been deposited under the NCIMB accession number 42693, or plant RSF1-BC3-F3, a representative sample of seeds which have been deposited under the NCIMB accession number 43442, or a resistant plant obtainable by the methods disclosed above, with a cauliflower plant of, for example a plant susceptible to Xcc infection, or a plant with a different level of resistance to Xcc infection. A particularly preferred hybrid cauliflower plant, is a plant which displays any trait or phenotype of agronomical interest.

The invention is also directed to a method for obtaining commercial cauliflower plants that are resistant to Xcc and that have not a green curd, said method comprising the steps of:

backcrossing a plant obtained by germinating the deposited seeds FLA1-116-02S (NCIMB accession number 42693) or RSF1-BC3-F3 (NCIMB accession number 43442), or a plant according to the first aspect of the invention, with a cauliflower plant, for example a cauliflower plant susceptible to Xcc, selecting a plant resistant to Xcc and that has not a green curd.

The selection in the second step is preferably carried out as detailed above for the other methods of the invention. Said selection is preferably carried out on the presence of one or more of the specific alleles of the markers as described here above, as found in line FLA1-116-02S or RSF1-BC3-F3.

The selected cauliflower plant is preferably a commercial plant, especially a plant not having a green curd or having white color curd, with resistance to Xcc.

Also provided are methods for producing cauliflower plants seed. In some embodiments, the methods comprise crossing the cauliflower plant according to the invention with itself or with another cauliflower plant, and harvesting the resultant seeds.

In addition to introgression of the sequences or QTLs associated to resistance to Xcc, as detailed in the methods of the invention, said sequences can also be introduced into cauliflower background by genetic engineering in order to obtain a commercial cauliflower plant resistant to Xcc. The identification and cloning of the introgressed QTLs from cauliflower conferring the desired phenotype, inter alia from the deposit, are routine for the skilled person.

According to a further aspect, the present invention provides a plant obtained or obtainable by one of the methods described above. Such a plant is indeed a cauliflower plant having the desired phenotype according to the first aspect of the invention, i.e. resistant to Xcc and not having a green curd.

It is noted that the seeds or plants of the invention may be obtained by different processes, in particular technical processes such as UV mutagenesis or genetic engineering such as guided recombination, and are not exclusively obtained by means of an essentially biological process.

According to such an aspect, the invention relates to a cauliflower plant or seed, preferably a non-naturally occurring cauliflower plant or seed, which may comprise one or more mutations in its genome, which provides the mutant plant a resistance to Xcc, which mutation is as present, for example, in the genome of plants of which a representative sample was deposited with the NCIMB under deposit number NCIMB 42693 or NCIMB 43442.

Preferably, the mutations are the integration of the Quantitative Trait Loci (QTL) that is present on chromosome 5 conferring resistance to Xcc and the QTL that is present on chromosome 7 conferring resistance to Xcc as described above, in replacement of the homologous sequences of a cauliflower plants. Even more preferably, the mutation is the (i) substitution of the sequence comprising the markers BN-0061002, BN-0060999, BN-0060988, BO-0101676, BN-0064638, BO-0101706 and BO-0101641 on chromosome 5 of a cauliflower genome, or a fragment thereof, by the homologous sequence on chromosome 5 present in the genome of a plant of which a representative sample was deposited with the NCIMB under deposit number NCIMB 42693, and (ii) substitution of the sequence comprising the markers BO-0002582, BN-0010479, BO-0101656, BO-0101655, BO-0103553, BO-0101639, BO-0101640 and BN-0010593 on chromosome 7 of a cauliflower genome, or a fragment thereof, by the homologous sequence on chromosome 7 present in the genome of a plant of which a representative sample was deposited with the NCIMB under deposit number NCIMB 42693 or NCIMB 43442, wherein the sequences or fragments thereof confer resistance to Xcc. Such mutation may further include the deletion of at least the major QTL MAC5 on chromosome 5 conferring the green color of the curd as defined here above.

In an embodiment, the invention relates to a method for obtaining a cauliflower plant or seed carrying one or more mutations in its genome, which provides the plant with a resistance to Xcc. Such a method is illustrated in example 3 and may comprise:

a) treating M0 seeds of a cauliflower plant to be modified with a mutagenic agent to obtain M1 seeds;
b) growing plants from the thus obtained M1 seeds to obtain M1 plants;
c) producing M2 seeds by self-fertilisation of M1 plants; and
d) optionally repeating step b) and c) n times to obtain M2+n seeds.

The M2+n seeds are grown into plants and submitted to Xcc infection. The surviving plants, or those with the milder symptoms of Xcc infection, are multiplied one or more further generations while continuing to be selected for their resistance to Xcc.

In this method, the M1 seeds of step a) can be obtained via chemical mutagenesis such as EMS mutagenesis. Other chemical mutagenic agents include but are not limited to, diethyl sufate (des), ethyleneimine (ei), propane sultone, N-methyl-N-nitrosourethane (mnu), N-nitroso-N-methyl-urea (NMU), N-ethyl-N-nitrosourea (enu), and sodium azide.

Alternatively, the mutations are induced by means of irradiation, which is for example selected from x-rays, fast neutrons, UV radiation.

In another embodiment of the invention, the mutations are induced by means of genetic engineering. Such mutations also include the integration of sequences conferring the Xcc resistance, as well as the substitution of residing sequences by alternative sequences conferring the Xcc resistance.

The genetic engineering means which can be used include the use of all such techniques called New Breeding Techniques which are various new technologies developed and/or used to create new characteristics in plants through genetic variation, the aim being targeted mutagenesis, targeted introduction of new genes or gene silencing (RdDM). Example of such new breeding techniques are targeted sequence changes facilitated thru the use of Zinc finger nuclease (ZFN) technology (ZFN-1, ZFN-2 and ZFN-3, see U.S. Pat. No. 9,145,565, incorporated by reference in its entirety), Oligonucleotide directed mutagenesis (ODM), Cisgenesis and intragenesis, RNA-dependent DNA methylation (RdDM, which does not necessarily change nucleotide sequence but can change the biological activity of the sequence), Grafting (on GM rootstock), Reverse breeding, Agro-infiltration (agro-infiltration "sensu stricto", agro-inoculation, floral dip), Transcription Activator-Like Effector Nucleases (TALENs, see U.S. Pat. Nos. 8,586,363 and 9,181,535, incorporated by reference in their entireties), the CRISPR/Cas system (see U.S. Pat. Nos. 8,697,359; 8,771,945; 8,795,965; 8,865,406; 8,871,445; 8,889,356; 8,895,308; 8,906,616; 8,932,814; 8,945,839; 8,993,233; and 8,999,641, which are all hereby incorporated by reference), engineered meganuclease re-engineered homing endonucleases, DNA guided genome editing (Gao et al., Nature Biotechnology (2016), doi: 10.1038/nbt.3547, incorporated by reference in its entirety), and Synthetic genomics). A major part of today's targeted genome editing, another designation for New Breeding Techniques, is the applications to induce a DNA double strand break (DSB) at a selected location in the genome where the modification is intended. Directed repair of the DSB allows for targeted genome editing. Such applications can be utilized to generate mutations (e.g., targeted mutations or precise native gene editing) as well as precise insertion of genes (e.g., cisgenes, intragenes, or transgenes). The applications leading to mutations are often identified as site-directed nuclease (SDN) technology, such as SDN1, SDN2 and SDN3. For SDN1, the outcome is a targeted, non-specific genetic deletion mutation: the position of the DNA DSB is precisely selected, but the DNA repair by the host cell is random and results in small nucleotide deletions, additions or substitutions. For SDN2, a SDN is used to generate a targeted DSB and a DNA repair template (a short DNA sequence identical to the targeted DSB DNA sequence except for one or a few nucleotide changes) is used to repair the DSB: this results in a targeted and predetermined point mutation in the desired gene of interest. As to the SDN3, the SDN is used along with a DNA repair template that contains new DNA sequence (e.g. gene). The outcome of the technology would be the integration of that DNA sequence into the plant genome. The most likely application illustrating the use of SDN3 would be the insertion of cisgenic, intragenic, or transgenic expression cassettes at a selected genome location. A complete description of each of these techniques can be found in the report made by the Joint Research Center (JRC) Institute for Prospective Technological Studies of the European Commission in 2011 and titled "New plant breeding techniques-State-of-the-art and prospects for commercial development", which is incorporated by reference in its entirety.

The present invention also provides methods for detecting and/or selecting a cauliflower plant that is resistant to Xcc and that has not a green curd, wherein said method comprises the step of detecting the presence of introgressed sequences from a green cauliflower conferring resistance to Xcc, and detecting the absence of a major QTL on chromosome 5 conferring the green color of the curd. In some embodiments, said method comprises the steps of detecting the presence of one QTL on chromosome 5 located within the chromosomal region that is delimited by marker BN-0061002 and marker BO-0101641 and one QTL on chromosome 7 located within a chromosomal region that is delimited by marker BO-0002582 and marker BN-0010593, and detecting the absence of a major QTL on chromosome 5 located within a chromosomal region that is delimited by marker BO-0103554 and marker BO-0101638.

Preferably, said QTL that is present on chromosome 5 is located within a chromosomal region that is delimited by marker BN-0060988 and marker BO-0101641. In some embodiments, said QTL that is present on chromosome 5 can be identified by amplifying any one of the following markers: BN-0061002, BN-0060999, BN-0060988, BO-0101676, BN-0064638, BO-0101706 and BO-0101641 markers. Preferably, said QTL that is present on chromosome 5 can be identified by amplifying at least the marker BO-0101676.

Preferably, said QTL that is present on chromosome 7 is located within a chromosomal region that is delimited by marker BO-0101656 and marker BO-0101639. In some embodiments, said QTL that is present on chromosome 7 can be identified by amplifying any one of the following markers: BO-0002582, BN-0010479, BO-0101656, BO-0101655, BO-0103553, BO-0101639, BO-0101640 and/or BN-0010593. Preferably, said QTL that is present on chromosome 7 can be identified by amplifying at least the marker BO-0103553.

Preferably, said major QTL on chromosome 5 conferring the green color of the curd can be identified by amplifying any one of the following markers: BO-0103554, BN-0004457 and BO-0101638.

Preferably, a plant is selected if at least the allele's combination the allele's combination I), as defined in the first aspect of the invention is detected, in a genetic material sample of the plant to be selected. Still preferably, a plant is selected if the allele's combination the allele's combination II) or III), as defined in the first aspect of the invention is detected, in a genetic material sample of the plant to be selected.

In some embodiments, detection of the markers BN-0061002, BN-0060999, BN-0060988, BO-0101676, BN-0064638, BO-0101706, BO-0101641, BO-0002582, BN-0010479, BO-0101656, BO-0101655, BO-0103553, BO-0101639, BO-0101640, BN-0010593, BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and/or BO-0003450 is performed by amplification, e.g. by PCR, using, for each marker, one forward primer which can be used for amplifying the resistant allele, one forward primer which can be used for amplifying the susceptible allele and one common reverse primer. In particular, the primers for amplifying each of said markers may have the sequences as described in Table 5.

In a preferred embodiment, the amplification is as described in the examples. In a still preferred embodiment, the amplification is performed using a two-step touchdown method in which the elongation and annealing steps are incorporated into a single step. The temperature used for the annealing stage determines the specificity of the reaction and hence the ability of the primers to anneal to the DNA template. A touchdown PCR involves a first step of Taq polymerase activation, followed by a second step called the touchdown step that involves a high annealing temperature and incrementally decreasing the annealing temperature in each PCR cycle, and a third step of DNA amplification. The higher annealing temperatures in the early cycles of a touchdown ensure that only very specific base pairing will occur between the DNA and the primer, hence the first sequence to be amplified is most likely to be the sequence of interest. The annealing temperature is gradually decreased to increase the efficiency of the reaction. The regions that were originally amplified during the highly specific early touchdown cycles will be further amplified and outcompete any non-specific amplification that may occur at the lower temperatures.

In a preferred embodiment, the first step of Taq polymerase activation may be performed under heating conditions ranging from 90° C. to 105° C., during 10 min to 20 min. Preferably, the heating conditions range from 92° C. to 102° C., more preferably from 93° C. to 98° C., still more preferably the heating conditions are at 94° C. Preferably, the Taq polymerase activation step is performed during 10 min to 18 min, more preferably during 13 min to 15 min, still more preferably the initial denaturation step is performed during 15 min. In a preferred embodiment, the Taq polymerase activation step is performed at 94° C. during 15 min.

In a preferred embodiment, the touchdown step may be performed with a high annealing temperature ranging from 90° C. to 105° C., during 1 s to 30 s, followed by an annealing temperature ranging from 60° C. to 70° C., during 15 s to 90 s. Preferably, the touchdown step may be performed with a high annealing temperature at 94° C., during 20 s, followed by an annealing temperature at 65° C. during 60 s. The touchdown step may be repeated during 5 to 25 cycles, preferably during 10 cycles, with an incrementally decrease of the annealing temperature between 0.5° C. to 1° C. per cycle leading to a final annealing temperature ranging from 35° C. to 67° C. Preferably the touchdown step may be performed with a high annealing temperature at 94° C. during 20 s, followed by an annealing temperature at 65° C. during 60 s with an incrementally decrease of the annealing temperature of 0.8° C. per cycle leading to a final annealing temperature at 57° C. after 10 cycles.

In a preferred embodiment, the third step of DNA amplification may be performed in two round with a first round at a temperature ranging from 90° C. to 105° C., during 1 s to 40 s, followed by a second round at a temperature ranging from 50° C. to 70° C., during 1 s to 90 s. Preferably the first round may be performed at a temperature ranging from 92° C. to 98° C., during 15 s to 30 s. Preferably the second round may be performed at a temperature ranging from 55° C. to 65° C., during 40 s to 65 s. Still preferably, the third step of DNA amplification may be performed in two round with a first round at a temperature of 94° C. during 20 s, followed by a second round at a temperature of 57° C. during 60 s. The third step of DNA amplification may be repeated during 20 to 45 cycles, preferably during 15 to 35 cycles. Still more preferably, the third step of DNA amplification is repeated during 35 cycles.

The present invention is also directed to hybrid cauliflower plant, obtained or obtainable by crossing a cauliflower plant according to the first aspect of the invention, or a resistant plant obtained or obtainable by the method disclosed here above, with a cauliflower plant, for example a cauliflower plant susceptible to Xcc, or a cauliflower plant with a different level of resistance to Xcc. A particularly preferred hybrid cauliflower plant, is a plant which displays male sterility, or any other trait or phenotype of agronomical interest.

According to a further aspect, the present invention also provides molecular markers that are linked to the QTL on chromosome 5 and/or on chromosome 7 as defined here above conferring the resistance to Xcc.

In some embodiments, said molecular markers linked to the QTL conferring the resistance to Xcc on chromosome 5 are one or more of the markers BN-0061002, BN-0060999, BN-0060988, BO-0101676, BN-0064638, BO-0101706 and BO-0101641, or all the markers BN-0061002, BN-0060999, BN-0060988, BO-0101676, BN-0064638, BO-0101706 and BO-0101641 as described here above, or a combination of the markers BN-0061002, BN-0060999, BN-0060988, BO-0101676, BN-0064638, BO-0101706 and BO-0101641. Preferably, said molecular markers linked to the QTL conferring the resistance to Xcc on chromosome 5 is at least the marker BO-0101676.

In some embodiments, said molecular markers linked to the QTL conferring the resistance to Xcc on chromosome 7 are one or more of the markers BO-0002582, BN-0010479, BO-0101656, BO-0101655, BO-0103553, BO-0101639, BO-0101640 and BN-0010593 as described here above, or all the markers BO-0002582, BN-0010479, BO-0101656, BO-0101655, BO-0103553, BO-0101639, BO-0101640 and BN-0010593, or a combination of the markers BO-0002582, BN-0010479, BO-0101656, BO-0101655, BO-0103553, BO-0101639, BO-0101640 and BN-0010593. Preferably, said molecular marker linked to the QTL conferring the resistance to Xcc on chromosome 7 is at least the marker BO-0103553.

The sequences of the markers as mentioned above are described in Tables 3 and 4.

Further provided is the use of:
one or more of the molecular markers BN-0061002, BN-0060999, BN-0060988, BO-0101676, BN-0064638, BO-0101706, and BO-0101641, or all the markers BN-0061002, BN-0060999, BN-0060988, BO-0101676, BN-0064638, BO-0101706 and BO-0101641 as described here above, or a combination of the markers BN-0061002, BN-0060999, BN-0060988, BO-0101676, BN-0064638, BO-0101706 and BO-0101641, and/or
one or more of the molecular markers BO-0002582, BN-0010479, BO-0101656, BO-0101655, BO-0103553, BO-0101639, BO-0101640 and BN-0010593, or all the markers BO-0002582, BN-0010479, BO-0101656, BO-0101655, BO-0103553, BO-0101639, BO-0101640 and BN-0010593, or a combination of the markers BO-0002582, BN-0010479, BO-0101656, BO-0101655, BO-0103553, BO-0101639, BO-0101640 and BN-0010593,
for detecting a cauliflower plant that is resistant to Xcc.

Preferably, said one or more molecular markers can be the marker BO-0101676 and/or the marker BO-0103553.

The invention is also directed to the use of at least one of the SNP markers of the list BN-0061002, BN-0060999, BN-0060988, BO-0101676, BN-0064638, BO-0101706, BO-0101641, BO-0002582, BN-0010479, BO-0101656, BO-0101655, BO-0103553, BO-0101639, BO-0101640 and BN-0010593, associated with QTLs on chromosome 5 (the 1st to 7th SNP of the list) and chromosome 7 (the 8th to 15th SNP of the list) conferring the resistance to Xcc according to the invention, for identifying alternative molecular markers associated with said QTLs, wherein said alternative molecular markers are:
in the chromosomal region delimited on chromosome 5 by marker BN-0061002 and marker BO-0101641, or by marker BN-0060988 and marker BO-0101641,
in the chromosomal region delimited on chromosome 7 by marker BO-0002582 and marker BN-0010593, or by marker BO-0101656 and marker BO-0101639,
at less than 2 megabase units from the locus of the 15 SNPs markers of the invention, namely BN-0061002, BN-0060999, BN-0060988, BO-0101676, BN-0064638, BO-0101706, BO-0101641, BO-0002582, BN-0010479, BO-0101656, BO-0101655, BO-0103553, BO-0101639, BO-0101640 and BN-0010593.

The alternative molecular markers are preferably associated with said QTL(s) with a p-value of 0.05 or less, preferably less than 0.01. The QTLs are to be found in the deposited seeds NCIMB 42693 or NCIMB 43442.

The invention is also directed to a method for identifying a molecular marker associated with a QTL conferring resistance to Xcc when present heterozygously or homozygously, comprising:
identifying a molecular marker in the chromosomal region:
delimited on chromosome 5 by the marker BN-0061002 and marker BO-0101641, or by marker BN-0060988 and marker BO-0101641,
delimited on chromosome 7 by the marker BO-0002582 and marker BN-0010593, or by marker BO-0101656 and marker BO-0101639, or
at less than 2 megabase units from the locus of the 15 SNPs markers of the invention, namely BN-0061002, BN-0060999, BN-0060988,
BO-0101676, BN-0064638, BO-0101706,
BO-0101641, BO-0002582, BN-0010479,
BO-0101656, BO-0101655, BO-0103553,
BO-0101639, BO-0101640 and BN-0010593, and
determining whether said molecular marker is associated with or linked to the resistance to Xcc in a segregating population issued from a plant exhibiting said resistance.

The population is preferably issued from a plant grown from the deposited seeds NCIMB 42693 or from a progeny thereof, exhibiting the resistance to Xcc as described in the invention.

The QTLs on chromosomes 5 and 7 mentioned above, conferring the resistance to Xcc according to the invention, are the QTLs present in FLA1-116-02S (NCIMB 42693) or RSF1-BC3-F3 (NCIMB 43442).

Genetic association or linkage is as defined above; preferably the association or linkage is with a p-value of preferably less than 0.05, and most preferably less than 0.01 or even less.

A molecular marker and the resistance phenotype are inherited together in preferably more than 90% of the meiosis, preferably more than 95%.

According to a further aspect, the present invention also provides molecular markers that are linked to the QTLs conferring the color of the curd as defined here above.

In some embodiments, said molecular markers linked to the QTLs conferring the color of the curd are one or more of the markers: BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450 as described here above, or all the markers BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450 as described here above, or any combination of the markers BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450. Preferably, said molecular markers conferring the color of the curd are markers linked to the major QTL on chromosome 5, as defined above, i.e. any one of the markers BO-0103554, BN-0004457, and BO-0101638, or all of the markers BO-0103554, BN-0004457, and BO-0101638.

The sequences of the markers as mentioned above are described in Table 1.

Further provided is the use of:
one or more of the molecular markers BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450, or
all the markers BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450, or a combination of the markers BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450,
for detecting a cauliflower plant that does not have a green curd.

Preferably, said one or more molecular markers is the marker BO-0103554, BN-0004457, and/or BO-0101638.

The invention is also directed to the use of at least one of the markers of the list BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450, associated with QTLs on chromosome 1 (the $1^{st}$ to $5^{th}$ markers of the list), chromosome 2 (the $6^{th}$ to $8^{th}$ markers of the list), chromosome 4 (the $9^{th}$ and $10^{th}$ markers of the list), chromosome 5 (the $11^{th}$ and $15^{th}$ markers of the list), chromosome 6 (the $16^{th}$ marker of the list) and chromosome 8 (the $17^{th}$ and $18^{th}$ SNPs of the list) conferring the color of the curd according to the invention, for identifying alternative molecular markers associated with said QTLs, wherein said alternative molecular markers are:
in the chromosomal region on chromosome 1 encompassing the marker BN-0000623, in the chromosomal region delimited on chromosome 1 by marker BN-0003844 and marker BN-0004384,
in the chromosomal region on chromosome 1 encompassing the marker BN-0004278, in the chromosomal region delimited on chromosome 2 by marker BN-0010638 and marker BN-0010246,
in the chromosomal region on chromosome 2 encompassing the marker BN-0009825,
in the chromosomal region delimited on chromosome 4 by marker BN-0001304 and marker BN-0001306,
in the chromosomal region delimited on chromosome 5 by marker BO-0103554 and marker BO-0101638,
in the chromosomal region delimited on chromosome 5 by marker BN-0002268 and marker BN-0003875,
in the chromosomal region on chromosome 6 encompassing marker BN-0003896,
in the chromosomal region delimited on chromosome 8 by marker BN-0002182 and marker BO-0003450, and/or
at less than 2 megabase units from the locus of the 18 SNPs markers of the invention, namely BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450.

The alternative molecular markers are preferably associated with said QTL(s) with a p-value of 0.05 or less, preferably less than 0.01. The QTLs are to be found in the deposited seeds NCIMB 42693 or NCIMB 43442.

The invention is also directed to a method for identifying a molecular marker associated with a QTL conferring the color of the curd when present heterozygously or homozygously, comprising:
identifying a molecular marker in the chromosomal region:
in the chromosomal region on chromosome 1 encompassing the marker BN-0000623, in the chromosomal region delimited on chromosome 1 by marker BN-0003844 and marker BN-0004384,
in the chromosomal region on chromosome 1 encompassing the marker BN-0004278,
in the chromosomal region delimited on chromosome 2 by marker BN-0010638 and marker BN-0010246,
in the chromosomal region on chromosome 2 encompassing the marker BN-0009825,
in the chromosomal region delimited on chromosome 4 by marker BN-0001304 and marker BN-0001306,
in the chromosomal region delimited on chromosome 5 by marker BO-0103554 and marker BO-0101638,
in the chromosomal region delimited on chromosome 5 by marker BN-0002268 and marker BN-0003875,
in the chromosomal region on chromosome 6 encompassing marker BN-0003896,
in the chromosomal region delimited on chromosome 8 by marker BN-0002182 and marker BO-0003450,
at less than 2 megabase units from the locus of the 18 SNPs markers of the invention, namely BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and BO-0003450, and
determining whether said molecular marker is associated with or linked to the color of the curd in a segregating population issued from a plant exhibiting said resistance.

The population is preferably issued from a plant grown from the deposited seeds NCIMB 42693 or from a progeny thereof, exhibiting the color of the curd as described in the invention.

The QTLs on chromosomes 1, 2, 4, 5, 6 and 8 mentioned above, conferring the color of the curd according to the invention, are the QTLs present in FLA1-116-02S (NCIMB 42693) or RSF1-BC3-F3 (NCIMB 43442).

Genetic association or linkage is as defined above; preferably the association or linkage is with a p-value of preferably less than 0.05, and most preferably less than 0.01 or even less.

A molecular marker and the color phenotype are inherited together in preferably more than 90% of the meiosis, preferably more than 95%.

The present invention also provides methods for detecting and/or selecting a cauliflower plant that does not have green curd, wherein said method comprises the step of detecting the absence of a major QTL on chromosome 5 conferring the green color of the curd. In some embodiments, said method comprises the steps of detecting the absence of a major QTL on chromosome 5 located within a chromosomal region that is delimited by marker BO-0103554 and marker BO-0101638. Preferably, said major QTL on chromosome 5 conferring the green color of the curd can be identified by amplifying any one of the following markers: BO-0103554, BN-0004457 and BO-0101638.

Preferably, a plant is selected if the allele's combination:
A) allele G of BO-0103554, allele G of BN-0004457, and/or allele G of BO-0101638 (i.e. the white alleles of the MAC5 QTL),
B) allele C of BN-0000623, allele T of BN-0003844, allele G of BN-0002453, allele A of BN-0004384, allele C of BN-0004278, allele G or A of BN-0010638, allele G of BN-0010246, allele T or C of BN-0001304, allele T or C of BN-0001306, allele T or G of BN-0002268, allele G of BN-0003875, allele G of BO-0103554, allele G of BN-0004457, allele A of BO-0101638, allele G of BN-0003896, allele A of BN-0002182, and allele T of BO-0003450 (i.e. the same alleles than those present in the genome of a plant corresponding to the deposited material FLA1-116-02S (NCIMB accession number 42693) or RSF1-BC3-F3 (NCIMB accession number 43442), or
C) allele T of BN-0000623, allele A of BN-0003844, allele C of BN-0002453, allele G of BN-0004384, allele T of BN-0004278, allele G of BN-0010638, allele A of BN-0010246, allele T of BN-0009825, allele T of BN-0001304, allele T of BN-0001306, allele T of BN-0002268, allele G of BN-0003875, allele G of BO-0103554, allele G of BN-0004457, allele G of BO-0101638, allele A of BN-0003896, allele C of BN-0002182, and an allele C of BO-0003450,
is detected, in a genetic material sample of the plant to be selected.

In some embodiments, detection of the markers BN-0000623, BN-0003844, BN-0002453, BN-0004384, BN-0004278, BN-0010638, BN-0010246, BN-0009825, BN-0001304, BN-0001306, BN-0002268, BN-0003875, BO-0103554, BN-0004457, BO-0101638, BN-0003896, BN-0002182, and/or BO-0003450 is performed by PCR using, for each marker, one forward primer which can be used for amplifying the resistant allele, one forward primer which can be used for amplifying the susceptible allele and one common reverse primer. In particular, the primers for amplifying each of said markers may have the sequences as described in Table 5.

In a preferred embodiment, the amplification is as described in the examples. In a still preferred embodiment, the amplification is performed using a two-step touchdown method in which the elongation and annealing steps are incorporated into a single step as described above.

In a further aspect, the invention relates to a method for the production of cauliflower plantlets or plants resistant to *Xanthomonas campestris* pv. *campestris* (Xcc), which method comprises:
 (i) culturing in vitro an isolated cell or tissue of the cauliflower plant according to the invention to produce cauliflower micro-plantlets resistant to *Xanthomonas campestris* pv. *campestris* (Xcc), and
 (ii) optionally further subjecting the cauliflower micro-plantlets to an in vivo culture phase to develop into cauliflower plant resistant to Xcc.

The isolated cell or tissue used to produce a micro-plantlet is an explant obtained under sterile conditions from a cauliflower parent plant of the invention to be propagated. The explant comprise or consist, for instance, of a cotyledon, hypocotyl, stem tissue, leaf, embryo, meristem, node bud, shoot apice, or protoplast. The explant can be surface sterilized before being placed on a culture medium for micropropagation.

Conditions and culture media that can be suitably used in plant micropropagation are well known to those skilled in the art of plant cultivation and are described, for example, in "Plant Propagation by Tissue Culture, Handbook and Directory of Commercial Laboratories, eds. Edwin F George and Paul D Sherrington, Exegetics Ltd, 1984".

Micropropagation typically involves
 (i) axillary shoot production: axillary shoot proliferation is induced by adding cytokinin to the shoot culture medium, to produce shoots preferably with minimum callus formation;
 (ii) adventitious shoot production: addition of auxin to the medium induces root formation, in order to produce plantlets that are able to be transferred into the soil. Alternatively, root formation can be induced directly into the soil.

Plantlets can be further subjected an in vivo culture phase, by culture into the soil under lab conditions, and then progressive adaptation to natural climate, to develop into cauliflower plant resistant to Xcc.

Throughout the instant application, the term "comprising" is to be interpreted as encompassing all specifically mentioned features as well optional, additional, unspecified ones. As used herein, the use of the term "comprising" also discloses the embodiment wherein no features other than the specifically mentioned features are present (i.e. "consisting of").

SEED DEPOSIT

A sample of seeds from the cauliflower plant according to the invention (i.e. seeds from FLA1-116-02S plant) has been deposited by H M. Clause, S. A., Rue Louis Saillant, Z. I. La Motte, BP83, 26802 Portes-lès-valence Cedex, France, pursuant to, and in satisfaction of, the requirements of the Budapest Treaty on the International Recognition of the Deposit of Microorganisms for the Purposes of Patent Procedure (the "Budapest treaty") with the National Collection of Industrial, Food and Marine Bacteria (NCIMB), (NCIMB Ltd, Ferguson Building, Craibstone Estate, Bucksburn, Aberdeen AB21 9YA, Scotland), on Nov. 17, 2016, under accession number 42693.

Other sample of seeds from the cauliflower plant according to the invention (i.e. seeds from RSF1-BC3-F3 plant) have been deposited by H M. Clause, S. A., Rue Louis Saillant, Z. I. La Motte, BP83, 26802 Portes-lès-valence Cedex, France, pursuant to, and in satisfaction of, the requirements of the Budapest Treaty on the International Recognition of the Deposit of Microorganisms for the Purposes of Patent Procedure (the "Budapest treaty") with the National Collection of Industrial, Food and Marine Bacteria (NCIMB), (NCIMB Ltd, Ferguson Building, Craibstone Estate, Bucksburn, Aberdeen AB21 9YA, Scotland), on Jul. 22, 2019, under accession number 43442.

A deposit of these seeds is maintained by H M. Clause, S. A., Rue Louis Saillant, Z. I. La Motte, BP83, 26802 Portes-lès-valence Cedex, France.

The invention is further illustrated by the following FIGURE and examples.

FIGURE

FIG. 1 shows the LOD score determined for nine markers on chromosome 5, calculated as LOD=−log(p-value), plotted against the physical position of the markers on chromosome 5. The p-value was determined by performing a Kruskal-Wallis statistical test to assay the association between marker genotype and phenotype.

EXAMPLES

1. Material and Methods 1.1. Cauliflower Lines

The green cauliflower line FLA belongs to the *Brassica oleracea* L. var. *botrytis* species. This line has been identified by the inventors as being resistant to Xcc races 1 and/or 4 and has a curd with a green color at harvest maturity similar to the green color of the example varieties Alverda and Minaret cited in the table of characteristics of the in TG/45/7 document edited by the International Union for the Protection of new Variety of plants (UPOV) and dated 2009 Apr. 1 (characteristic 21 at page 13 of the document).

The white cauliflower line SOL5 and RST belong to the *Brassica oleracea* L. var. *botrytis* species. These lines have been identified by the inventors as being susceptible to Xcc races 1 and/or 4 and have a color at harvest maturity similar to the white color of the example varieties Aerospace, Aviron or Freebell.

1.2. Xcc Test (Field Test Conditions)

Xcc Inoculum Preparation

The Xcc strains of races 1 and 4 were stored at −80° C. Each strain is first grown on Petri dishes containing an LPGA medium during 48 h at 26° C. Then each strain is transferred into new LPGA agar plates and grown during 48 h at 26° C. to obtain a bacterial mat. For inoculum preparation, bacterial mat of each strain is pooled and adjusted to a final concentration of $10^8$ bacteria/ml. Then 3 drops/L of Tween 20 is added in the inoculum.

Plant Material Production

Plantlets are transplanted in the field when they bear 8-12 leafs. For each experiment, one susceptible check and one resistant check are also transplanted in the field and inoculated.

Experimental Procedure and Evaluation

One month after transplantation of the plants in the field, they are inoculated with each inoculum by spraying the inoculum on all leaves of each plant. Plant were the grown under natural field conditions, and the plants were evaluated for Xcc infection 1 months to 1.5/2 months after inoculation according to the following scale: 9=No symptoms, 8=1-12% of symptoms on leaves, 7=13-25% of symptoms on leaves, 5=26-50% of symptoms on leaves, 3=51-75% of symptoms on leaves and 1=>76% of symptoms on leaves. According to this scoring, a plant is considered as being highly resistant (HR) when the score is 9 or 8, a plant is considered as being intermediate resistant (IR) when the score is 7, and a plant is considered as being susceptible when the score is 5, 3 or 1.

1.3. DNA Extraction and Genotyping Protocol

Plants were sampled and DNA was isolated, using magnetic beads (NucleoMag® 96 Plant), according to the protocol of the manufacturer of the beads, Macherey-Nagel. DNA was eluted in 60 μL of PCR grade water.

Genotyping was done using KASP™ technology. KASP™ genotyping requires a KASP™ Assay mix which is specific to each marker and KASP™ Master mix was purchased at LGC (http://www.lgcgroup.com). Since genotyping was carried out in 1536-well plates, KASP V4.0 1× Mastermix 1536 Master mix was used.

The KASP™ Assay mix is specific to each marker and consists of the two competitive, allele-specific primers and one common primer (see tables 2 and 5). Each allele-specific primer incorporates an additional tail sequence that corresponds to one of two universal FRET (fluorescent resonance energy transfer) cassettes present in the KASP™ 1536 Master Mix. DNA strand and allele designation and orientation is done according to the TOP/BOT method developed by Illumina (https://www.illumina.com/documents/products/technotes/technote_topbot.pdf).

For each marker and sample, 1.5 μl of 1:10 diluted DNA was aliquoted in 1536-well plates using a LGC repliKator™ robot. DNA was then dried overnight at room temperature. Genotyping reaction was prepared by dispensing, per DNA sample, 0.986 μl of Assay Mix and 0.014 μl of KASP™

1536 Master Mix. Dispensing was performed using a LGC Meridian robot. Reaction plates were further sealed using LGC Fusion3™ laser welding system.

Thermal cycling was performed in LGC Hydrocycler™ water bath-based thermal cycler using the following thermal cycling touchdown program: Stage 1 (Hot start Taq activation): 94° C. for 15 minutes, Stage 2 (Touchdown): 10 cycles at 94° C. for 20 seconds and 65-57° C. for 60 seconds (65° C. decreasing 0.8° C. per cycle to achieve a final annealing/extension temperature of 57° C.), and Stage 3 (Amplification): 35 cycles at 94° C. for 20 seconds and 57° C. for 60 seconds.

Plate reading for fluorescence measurement was achieved by a BMG PHERAstar plate reader. Fluorescence data were further analyzed by LGC KlusterCaller™ software.

2. Introgression of the Resistance to Xcc from Green Cauliflower into White Cauliflower A) Genetic Determinism of the Green Cauliflower Resistance to Xcc The green cauliflower FLA was crossed with the white susceptible cauliflower SOL5. The resultant F1 seeds were germinated, plants grown from the germinated seeds, and the resultant plants were selfed to produce F2 seeds/plants for further selection and breeding. F2 plants have been submitted in field to a pathological test for resistance to Xcc. Each plants of the F2 population have been scored individually, and the segregation ratio of the trait in the F2 population corresponded to one monogenic dominant gene.

Then a bulk segregant analysis was run on a resistant bulk versus susceptible one, using 384 SNPs spread over the whole genome. 24 SNPs discriminating the resistance and susceptibility were kept for further analysis. Among these 24 SNPs, one was located on chromosome 5 and eight were located on chromosome 7. A test for association to the resistance to Xcc was performed against these SNPs and allowed to confirm that one major QTL was located on chromosome 7 but that a second one was located on chromosome 5.

F3 families were produced from 200 new F2 plants randomly chosen.

Out of 200, 153 F3 families were evaluated for Xcc resistance races 1 and 4 in field trial. Parental lines FLA and SOL5 were included in this test. FLA had an intermediate level of resistance with a score of 7 and SOL5 was susceptible with a score of 5. F3 families had score of resistance comprised between 3 and 9.

The segregation ratio was still in accordance with the hypothesis of one major dominant gene.

Genotyping analysis of this population was further carried out to validate this hypothesis.

Genotyping of the 142 F2 plants out of 200 F2 was thus performed with 4 markers located on chromosome 7 (out of the 8 previously identified) and 3 located on chromosome 5. It enabled us to confirm that these two regions were each harboring a QTL of resistance to Xcc. As the markers physical position is known in the genome, we were able to localize the resistance region to a 33,521,178 bp wide region on chromosome 5 comprised between positions 9,354,311 and 42,875,489, and to a 2,773,439 bp wide region on chromosome 7 comprised between positions 34,714,403 and 38,690,572.

Eight additional markers, located in the defined resistance region on chromosome 5 were further identified and used to genotyped the 142 F2 plants. An association test between marker genotype and phenotype was performed using a Kruskal-Wallis statistical test. For each marker, a LOD score was calculated from the p-value of the test as LOD=–log (p-value) and plotted against the physical position of the markers on chromosome 5 (FIG. 1). The resistance region was thus further refined to a 1,044,654 bp wide region between positions 38,928,177 bp and 39,972,831 bp.

Seven additional markers (i.e. BO-0002582, BN-0010479, BO-0101656, BO-0101655, BO-0103553, BO-0101639, BO-0101640), located in the defined resistance region on chromosome 7 were further identified and used to genotyped the 142 F2 plants. An association test between marker genotype and phenotype was performed using a Kruskal-Wallis statistical test. For each marker, a LOD score was calculated from the p-value of the test as LOD=–log(p-value). The resistance region was thus further refined to a 1,550,367 bp wide region between positions 36,520,957 bp and 38,690,572 bp.

B) Genetic Determinism of the Green Curd Color 229 cauliflower lines have been genotyped with 384 SNP markers well spread over the genome. Curd color of those 229 inbred lines was coded as a binary trait: white or green. An association study was performed on those dataset to identify markers linked to the green curd color trait.

12 interesting markers (i.e. BN-0003844, BN-0002453, BN-0004278, BN-0010638, BN-0010246, BN-0009825, BN-0001304, BN-0001306, BN-0002268, BN-0003875, BN-0004457, BN-0003896, see Table 1 for the sequences of these markers) were kept for further analysis. Those 12 markers were the most tightly linked ones to the green curd color phenotype. Thanks to the mapping position information, it has been found that the 12 markers corresponded to 8 different QTLs, two QTLs being located on chromosome 1 (one QTL, named MiC1-2 for the purpose of the invention, encompassing the markers BN-0003844 and BN-0002453, and a second one, named MiC1-3 for the purpose of the invention, encompassing the marker BN-0004278), two QTLs being located on chromosome 2 (one QTL, named MiC2-1 for the purpose of the invention, encompassing the markers BN-0010638 and BN-0010246, and a second one, named MiC2-2 for the purpose of the invention, encompassing the marker BN-0009825), one QTL, named MiC4 for the purpose of the invention, being located on chromosome 4 and encompassing the markers BN-0001304 and BN-0001306, two QTLs being located on chromosome 5 (one major QTL, named MAC5 for the purpose of the invention, encompassing the marker BN-0004457 and one minor QTL, named MiC5 for the purpose of the invention, encompassing the markers BN-0002268 and BN-0003875), and one QTL, named MiC6 for the purpose of the invention, being located on chromosome 6 and encompassing the marker BN-0003896.

To validate the predictably of these 5 mostly associated markers among the 12 markers, two green cauliflower hybrids and 5 green cauliflower breeding lines not previously used for association study were used. The 5 alleles corresponding to the 5 markers define an haplotype allowing to predict the green color of the curd.

To further validate the identified haplotype to predict the green curd color in cauliflower, a Bulk Segregant Analysis on few FLA×SOL5 DH plants has been performed. Each DH plant had previously been phenotyped (visual scoring) for curd color on a 1 to 9 scale (1=white color similar to SOL5, 9=green color similar to FLA). One bulk of white curd color DH plants and 1 bulk of green curd color DH plants were tested with 384 SNPs. Five SNPs discriminating the green bulk from the white bulk were identified (i.e. markers BN-0004384, BN-0004457, BN-0000623, BN-0002182 and BO-0003450) and kept for further analysis. These five SNPs were located:
- in the previously highlighted regions on chromosome 1 (i.e. the MiC1-2 QTL with marker BN-0004384 that is located in the same region as markers BN-0003844 and BN-0002453) and chromosome 5 (i.e. the MAC5 QTL with marker BN-0004457 that is located in the same region as marker BO-0101638),
- on a new region on chromosome 1, named MiC1-1 for the purpose of the invention, encompassing the marker BN-0000623, and
- on a new region on chromosome 8, named MiC8 for the purpose of the invention, delimited by markers BN-0002182 and BO-0003450.

It is hypothesized that the QTL identified on chromosome 8 is specific to FLA because it was not found in the first association study. It has also been confirmed that chromosome 1 and 5 are involved in green curd trait in cauliflower. On chromosome 5, additional SNP markers polymorphic between FLA and SOL5 were used to genotype the DH population. Further analyses allowed to identify marker BO-0103554 located in the MAC5 QTL as tightly linked to the curd color.

Regarding these results and the ones obtained for the resistance to Xcc it has finally been found that there is a linkage on chromosome 5 between the "resistance to Xcc" and "green color of the curd" with a genetic distance of 6.1 cM>x>4.3 cM.

Once major «green color» QTL MAC5 and Xcc resistance»QTL position on chromosome 5 had been defined, occurrence of both QTLs in the original F2 (example 1, section A) population was analyzed. Due to the tight linkage, no plant carrying the right allele at both QTLs on chromosome 5 (respectively white color and resistance) at homozygous state could be found.

In the F2 population, one plant (FLA-116) heterozygous for the Xcc resistance QTL on chromosome 5 but homozygous for the white allele (coming from SOL5) at the «green color» QTL MAC5 on chromosome 5 has been identified. This plant represented a good starting point to break the linkage between the "green" color QTL MAC5 on chromosome 5 and the "Xcc resistance" QTL on chromosome 5. This plant was selfed to produce F3 seeds.

95 F3 seeds were tested with markers to select the recombinants. 5 plants being homozygous resistant for Xcc QTLs on chromosome 5 and chromosome 7 and homozygous white for the green color QTL MAC5 on chromosome 5 were identified (FLA1-116-02, FLA1-116-38, FLA1-116-51, FLA1-116-62, FLA1-116-81) and selfed. Linkage drag was thus broken in F3 plants. These selected F3 plants were selfed to increase seeds set. F4 seeds were obtained and the F4 seeds (i.e. FLA1-116-02S seeds) obtained from the selfing of the FLA1-116-02 plants were deposited under the NCIMB number 42693. The inventors thus managed to obtain Xcc resistant plants not having a green curd due to the presence of (i) the resistant alleles at homozygous state for the Xcc resistance QTLs on chromosome 5 and chromosome 7 and (ii) the white alleles at homozygous state for the MAC5 QTL.

C) Introgression of Xcc Resistance into Elite White Genotype

In parallel the back-cross method has been used to introgress the two QTLs of resistance of the donor FLA plant into an elite recurrent white line named RST by breaking the linkage with the green color.

The green cauliflower FLA was crossed with the white susceptible cauliflower RST. The resultant F1 seeds (coded RSF1) were germinated, plants grown from the germinated seeds, and the resultant plants were back crossed with RST to produce the first backcross seeds (RSF1 Bc1). The 37 BC1 plants have been submitted to Marker Assisted Back-Cross (MABC). Two plants were selected (RSF1 Bc1 A and RSF Bc1 C), heterozygous resistant/susceptible for Xcc QTLs on chromosome 5 and chromosome 7; homozygous white for the green color QTL MAC5 on chromosome 5 were identified; with respectively 79,41% and 73,53% of the recurrent background. These two selected BC1 plants were backcrossed with the recurrent RST to produce the second backcross seeds (RSF1 Bc2 A and RSF1 Bc2 C). 88 plants from RSF1 Bc2 A seeds and 93 plants from RSF1 Bc2 C were tested with MABC. No plants from RSF1 Bc2 C were selected. But two plants from RSF1 Bc2 A seeds were selected (RSF1 Bc2 A1, RSF1 Bc2 A2). These two plants were heterozygous for Xcc QTLs on chromosomes 5 and 7, with the white cauliflower haplotype and with 95,42% and 94,51% of isogeny. These two selected BC2 plants were backcrossed with the recurrent RST to produce the third backcross seeds (RSF1 Bc3 A1 and RSF1 Bc3 A2) and selfed to produce the Bc2F2 seeds. The two Bc3 and the Bc2F2 populations were evaluated for Xcc resistance races 1 and 4 in field trial. Parental lines FLA and RST were included in this test. FLA had an high level of resistance with a score of 8 and RST was susceptible with a score of 5. Bc3 populations had score of resistance comprised between 5 and 7. Bc2F2 population had score of resistance comprised between 7 and 8. In parallel, 101 plants from RSF1 Bc3 A1 and 81 plants from RSF1 Bc3 A2 seeds were tested with Marker Assisted Selection. 2 plants were selected with the white cauliflower haplotype and the two FLA Xcc QTLs heterozygous (RSF1 Bc3 A1A and RSF1 Bc3 A2A). These two selected Bc3 plants were selfed to produce the Bc3F2 seeds. The two Bc3F2 populations were evaluated for Xcc resistance races 1 and 4 in field trial plant by plant. Parental lines FLA and RST were included in this test. FLA had a high level of resistance with a score of 8 and RST was susceptible with a score of 5. Bc3F2 plants had score of resistance comprised between 5 and 8. In parallel, 91 plants from the Bc3 selfed RSF1 Bc3 A1A and 90 plants from the BC3 selfed RSF1 Bc3 A2A were tested with MAS. One plant of each population being homozygous resistant for Xcc QTLs on chromosome 5 and chromosome 7 and with the white cauliflower haplotype were identified (RSF1 Bc3 A1A1 and RSF1 Bc3 A2A1). These two selected Bc3F2 plants were selfed to produce the Bc3F3 seeds, totally homozygous resistant for Xcc QTLs on chromosome 5 and chromosome 7 and with the white cauliflower haplotype (RSF1 Bc3 A1A1A and RSF1 Bc3 A2A1A). The RSF1 Bc3 A1A1A (re-named RSF1-BC3-F) seeds were deposited under the NCIMB number 43442.

3. Genetic Modification of Cauliflower Seeds by Ethyl Methane Sulfonate (EMS)

Seeds of cauliflower plants are to be treated with EMS by submergence of approximately 2000 seeds into an aerated solution of either 0.5% (w/v) or 0.7% EMS for 24 hours at room temperature.

Approximately 1500 treated seeds per EMS dose are germinated and the resulting plants are grown, preferably in a greenhouse, for example, from March to September, to produce seeds.

Following maturation, M2 seeds are harvested and bulked in one pool per variety per treatment. The resulting pools of M2 seeds are used as starting material to identify the individual M2 seeds and the plants resistant to Xcc.

The invention claimed is:

1. A cauliflower plant that is resistant to *Xanthomonas campestris* pv. *campestris* (Xcc) and that does not have a green curd, said cauliflower plant:
   (i) comprising in its genome introgressed sequences from a green cauliflower plant conferring said resistance to Xcc; and
   (ii) not comprising in its genome a major Quantitative Trait Loci (QTL) on chromosome conferring the green color of the curd,
   wherein said sequences from said green cauliflower plant conferring said resistance to Xcc are:
   one QTL that is present on chromosome 5 within a chromosomal region that is delimited by marker BN-0061002 having a nucleotide T at position 38,928,177 on chromosome 5 and marker BO-0101641 having a nucleotide C at position 39,972,831 on chromosome 5, and
   one QTL that is present on chromosome 7 within a chromosomal region that is delimited by marker BO-0002582 having a nucleotide T at position 36,520,957 on chromosome 7 and marker BN-0010593 having a nucleotide C at position 38,690,572 on chromosome 7,
   wherein said introgressed sequences from the green cauliflower plant conferring resistance to Xcc are chosen from the sequences present in the genome of a plant of the line FLA1-116-02S, a representative sample of seeds which have been deposited under the NCIMB accession number 42693, or RSF1-BC3-F3, a representative sample of seeds which have been deposited under the NCIMB accession number 43442, and
   wherein said major QTL on chromosome 5 conferring the green color of the curd is located within a chromosomal region that is delimited by marker BO-0103554 having a nucleotide C at position 33,420,357 on chromosome 5 and marker BO-0101638 having a nucleotide A at position 35,168,917 on chromosome 5.

2. The cauliflower plant according to claim 1, which has a white curd.

3. The cauliflower plant according to claim 1, wherein said cauliflower plant is a progeny of a plant line FLA1-116-02S (NCIMB accession number 42693) or RSF1-BC3-F3 (NCIMB accession number 43442).

4. An isolated cell of the cauliflower plant according to claim 1.

5. A plant part obtained from a cauliflower plant as defined in claim 1.

6. The plant part according to claim 5, wherein said plant part is selected from the group consisting of a seed, a curd, a floret, a reproductive material, a root, and a flower.

7. A seed of a cauliflower plant, said seed (i) comprising in its genome introgressed sequences from a green cauliflower plant conferring said resistance to Xcc and (ii) not comprising in its genome a major Quantitative Trait Loci (QTL) on chromosome 5 conferring the green color of the curd,
   wherein said sequences from the green cauliflower plant conferring said resistance to Xcc are:
   one QTL that is present on chromosome 5 within a chromosomal region that is delimited by marker BN-0061002 having a nucleotide T at position 38,928,177 on chromosome 5 and marker BO-0101641 having a nucleotide C at position 39,972,831 on chromosome 5, and
   one QTL that is present on chromosome 7 within a chromosomal region that is delimited by marker BO-0002582 having a nucleotide T at position 36,520,957 on chromosome 7 and marker BN-0010593 having a nucleotide C at position 38,690,572 on chromosome 7, wherein said introgressed sequences from the green cauliflower plant conferring resistance to Xcc are chosen from the sequences present in the genome of a plant of the line FLA1-116-02S, a representative sample of seeds which have been deposited under the NCIMB accession number 42693, or RSF1-BC3-F3, a representative sample of seeds which have been deposited under the NCIMB accession number 43442, and wherein said major QTL on chromosome 5 conferring the green color of the curd is located within a chromosomal region that is delimited by marker BO-0103554 having a nucleotide C at position 33,420,357 on chromosome 5 and marker BO-0101638 having a nucleotide A at position 35,168,917 on chromosome 5, wherein the seed when grown up gives rise to the cauliflower plant as defined in claim 1.

8. A hybrid plant of a cauliflower plant that is resistant to *Xanthomonas campestris* pv. *campestris* (Xcc) and that does not have a green curd, obtainable by crossing a cauliflower plant with a resistant cauliflower plant according to claim 1.

9. A method for obtaining cauliflower plant resistant to *Xanthomonas campestris* pv. *campestris* (Xcc) that does not have a green curd comprising breeding a resistant cauliflower plant according to claim 1 with a second cauliflower plant.

10. A method for improving the yield of cauliflower plants in an environment infested by *Xanthomonas campestris* pv. *campestris* (Xcc), comprising growing cauliflower plants resistant to Xcc and that do not have a green curd as defined in claim 1.

11. A method for improving the yield of cauliflower plants in an environment infested by *Xanthomonas campestris* pv. *campestris* (Xcc) comprising:
   a) identifying cauliflower plants resistant to Xcc and that do not have a green curd as defined in claim 1, and
   b) growing said resistant cauliflower plants in said infested environment.

12. A method for protecting a field from infestation and/or spread of *Xanthomonas campestris* pv. *campestris* (Xcc), comprising growing cauliflower plants resistant to Xcc and that do not have a green curd as defined in claim 1.

13. A method for increasing the number of harvestable or viable cauliflower plants in an environment infested by *Xanthomonas campestris* pv. *campestris* (Xcc), comprising growing cauliflower plants resistant to Xcc and that do not have a green curd as defined in claim 1.

14. A method for controlling infestation by *Xanthomonas campestris* pv. *campestris* (Xcc) comprising growing a resistant cauliflower plant that does not have a green curd as defined in claim 1.

15. A container comprising a cauliflower plant as defined in claim 1.

16. A method for the production of cauliflower plantlets or plants resistant to *Xanthomonas campestris* pv. *campestris* (Xcc), which method comprises:
   (i) culturing in vitro an isolated cell or tissue of the cauliflower plant as defined in claim 1 to produce cauliflower micro-plantlets resistant to *Xanthomonas campestris* pv. *campestris* (Xcc), and
   (ii) optionally further subjecting the cauliflower micro-plantlets to an in vivo culture phase to develop into cauliflower plants resistant to Xcc.

\* \* \* \* \*